(12) United States Patent
Silverbrook

(10) Patent No.: US 7,717,543 B2
(45) Date of Patent: May 18, 2010

(54) PRINTHEAD INCLUDING A LOOPED HEATER ELEMENT

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 53 days.

(21) Appl. No.: 11/926,121

(22) Filed: Oct. 28, 2007

(65) Prior Publication Data

US 2008/0049072 A1     Feb. 28, 2008

Related U.S. Application Data

(63) Continuation of application No. 10/728,790, filed on Dec. 8, 2003, now Pat. No. 7,287,836, which is a continuation of application No. 10/160,273, filed on Jun. 4, 2002, now Pat. No. 6,746,105, which is a continuation of application No. 09/112,767, filed on Jul. 10, 1998, now Pat. No. 6,416,167.

(30) Foreign Application Priority Data

| Jul. 15, 1997 | (AU) | ................................. PO7991 |
| Mar. 25, 1998 | (AU) | ................................. PO2592 |

(51) Int. Cl.
*B41J 2/05* (2006.01)
(52) U.S. Cl. .............................. 347/62; 347/56
(58) Field of Classification Search ................. 347/54, 347/56, 61, 62

See application file for complete search history.

(56) References Cited

U.S. PATENT DOCUMENTS

| 1,941,001 A | 12/1933 | Hansell |
| 3,373,437 A | 3/1968 | Sweet et al. |
| 3,596,275 A | 7/1971 | Sweet |
| 3,683,212 A | 8/1972 | Zoltan |
| 3,747,120 A | 7/1973 | Stemme |
| 3,946,398 A | 3/1976 | Kyser et al. |
| 4,423,401 A | 12/1983 | Mueller |

(Continued)

FOREIGN PATENT DOCUMENTS

DE           3430155 A    2/1986

(Continued)

OTHER PUBLICATIONS

Ataka, Manabu et al, "Fabrication and Operation of Polymide Bimorph Actuators for Ciliary Motion System". Journal of Microelectromechanical Systems, US, IEEE Inc. New York, vol. 2, No. 4, Dec. 1, 1993, pp. 146-150, XP000443412, ISSN: 1057-7157.

(Continued)

*Primary Examiner*—Stephen D Meier
*Assistant Examiner*—Geoffrey Mruk

(57) ABSTRACT

An ink jet printhead that has a plurality of nozzles, a bubble forming chamber corresponding to each of the nozzles respectively, the bubble forming chambers adapted to contain a bubble forming liquid; and at least one looped heater element disposed in each of the bubble forming chambers respectively, the heater elements configured for thermal contact with the bubble forming liquid; wherein heating of the looped heater element to a temperature above the boiling point of the bubble forming liquid forms a gas bubble that causes the ejection of a drop of an ejectable liquid through the nozzle corresponding to that heater element.

13 Claims, 34 Drawing Sheets

U.S. PATENT DOCUMENTS

| | | | |
|---|---|---|---|
| 4,459,601 A | 7/1984 | Howkins | |
| 4,490,728 A | 12/1984 | Vaught et al. | |
| 4,553,393 A | 11/1985 | Ruoff | |
| 4,584,590 A | 4/1986 | Fischbeck et al. | |
| 4,611,219 A * | 9/1986 | Sugitani et al. | 347/40 |
| 4,672,398 A | 6/1987 | Kuwabara et al. | |
| 4,737,802 A | 4/1988 | Mielke | |
| 4,864,824 A | 9/1989 | Gabriel et al. | |
| 4,870,433 A * | 9/1989 | Campbell et al. | 347/62 |
| 4,899,181 A | 2/1990 | Hawkins et al. | |
| 5,029,805 A | 7/1991 | Albarda et al. | |
| 5,258,774 A | 11/1993 | Rogers | |
| 5,508,236 A | 4/1996 | Chiang et al. | |
| 5,666,141 A | 9/1997 | Matoba et al. | |
| 5,719,604 A | 2/1998 | Inui et al. | |
| 6,416,167 B1 | 7/2002 | Silverbrook | |

FOREIGN PATENT DOCUMENTS

| | | | |
|---|---|---|---|
| DE | 3716996 A | 12/1988 | |
| DE | 4328433 A | 3/1995 | |
| DE | 19516997 A | 11/1995 | |
| DE | 19517969 A | 11/1995 | |
| DE | 19532913 A | 3/1996 | |
| DE | 19639717 A | 4/1997 | |
| EP | 0092229 A | 10/1983 | |
| EP | 0398031 A | 11/1990 | |
| EP | 0427291 A | 5/1991 | |
| EP | 0431338 A | 6/1991 | |
| EP | 0478956 | 4/1992 | |
| EP | 0506232 A | 9/1992 | |
| EP | 0510648 A | 10/1992 | |
| EP | 0627314 A | 12/1994 | |
| EP | 0634273 A2 | 1/1995 | |
| EP | 0713774 A2 | 5/1996 | |
| EP | 0737580 A | 10/1996 | |
| EP | 0750993 A | 1/1997 | |
| EP | 0882590 A | 12/1998 | |
| FR | 2231076 | 12/1974 | |
| GB | 792145 A | 3/1958 | |
| GB | 1428239 A | 3/1976 | |
| GB | 2007162 | 5/1979 | |
| GB | 2262152 A | 6/1993 | |
| JP | 58-112747 A | 7/1983 | |
| JP | 58-116165 A | 7/1983 | |
| JP | 61-025849 A | 2/1986 | |
| JP | 61-268453 A | 11/1986 | |
| JP | 62-94347 | * 4/1987 | |
| JP | 01-105746 A | 4/1989 | |
| JP | 01-115639 A | 5/1989 | |
| JP | 01-128839 A | 5/1989 | |
| JP | 01-257058 A | 10/1989 | |
| JP | 01-306254 A | 12/1989 | |
| JP | 02-050841 A | 2/1990 | |
| JP | 02-092643 A | 4/1990 | |
| JP | 02-108544 A | 4/1990 | |
| JP | 02-158348 A | 6/1990 | |
| JP | 02-162049 A | 6/1990 | |
| JP | 02-265752 A | 10/1990 | |
| JP | 03-065348 A | 3/1991 | |
| JP | 03-112662 A | 3/1991 | |
| JP | 03-180350 A | 8/1991 | |
| JP | 04-001051 A | 1/1992 | |
| JP | 04-118241 A | 4/1992 | |
| JP | 04-126255 A | 4/1992 | |
| JP | 04-141429 A | 5/1992 | |
| JP | 04-353458 A | 12/1992 | |
| JP | 04-368851 A | 12/1992 | |
| JP | 05-284765 A | 10/1993 | |
| JP | 05-318724 A | 12/1993 | |
| JP | 06-091865 A | 4/1994 | |
| JP | 06-091866 A | 4/1994 | |
| JP | 07-314665 A | 12/1995 | |
| WO | WO 94/18010 A | 8/1994 | |

OTHER PUBLICATIONS

Noworolski J M et al: "Process for in-plane and out-of-plane single-crystal-silicon thermal microactuators" Sensors And Actuators A, Ch. Elsevier Sequoia S.A., Lausane, vol. 55, No. 1, Jul. 15, 1996, pp. 5-69, XP004077979.

Yamagata, Yutaka et al, "A Micro Mobile Mechanism Using Thermal Expansion and its Theoretical Analysis". Proceedings of the workshop on micro electro mechanical systems (MEMS), US, New York, IEEE, vol. Workshop 7, Jan. 25, 1994, pp. 142-147, XP000528408, ISBN: 0-7803-1834-X.

* cited by examiner

PRINTHEAD INCLUDING A LOOPED HEATER ELEMENT

CROSS REFERENCES TO RELATED APPLICATIONS

The present application is a continuation of U.S. application Ser. No. 10/728,790 filed Dec. 8, 2003, which is a continuation in part of U.S. application Ser. No. 10/160,273 filed on Jun. 4, 2002, now issued as U.S. Pat. No. 6,746,105, which is a continuation of U.S. application Ser. No. 09/112,767 filed on Jul. 10, 1998, now issued as U.S. Pat. No. 6,416,167, all of which are herein incorporated by reference.

The following Australian provisional patent applications are hereby incorporated by cross-reference. For the purposes of location and identification, US patent applications identified by their US patent application serial numbers (USSN) are listed alongside the Australian applications from which the US patent applications claim the right of priority.

| CROSS-REFERENCED AUSTRALIAN PROVISIONAL PATENT APPLICATION NO. | US PATENT/ PATENT APPLICATION (CLAIMING RIGHT OF PRIORITY FROM AUSTRALIAN PROVISIONAL APPLICATION) | DOCKET NO. |
|---|---|---|
| PO7991 | 6750901 | ART01US |
| PO8505 | 6476863 | ART02US |
| PO7988 | 6788336 | ART03US |
| PO9395 | 6322181 | ART04US |
| PO8017 | 6597817 | ART06US |
| PO8014 | 6227648 | ART07US |
| PO8025 | 6727948 | ART08US |
| PO8032 | 6690419 | ART09US |
| PO7999 | 6727951 | ART10US |
| PO8030 | 6196541 | ART13US |
| PO7997 | 6195150 | ART15US |
| PO7979 | 6362868 | ART16US |
| PO7978 | 6831681 | ART18US |
| PO7982 | 6431669 | ART19US |
| PO7989 | 6362869 | ART20US |
| PO8019 | 6472052 | ART21US |
| PO7980 | 6356715 | ART22US |
| PO8018 | 6894694 | ART24US |
| PO7938 | 6636216 | ART25US |
| PO8016 | 6366693 | ART26US |
| PO8024 | 6329990 | ART27US |
| PO7939 | 6459495 | ART29US |
| PO8501 | 6137500 | ART30US |
| PO8500 | 6690416 | ART31US |
| PO7987 | 7050143 | ART32US |
| PO8022 | 6398328 | ART33US |
| PO8497 | 7110024 | ART34US |
| PO8020 | 6431704 | ART38US |
| PO8504 | 6879341 | ART42US |
| PO8000 | 6415054 | ART43US |
| PO7934 | 6665454 | ART45US |
| PO7990 | 6542645 | ART46US |
| PO8499 | 6486886 | ART47US |
| PO8502 | 6381361 | ART48US |
| PO7981 | 6317192 | ART50US |
| PO7986 | 6850274 | ART51US |
| PO7983 | 09/113054 | ART52US |
| PO8026 | 6646757 | ART53US |
| PO8028 | 6624848 | ART56US |
| PO9394 | 6357135 | ART57US |
| PO9397 | 6271931 | ART59US |
| PO9398 | 6353772 | ART60US |
| PO9399 | 6106147 | ART61US |
| PO9400 | 6665008 | ART62US |
| PO9401 | 6304291 | ART63US |
| PO9403 | 6305770 | ART65US |
| PO9405 | 6289262 | ART66US |
| PP0959 | 6315200 | ART68US |
| PP1397 | 6217165 | ART69US |
| PP2370 | 6786420 | DOT01US |
| PO8003 | 6350023 | Fluid01US |
| PO8005 | 6318849 | Fluid02US |
| PO8066 | 6227652 | IJ01US |
| PO8072 | 6213588 | IJ02US |
| PO8040 | 6213589 | IJ03US |
| PO8071 | 6231163 | IJ04US |
| PO8047 | 6247795 | IJ05US |
| PO8035 | 6394581 | IJ06US |
| PO8044 | 6244691 | IJ07US |
| PO8063 | 6257704 | IJ08US |
| PO8057 | 6416168 | IJ09US |
| PO8056 | 6220694 | IJ10US |
| PO8069 | 6257705 | IJ11US |
| PO8049 | 6247794 | IJ12US |
| PO8036 | 6234610 | IJ13US |
| PO8048 | 6247793 | IJ14US |
| PO8070 | 6264306 | IJ15US |
| PO8067 | 6241342 | IJ16US |
| PO8001 | 6247792 | IJ17US |
| PO8038 | 6264307 | IJ18US |
| PO8033 | 6254220 | IJ19US |
| PO8002 | 6234611 | IJ20US |
| PO8068 | 6302528 | IJ21US |
| PO8062 | 6283582 | IJ22US |
| PO8034 | 6239821 | IJ23US |
| PO8039 | 6338547 | IJ24US |
| PO8041 | 6247796 | IJ25US |
| PO8004 | 6557977 | IJ26US |
| PO8037 | 6390603 | IJ27US |
| PO8043 | 6362843 | IJ28US |
| PO8042 | 6293653 | IJ29US |
| PO8064 | 6312107 | IJ30US |
| PO9389 | 6227653 | IJ31US |
| PO9391 | 6234609 | IJ32US |
| PP0888 | 6238040 | IJ33US |
| PP0891 | 6188415 | IJ34US |
| PP0890 | 6227654 | IJ35US |
| PP0873 | 6209989 | IJ36US |
| PP0993 | 6247791 | IJ37US |
| PP0890 | 6336710 | IJ38US |
| PP1398 | 6217153 | IJ39US |
| PP2592 | 6416167 | IJ40US |
| PP2593 | 6243113 | IJ41US |
| PP3991 | 6283581 | IJ42US |
| PP3987 | 6247790 | IJ43US |
| PP3985 | 6260953 | IJ44US |
| PP3983 | 6267469 | IJ45US |
| PO7935 | 6224780 | IJM01US |
| PO7936 | 6235212 | IJM02US |
| PO7937 | 6280643 | IJM03US |
| PO8061 | 6284147 | IJM04US |
| PO8054 | 6214244 | IJM05US |
| PO8065 | 6071750 | IJM06US |
| PO8055 | 6267905 | IJM07US |
| PO8053 | 6251298 | IJM08US |
| PO8078 | 6258285 | IJM09US |
| PO7933 | 6225138 | IJM10US |
| PO7950 | 6241904 | IJM11US |
| PO7949 | 6299786 | IJM12US |
| PO8060 | 6866789 | IJM13US |
| PO8059 | 6231773 | IJM14US |
| PO8073 | 6190931 | IJM15US |
| PO8076 | 6248249 | IJM16US |
| PO8075 | 6290862 | IJM17US |
| PO8079 | 6241906 | IJM18US |
| PO8050 | 6565762 | IJM19US |
| PO8052 | 6241905 | IJM20US |
| PO7948 | 6451216 | IJM21US |
| PO7951 | 6231772 | IJM22US |
| PO8074 | 6274056 | IJM23US |

-continued

| CROSS-REFERENCED AUSTRALIAN PROVISIONAL PATENT APPLICATION NO. | US PATENT/ PATENT APPLICATION (CLAIMING RIGHT OF PRIORITY FROM AUSTRALIAN PROVISIONAL APPLICATION) | DOCKET NO. |
|---|---|---|
| PO7941 | 6290861 | IJM24US |
| PO8077 | 6248248 | IJM25US |
| PO8058 | 6306671 | IJM26US |
| PO8051 | 6331258 | IJM27US |
| PO8045 | 6110754 | IJM28US |
| PO7952 | 6294101 | IJM29US |
| PO8046 | 6416679 | IJM30US |
| PO9390 | 6264849 | IJM31US |
| PO9392 | 6254793 | IJM32US |
| PP0889 | 6235211 | IJM35US |
| PP0887 | 6491833 | IJM36US |
| PP0882 | 6264850 | IJM37US |
| PP0874 | 6258284 | IJM38US |
| PP1396 | 6312615 | IJM39US |
| PP3989 | 6228668 | IJM40US |
| PP2591 | 6180427 | IJM41US |
| PP3990 | 6171875 | IJM42US |
| PP3986 | 6267904 | IJM43US |
| PP3984 | 6245247 | IJM44US |
| PP3982 | 6315914 | IJM45US |
| PP0895 | 6231148 | IR01US |
| PP0869 | 6293658 | IR04US |
| PP0887 | 6614560 | IR05US |
| PP0885 | 6238033 | IR06US |
| PP0884 | 6312070 | IR10US |
| PP0886 | 6238111 | IR12US |
| PP0877 | 6378970 | IR16US |
| PP0878 | 6196739 | IR17US |
| PP0883 | 6270182 | IR19US |
| PP0880 | 6152619 | IR20US |
| PO8006 | 6087638 | MEMS02US |
| PO8007 | 6340222 | MEMS03US |
| PO8010 | 6041600 | MEMS05US |
| PO8011 | 6299300 | MEMS06US |
| PO7947 | 6067797 | MEMS07US |
| PO7944 | 6286935 | MEMS09US |
| PO7946 | 6044646 | MEMS10US |
| PP0894 | 6382769 | MEMS13US |

STATEMENT REGARDING FEDERALLY SPONSORED RESEARCH OR DEVELOPMENT

Not applicable.

FIELD OF THE INVENTION

The present invention relates to the field of inkjet printers and, discloses an inkjet printing system using printheads manufactured with microelectro-mechanical systems (MEMS) techniques.

BACKGROUND OF THE INVENTION

Many different types of printing have been invented, a large number of which are presently in use. The known forms of print have a variety of methods for marking the print media with a relevant marking media. Commonly used forms of printing include offset printing, laser printing and copying devices, dot matrix type impact printers, thermal paper printers, film recorders, thermal wax printers, dye sublimation printers and ink jet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nozzles has become increasingly popular primarily due to its inexpensive and versatile nature.

Many different techniques on ink jet printing have been invented. For a survey of the field, reference is made to an article by J Moore, "Non-Impact Printing: Introduction and Historical Perspective", Output Hard Copy Devices, Editors R Dubeck and S Sherr, pages 207-220 (1988).

Ink Jet printers themselves come in many different types. The utilization of a continuous stream of ink in ink jet printing appears to date back to at least 1929 wherein U.S. Pat. No. 1,941,001 by Hansell discloses a simple form of continuous stream electro-static ink jet printing.

U.S. Pat. No. 3,596,275 by Sweet also discloses a process of a continuous ink jet printing including the step wherein the ink jet stream is modulated by a high frequency electro-static field so as to cause drop separation. This technique is still utilized by several manufacturers including Elmjet and Scitex (see also U.S. Pat. No. 3,373,437 by Sweet et al)

Piezoelectric ink jet printers are also one form of commonly utilized ink jet printing device. Piezoelectric systems are disclosed by Kyser et. al. in U.S. Pat. No. 3,946,398 (1970) which utilizes a diaphragm mode of operation, by Zolten in U.S. Pat. No. 3,683,212 (1970) which discloses a squeeze mode of operation of a piezoelectric crystal, Stemme in U.S. Pat. No. 3,747,120 (1972) discloses a bend mode of piezoelectric operation, Howkins in U.S. Pat. No. 4,459,601 discloses a piezoelectric push mode actuation of the ink jet stream and Fischbeck in U.S. Pat. No. 4,584,590 which discloses a shear mode type of piezoelectric transducer element.

Recently, thermal ink jet printing has become an extremely popular form of ink jet printing. The ink jet printing techniques include those disclosed by Endo et al in GB 2007162 (1979) and Vaught et al in U.S. Pat. No. 4,490,728. Both the aforementioned references disclosed ink jet printing techniques that rely upon the activation of an electrothermal actuator which results in the creation of a bubble in a constricted space, such as a nozzle, which thereby causes the ejection of ink from an aperture connected to the confined space onto a relevant print media. Printing devices utilizing the electro-thermal actuator are manufactured by manufacturers such as Canon and Hewlett Packard.

As can be seen from the foregoing, many different types of printing technologies are available. Ideally, a printing technology should have a number of desirable attributes. These include inexpensive construction and operation, high speed operation, safe and continuous long term operation etc. Each technology may have its own advantages and disadvantages in the areas of cost, speed, quality, reliability, power usage, simplicity of construction operation, durability and consumables.

In the construction of any inkjet printing system, there are a considerable number of important factors which must be traded off against one another especially as large scale printheads are constructed, especially those of a pagewidth type. A number of these factors are outlined in the following paragraphs.

Firstly, inkjet printheads are normally constructed utilizing micro-electromechanical systems (MEMS) techniques. As such, they tend to rely upon standard integrated circuit construction/fabrication techniques of depositing planar layers on a silicon wafer and etching certain portions of the planar layers. Within silicon circuit fabrication technology, certain techniques are better known than others. For example, the techniques associated with the creation of CMOS circuits are likely to be more readily used than those associated with the creation of exotic circuits including ferroelectrics, □lumini arsenide etc. Hence, it is desirable, in any MEMS constructions, to utilize well proven semi-conductor fabrication techniques which do not require any "exotic" processes or materials. Of course, a certain degree of trade off will be undertaken in that if the advantages of using the exotic material far out weighs its disadvantages then it may become desirable to utilize the material anyway. However, if it is possible to achieve the same, or similar, properties using more common materials, the problems of exotic materials can be avoided.

With a large array of ink ejection nozzles, it is desirable to provide for a highly automated form of manufacturing which results in an inexpensive production of multiple printhead devices.

Preferably, the device constructed utilizes a low amount of energy in the ejection of ink. The utilization of a low amount of energy is particularly important when a large pagewidth full color printhead is constructed having a large array of individual print ejection mechanism with each ejection mechanisms, in the worst case, being fired in a rapid sequence.

SUMMARY OF THE INVENTION

It is an object of the present invention to provide an ink ejection nozzle arrangement suitable for incorporation into an inkjet printhead arrangement for the ejection of ink on demand from a nozzle chamber in an efficient and reliable manner.

According to a first aspect, the present invention provides an ink jet printhead comprising:

a plurality of nozzles;

a bubble forming chamber corresponding to each of the nozzles respectively, the bubble forming chambers adapted to contain a bubble forming liquid; and, at least one heater element disposed in each of the bubble forming chambers respectively, the heater elements configured for thermal contact with the bubble forming liquid; such that, heating the heater element to a temperature above the boiling point of the bubble forming liquid forms a gas bubble that causes the ejection of a drop of an ejectable liquid through the nozzle corresponding to that heater element; wherein, the bubble forming chamber has a circular cross section.

By designing the bubble forming chamber with a circular cross section, it has much greater structural strength and rigidity. The circular geometry avoids areas of high stress concentration that are prone to failure. The use of an inherently high strength structure allows it to use less material and have a more compact design which improves the nozzle density of the printhead. This in turn improves the printing resolution.

According to a second aspect, the present invention provides a printer system which incorporates a printhead, the printhead comprising:

a plurality of nozzles;

a bubble forming chamber corresponding to each of the nozzles respectively, the bubble forming chambers adapted to contain a bubble forming liquid; and, at least one heater element disposed in each of the bubble forming chambers respectively, the heater elements configured for thermal contact with the bubble forming liquid; such that, heating the heater element to a temperature above the boiling point of the bubble forming liquid forms a gas bubble that causes the ejection of a drop of an ejectable liquid through the nozzle corresponding to that heater element; wherein, the bubble forming chamber has a circular cross section.

According to a third aspect, the present invention provides a method of ejecting drops of an ejectable liquid from a printhead, the printhead comprising a plurality of nozzles;

a bubble forming chamber corresponding to each of the nozzles respectively, the bubble forming chambers adapted to contain a bubble forming liquid; and, at least one heater element disposed in each of the bubble forming chambers respectively, the heater elements configured for thermal contact with the bubble forming liquid; wherein, the bubble forming chamber has a circular cross section;

the method comprising the steps of:

placing the bubble forming liquid into thermal contact with the heater elements; heating the heater elements to a temperature above the boiling point of the bubble forming liquid to form a gas bubble such that a drop of an ejectable liquid is ejected through the corresponding nozzle.

Preferably, the bubble forming chamber is cylindrical. In another form, the bubble forming chamber is barrel-shaped. In yet another embodiment, the bubble forming chamber is a truncated cone shape.

BRIEF DESCRIPTION OF THE DRAWINGS

Notwithstanding any other forms that may fall within the scope of the present invention, related embodiments and preferred forms of the invention will now be described, by way of example only, with reference to the accompanying drawings in which.

DESCRIPTION OF PREFERRED AND OTHER EMBODIMENTS

Thermal Bend Actuator

In an embodiment related to the present invention, there is provided a nozzle arrangement having a nozzle chamber containing ink and a thermal bend actuator connected to a paddle positioned within the chamber. The thermal actuator device is actuated so as to eject ink from the nozzle chamber. The preferred embodiment includes a particular thermal bend actuator which includes a series of tapered portions for providing conductive heating of a conductive trace. The actuator is connected to the paddle via an arm received through a slotted wall of the nozzle chamber. The actuator arm has a mating shape so as to mate substantially with the surfaces of the slot in the nozzle chamber wall.

Figure 1:
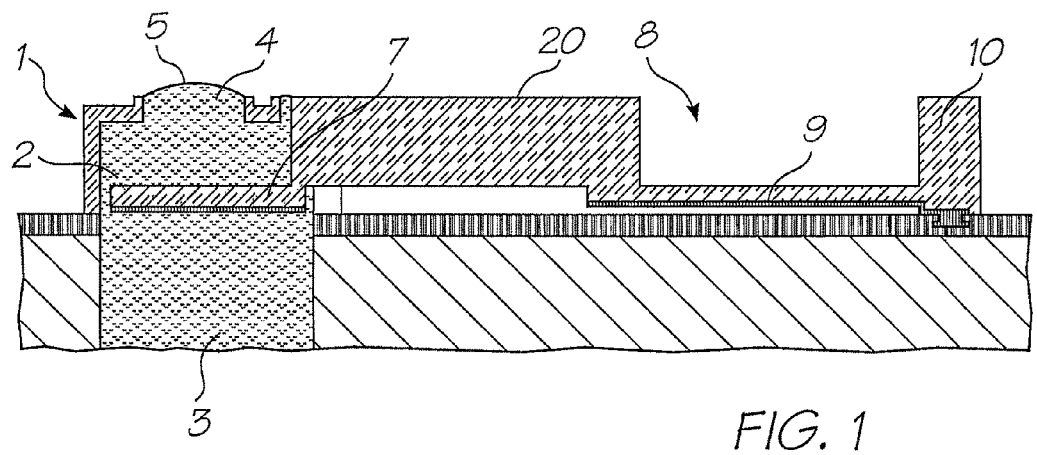
FIGS. 1-3 illustrate the basic operational principles of a related embodiment using a thermal bend actuator.
Figure 2:
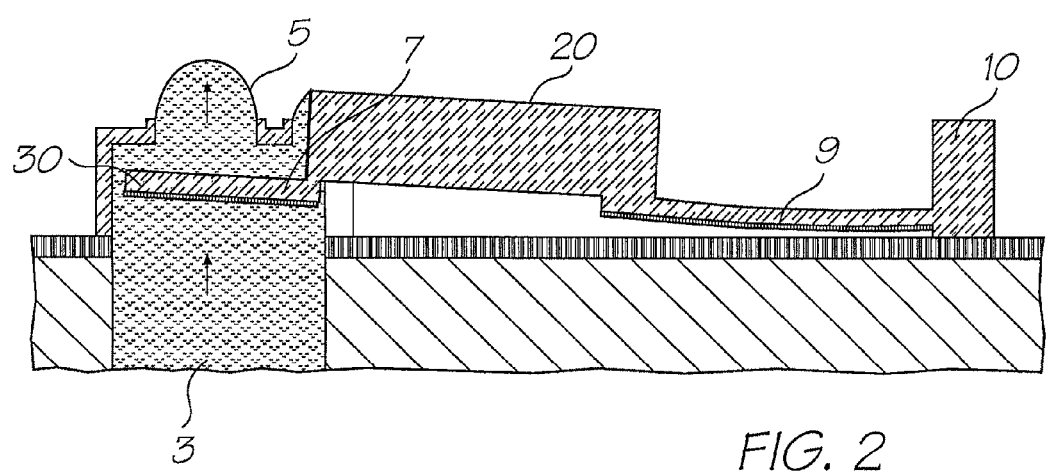
Figure 3:
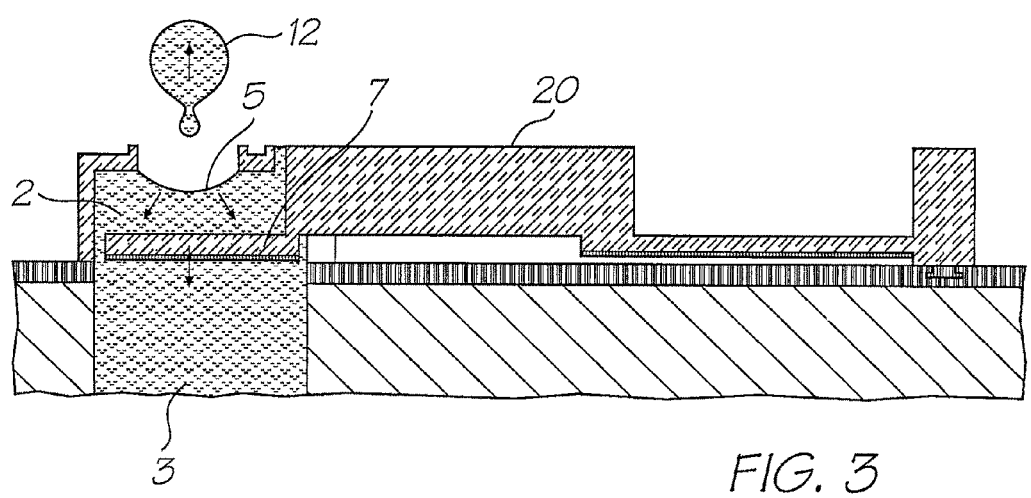

Turning initially to FIG. 1-3, there is provided schematic illustrations of the basic operation of a nozzle arrangement of this embodiment. A nozzle chamber 1 is provided filled with ink 2 by means of an ink inlet channel 3 which can be etched through a wafer substrate on which the nozzle chamber 1 rests. The nozzle chamber 1 further includes an ink ejection port 4 around which an ink meniscus forms.

Inside the nozzle chamber 1 is a paddle type device 7 which is interconnected to an actuator 8 through a slot in the wall of the nozzle chamber 1. The actuator 8 includes a heater means e.g. 9 located adjacent to an end portion of a post 10. The post 10 is fixed to a substrate.

When it is desired to eject a drop from the nozzle chamber 1, as illustrated in FIG. 2, the heater means 9 is heated so as to undergo thermal expansion. Preferably, the heater means 9 itself or the other portions of the actuator 8 are built from materials having a high bend efficiency where the bend efficiency is defined as $$\text{bend efficiency} = \frac{\text{Young's Modulus} \times (\text{Coefficient of thermal Expansion})}{\text{Density} \times \text{Specific Heat Capacity}}$$

A suitable material for the heater elements is a copper nickel alloy which can be formed so as to bend a glass material.

The heater means 9 is ideally located adjacent the end portion of the post 10 such that the effects of activation are magnified at the paddle end 7 such that small thermal expansions near the post 10 result in large movements of the paddle end.

The heater means 9 and consequential paddle movement causes a general increase in pressure around the ink meniscus 5 which expands, as illustrated in FIG. 2, in a rapid manner. The heater current is pulsed and ink is ejected out of the port 4 in addition to flowing in from the ink channel 3.

Subsequently, the paddle 7 is deactivated to again return to its quiescent position. The deactivation causes a general reflow of the ink into the nozzle chamber. The forward momentum of the ink outside the nozzle rim and the corresponding backflow results in a general necking and breaking off of the drop 12 which proceeds to the print media. The collapsed meniscus 5 results in a general sucking of ink into the nozzle chamber 2 via the ink flow channel 3. In time, the nozzle chamber 1 is refilled such that the position in FIG. 1 is again reached and the nozzle chamber is subsequently ready for the ejection of another drop of ink.

Figure 4:
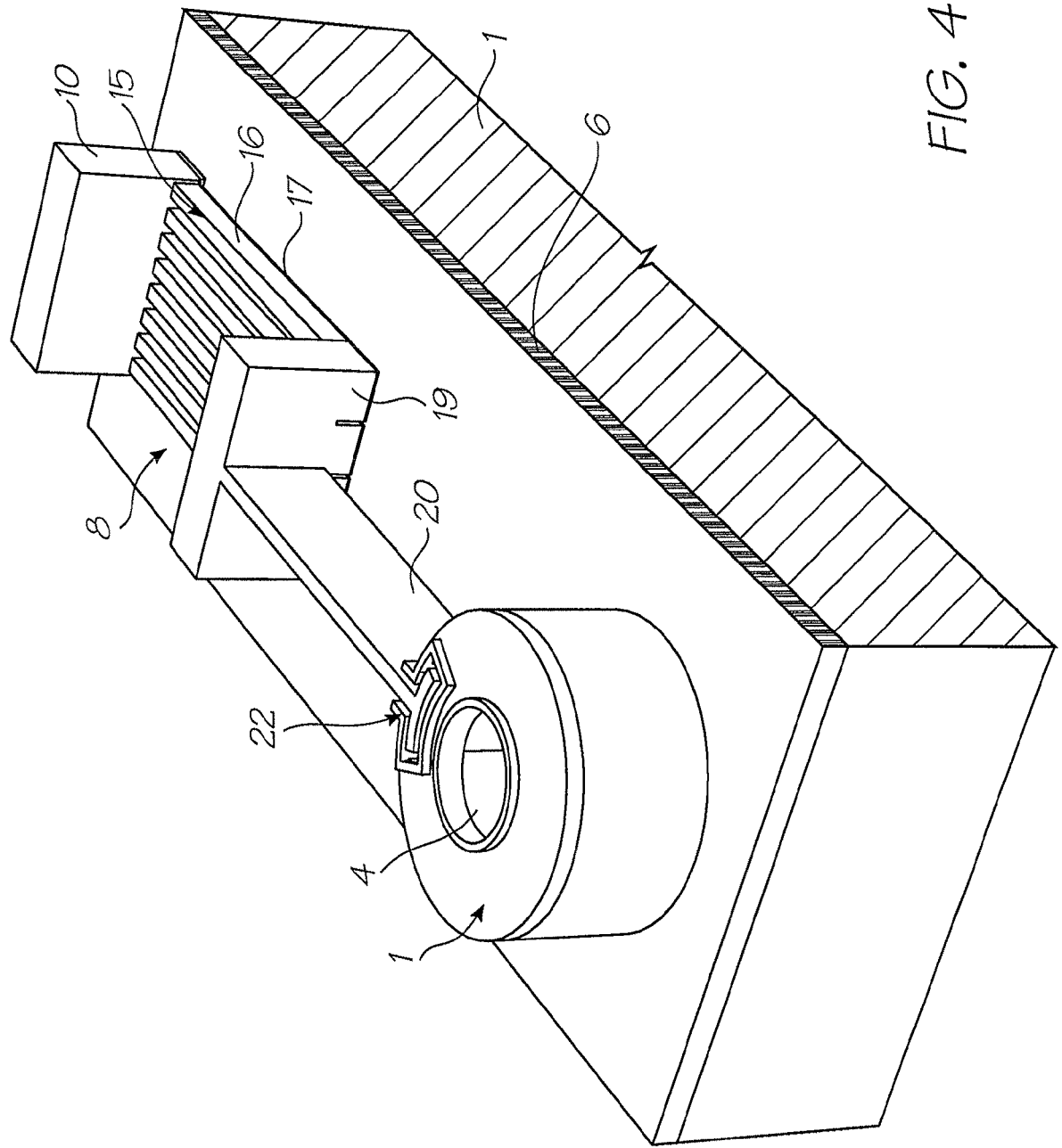
FIG. 4 illustrates a three dimensional view of a single ink jet nozzle arrangement constructed in accordance with the related embodiment of FIG. 1.
Figure 5:
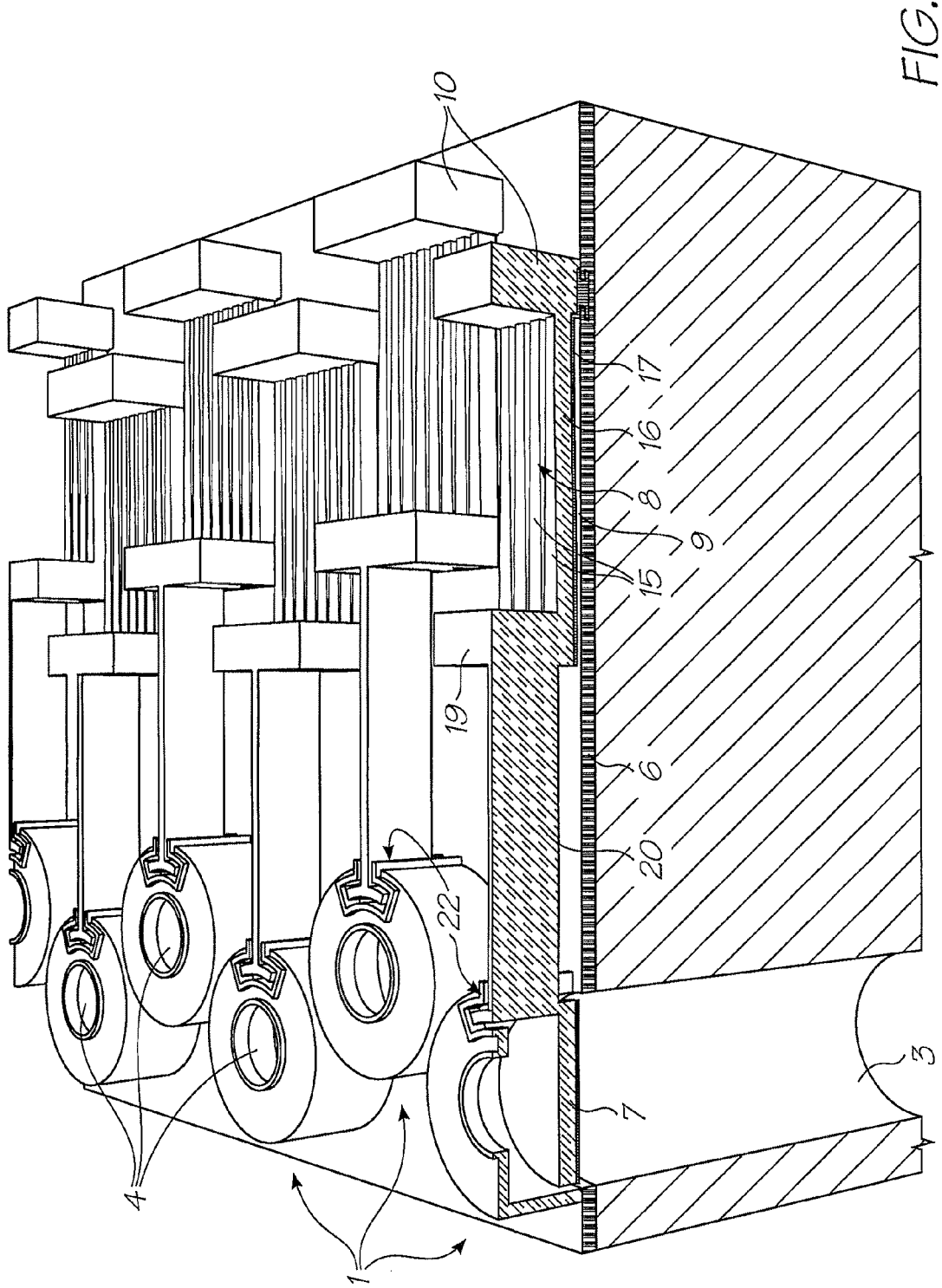
FIG. 5 illustrates an array of the nozzle arrangements of FIG. 4.
Figure 6:
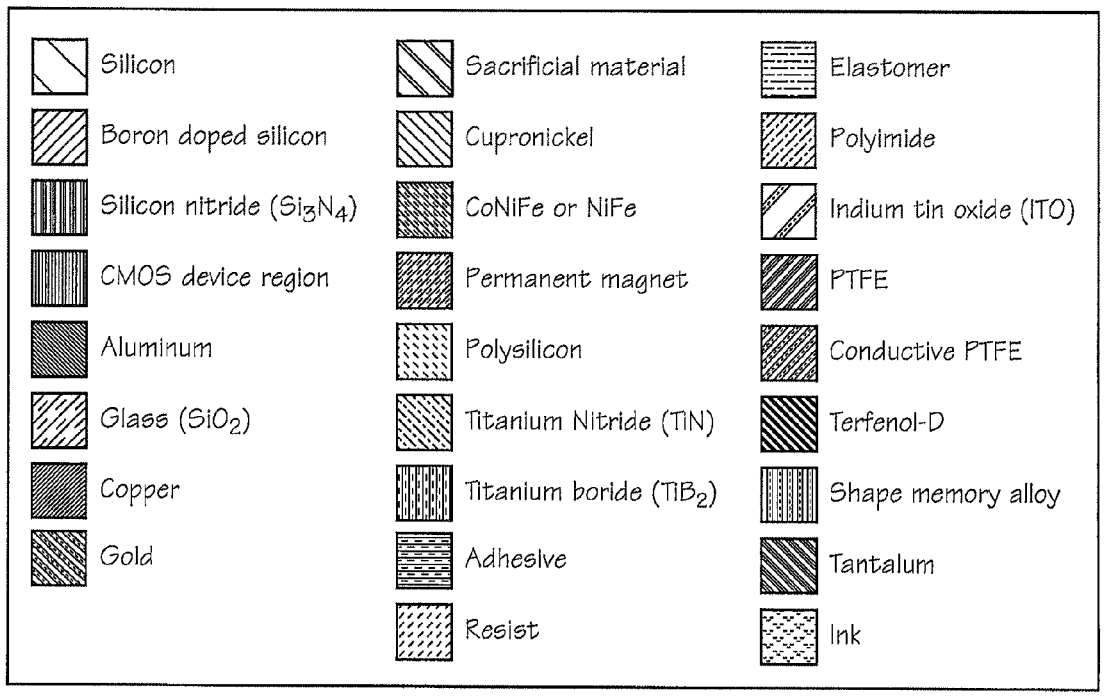
FIG. 6 shows a table to be used with reference to FIGS. 7 to 16.
Figure 7:
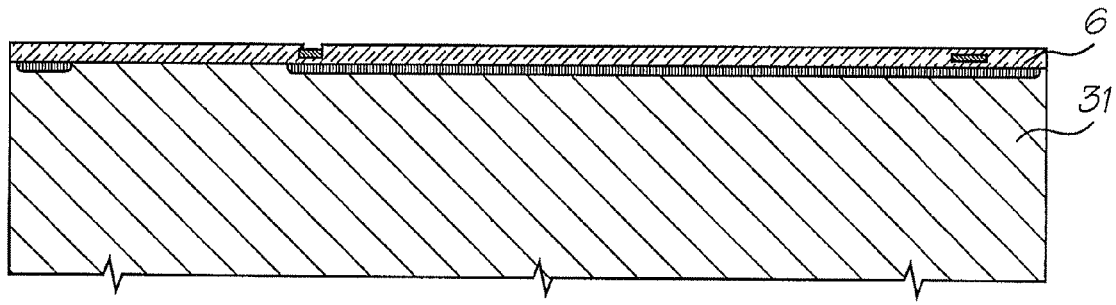
FIGS. 7 to 16 show various stages in the manufacture of the ink jet nozzle arrangement of FIG. 4.
Figure 8:
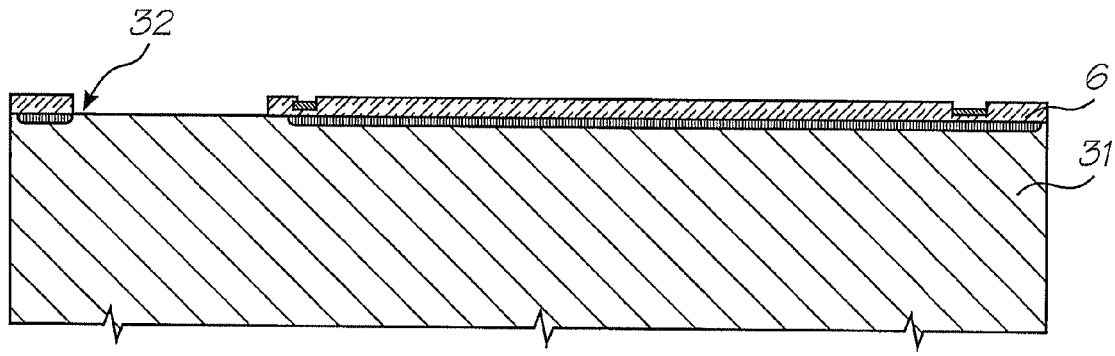
Figure 9:
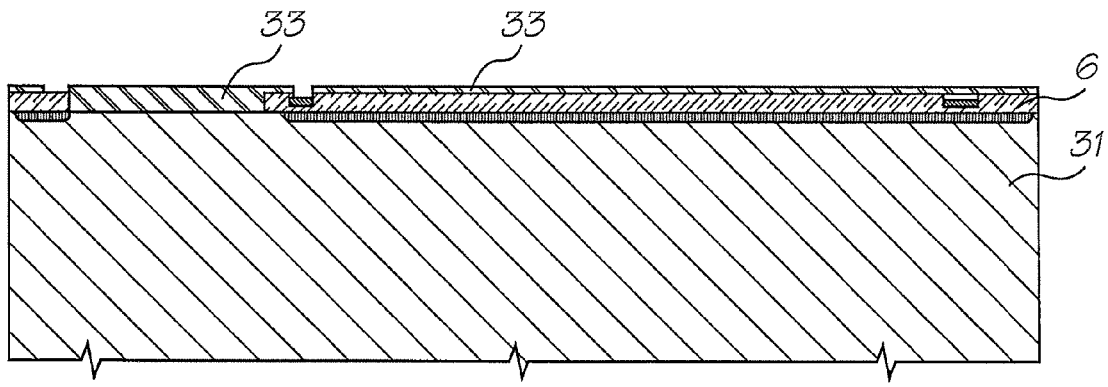
Figure 10:
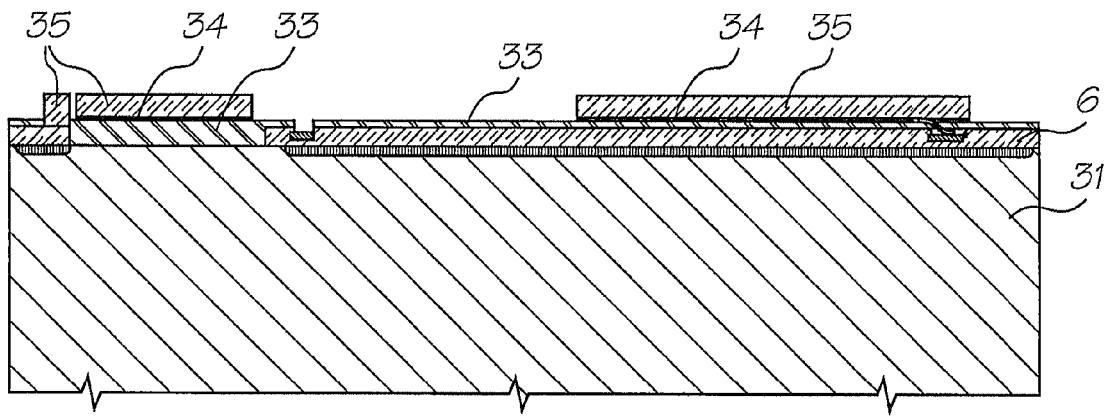
Figure 11:
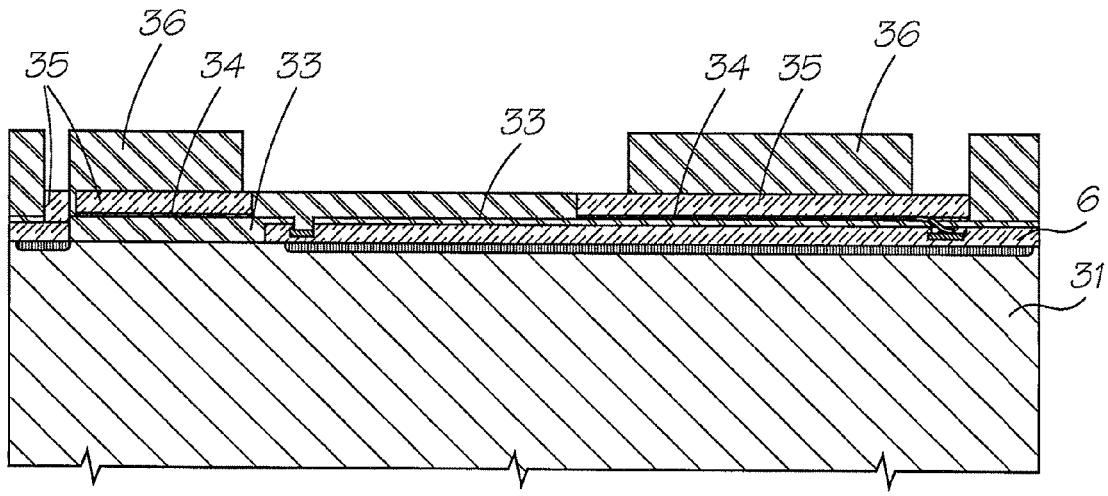
Figure 12:
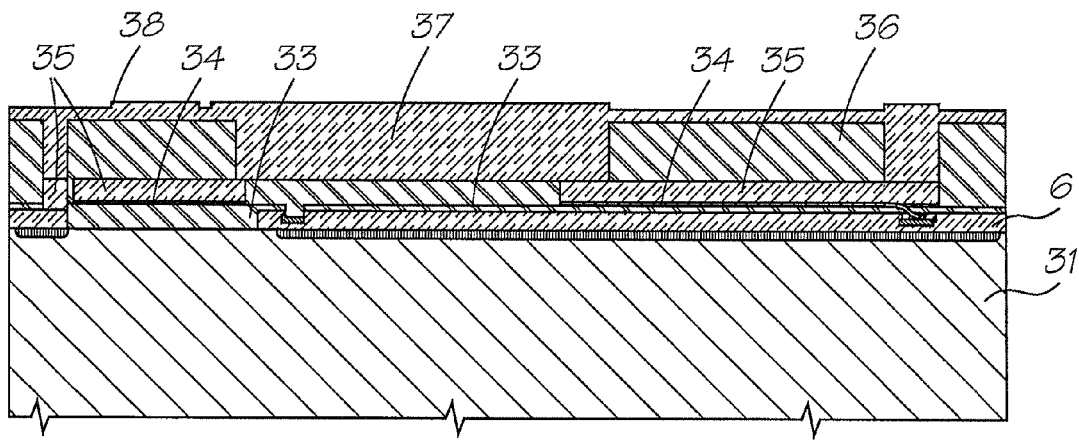
Figure 13:
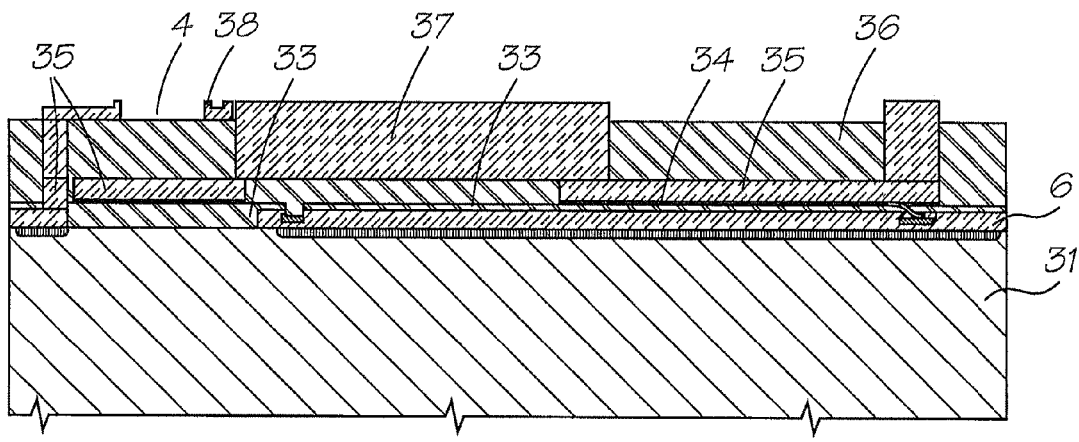
Figure 14:
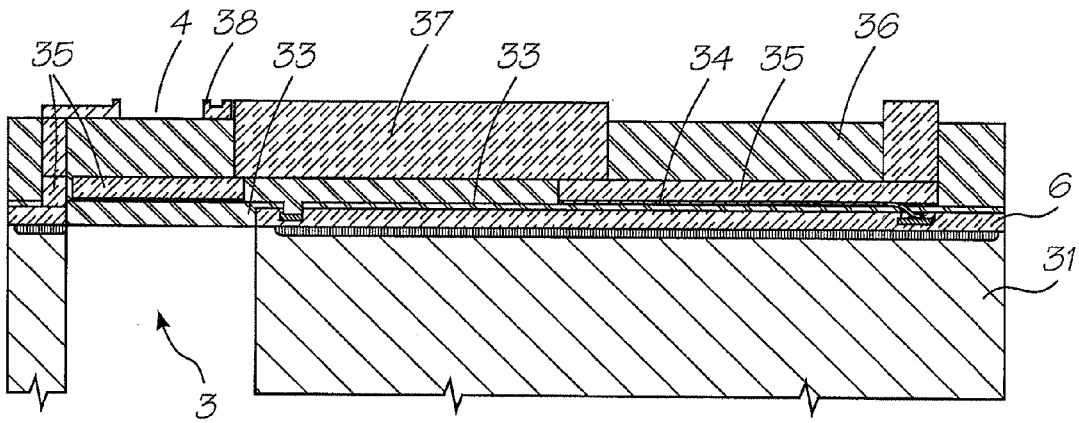
Figure 15:
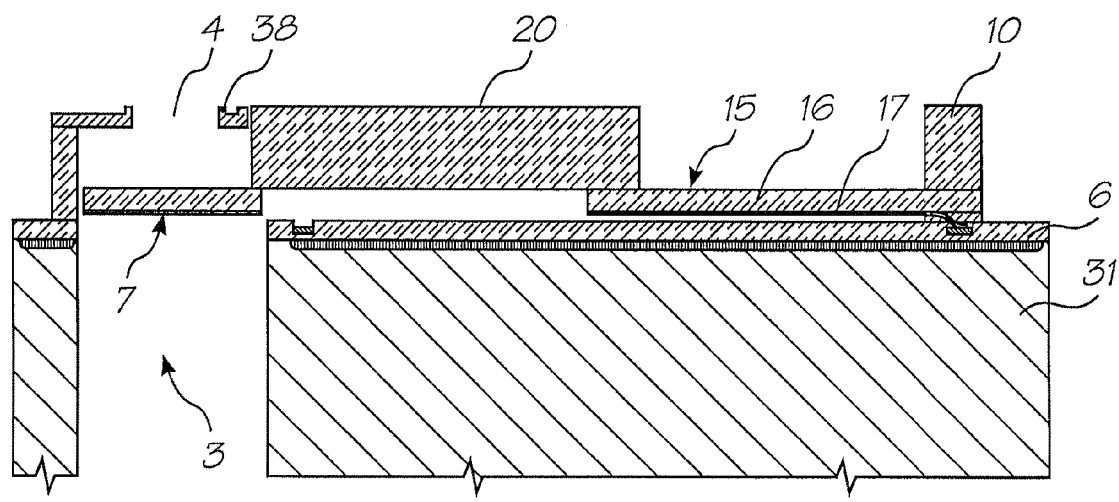
Figure 16:
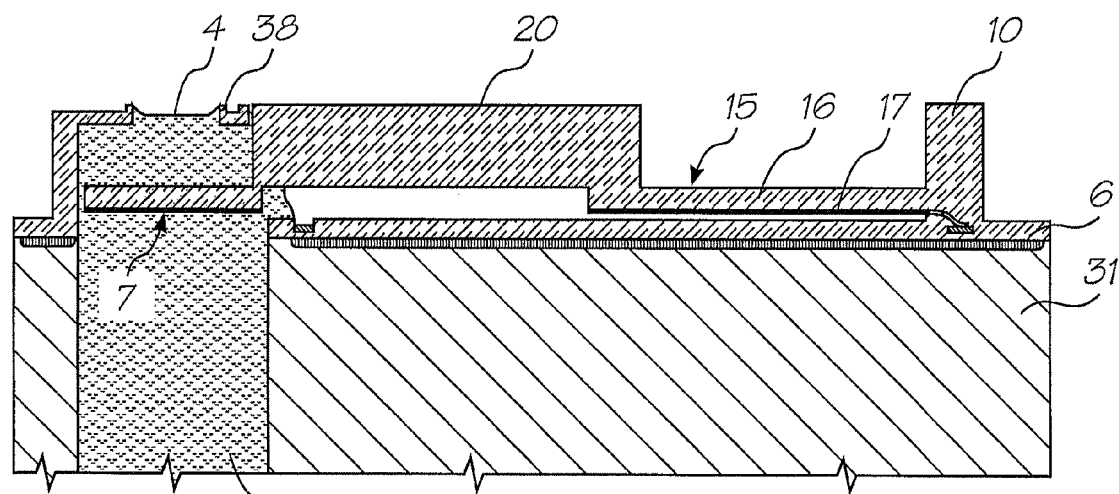

FIG. 4 illustrates a side perspective view of the nozzle arrangement FIG. 5 illustrates sectional view through an array of nozzle arrangement of FIG. 4. In these figures, the numbering of elements previously introduced has been retained.

Firstly, the actuator 8 includes a series of tapered actuator units e.g. 15 which comprise an upper glass portion (amorphous silicon dioxide) 16 formed on top of a titanium nitride layer 17. Alternatively a copper nickel alloy layer (hereinafter called cupronickel) can be utilized which will have a higher bend efficiency where bend efficiency is defined as:

$$\text{bend efficiency} = \frac{\text{Young's Modulus} \times (\text{Coefficient of thermal Expansion})}{\text{Density} \times \text{Specific Heat Capacity}}$$

The titanium nitride layer 17 is in a tapered form and, as such, resistive heating takes place near an end portion of the post 10. Adjacent titanium nitride/glass portions 15 are interconnected at a block portion 19 which also provides a mechanical structural support for the actuator 8.

The heater means 9 ideally includes a plurality of the tapered actuator unit 15 which are elongate and spaced apart such that, upon heating, the bending force exhibited along the axis of the actuator 8 is maximized. Slots are defined between adjacent tapered units 15 and allow for slight differential operation of each actuator 8 with respect to adjacent actuators 8.

The block portion 19 is interconnected to an arm 20. The arm 20 is in turn connected to the paddle 7 inside the nozzle chamber 1 by means of a slot e.g. 22 formed in the side of the nozzle chamber 1. The slot 22 is designed generally to mate with the surfaces of the arm 20 so as to minimize opportunities for the outflow of ink around the arm 20. The ink is held generally within the nozzle chamber 1 via surface tension effects around the slot 22.

When it is desired to actuate the arm 20, a conductive current is passed through the titanium nitride layer 17 via vias within the block portion 19 connecting to a lower CMOS layer 6 which provides the necessary power and control circuitry for the nozzle arrangement. The conductive current results in heating of the nitride layer 17 adjacent to the post 10 which results in a general upward bending of the arm 20 and consequential ejection of ink out of the nozzle 4. The ejected drop is printed on a page in the usual manner for an inkjet printer as previously described.

An array of nozzle arrangements can be formed so as to create a single printhead. For example, in FIG. 5 there is illustrated a partly sectioned various array view which comprises multiple ink ejection nozzle arrangements of FIG. 4 laid out in interleaved lines so as to form a printhead array. Of course, different types of arrays can be formulated including full color arrays etc.

The construction of the printhead system described can proceed utilizing standard MEMS techniques through suitable modification of the steps as set out in U.S. Pat. No. 6,243,113 entitled "Image Creation Method and Apparatus (IJ 41)" to the present applicant, the contents of which are fully incorporated by cross reference.

Fabrication of the ink jet nozzle arrangement is indicated in FIGS. 7 to 16. The preferred embodiment achieves a particular balance between utilization of the standard semi-conductor processing material such as titanium nitride and glass in a MEMS process. The use of glass, or indeed any amorphous ceramic, to form the chamber is particularly beneficial. The pressure transients within the chamber can exert significant stresses on the chamber wall. Amorphous ceramics are relatively inexpensive and high strength, but also have a non-crystalline structure. Defects in a crystal structure can act as stress concentration points that are prone to failure in the cyclical loading environment of the nozzle chambers.

Obviously the skilled person may make other choices of materials and design features where the economics are justified. For example, a copper nickel alloy of 50% copper and 50% nickel may be more advantageously deployed as the conductive heating compound as it is likely to have higher levels of bend efficiency. Also, other design structures may be employed where it is not necessary to provide for such a simple form of manufacture.

Bubble Forming Heater Element Actuator

The present invention is applicable to printheads using bubble forming heater elements. FIGS. 17 to 20 show a nozzle of this type. While the fabrication of nozzles of this type is described below, the nozzles, ejection actuators, associated drive circuitry and ink supply passages is formed on and through a wafer using lithographically masked etching techniques described in great detail in U.S. Ser. No. 10/302, 274. In the interests of brevity, the disclosure of the '274 application is incorporated herein in its entirety.

With reference to FIGS. 17 to 20, the unit cell 1 of a printhead according to an embodiment of the invention comprises a nozzle plate 2 with nozzles 3 therein, the nozzles having nozzle rims 4, and apertures 5 extending through the nozzle plate. The nozzle plate 2 is plasma etched from a silicon nitride structure which is deposited, by way of chemical vapor deposition (CVD), over a sacrificial material which is subsequently etched.

The printhead also includes, with respect to each nozzle 3, side walls 6 on which the nozzle plate is supported, a chamber 7 defined by the walls and the nozzle plate 2, a multi-layer substrate 8 and an inlet passage 9 extending through the multi-layer substrate to the far side (not shown) of the substrate. A looped, elongate heater element 10 is suspended within the chamber 7, so that the element is in the form of a suspended beam. The printhead as shown is a microelectromechanical system (MEMS) structure, which is formed by a lithographic process which is described in more detail below.

Figure 17:
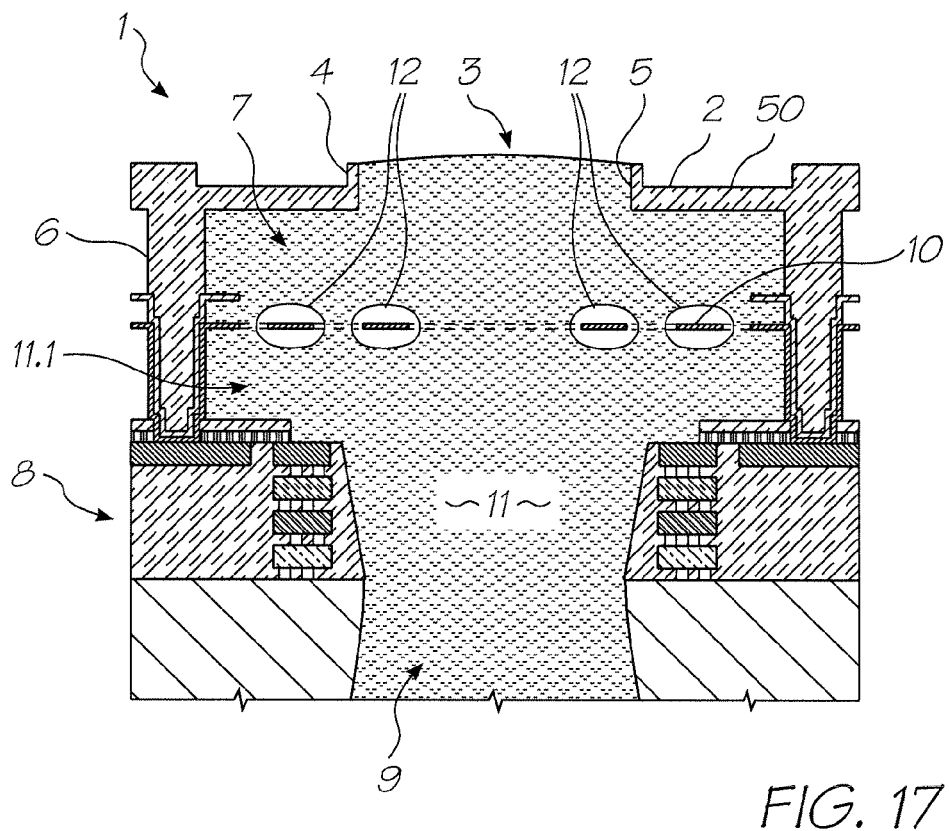
FIG. 17 is a schematic cross-sectional view through an ink chamber of a unit cell of a printhead according to a preferred embodiment of the present invention.

When the printhead is in use, ink 11 from a reservoir (not shown) enters the chamber 7 via the inlet passage 9, so that the chamber fills to the level as shown in FIG. 17. Thereafter, the heater element 10 is heated for somewhat less than 1 microsecond, so that the heating is in the form of a thermal pulse. It will be appreciated that the heater element 10 is in thermal contact with the ink 11 in the chamber 7 so that when the element is heated, this causes the generation of vapor bubbles 12 in the ink. Accordingly, the ink 11 constitutes a bubble forming liquid. FIG. 17 shows the formation of a bubble 12 approximately 1 microsecond after generation of the thermal pulse, that is, when the bubble has just nucleated on the heater elements 10. It will be appreciated that, as the heat is applied in the form of a pulse, all the energy necessary to generate the bubble 12 is to be supplied within that short time.

When the element 10 is heated as described above, the bubble 12 forms along the length of the element, this bubble appearing, in the cross-sectional view of FIG. 17, as four bubble portions, one for each of the element portions shown in cross section.

The bubble 12, once generated, causes an increase in pressure within the chamber 7, which in turn causes the ejection of a drop 16 of the ink 11 through the nozzle 3. The rim 4 assists in directing the drop 16 as it is ejected, so as to minimize the chance of drop misdirection.

The reason that there is only one nozzle 3 and chamber 7 per inlet passage 9 is so that the pressure wave generated within the chamber, on heating of the element 10 and forming of a bubble 12, does not affect adjacent chambers and their corresponding nozzles. As discussed above in relation to the related embodiment, the pressure wave generated within the chamber creates significant stresses in the chamber wall. By designing the chamber 7 with a circular cross section, it has much greater structural strength and rigidity. The circular geometry avoids stress concentration points that weaken the structure and may eventually lead to failure. The use of an inherently high strength structure allows the use of less material that in turn provides a more compact and a greater nozzle density on the printhead. This in turn improves the printing resolution. Furthermore, forming the chamber from an amorphous ceramic such as silicon nitride, silicon dioxide (glass) or silicon oxynitride, gives the chamber walls high strength while avoiding the use of material with a crystal structure. Crystalline defects can act as stress concentration points and therefore potential areas of weakness and ultimately failure.

Figure 18:
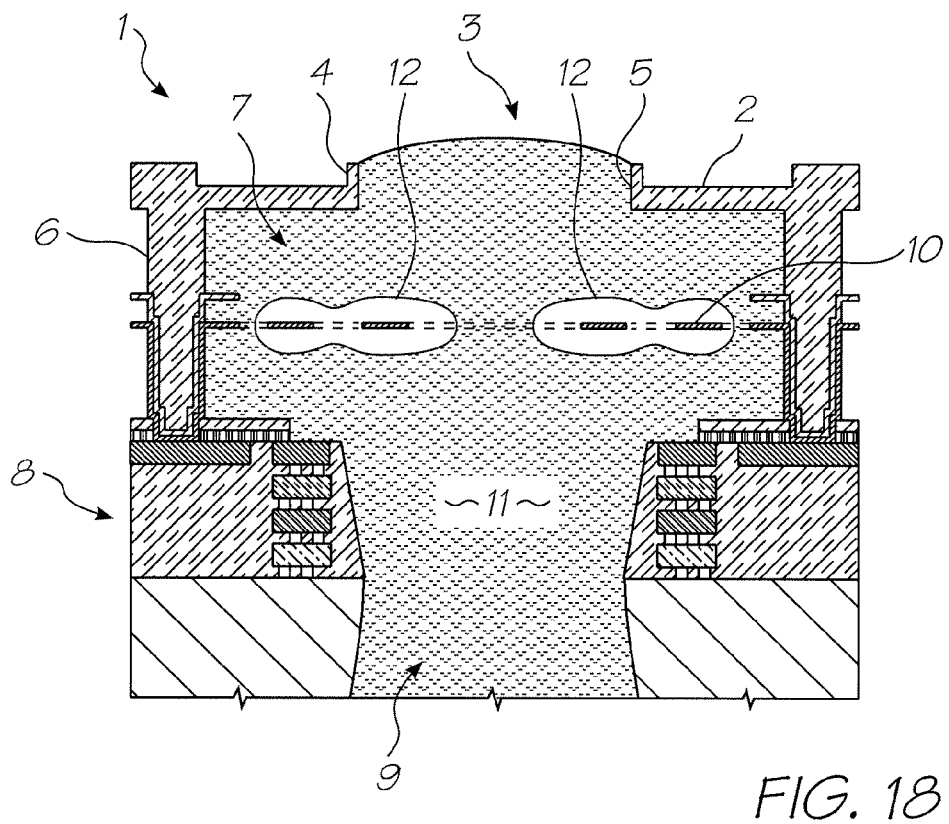
FIG. 18 is a schematic cross-sectional view through the ink chamber FIG. 17, at another stage of operation.
Figure 19:
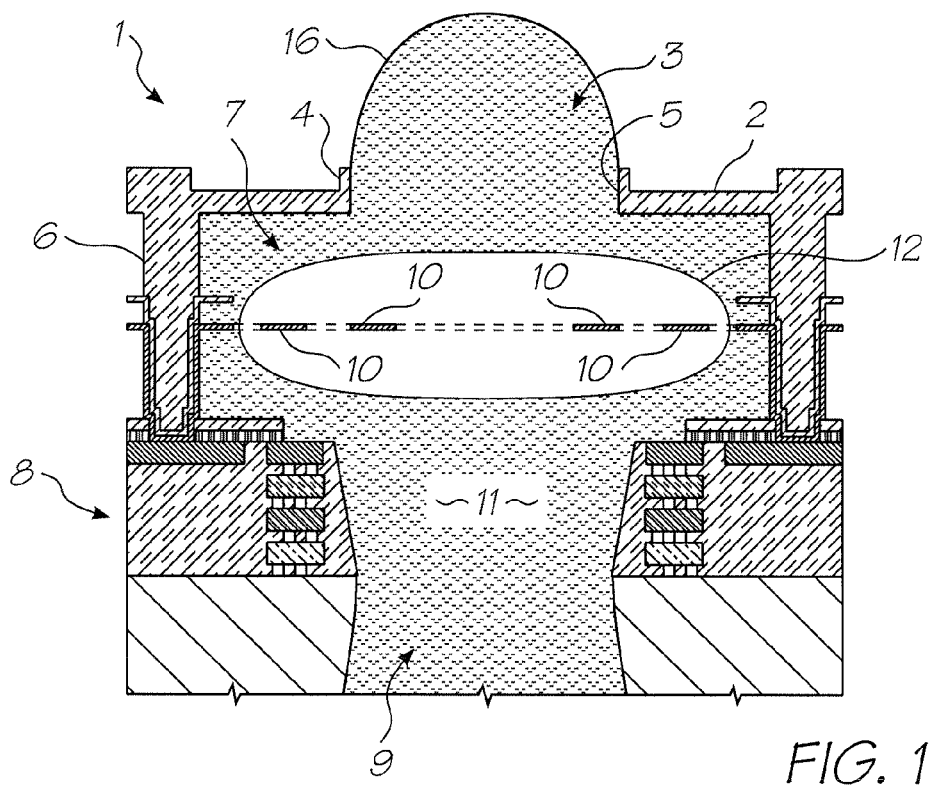
FIG. 19 is a schematic cross-sectional view through the ink chamber FIG. 17, at yet another stage of operation.

FIGS. 18 and 19 show the unit cell 1 at two successive later stages of operation of the printhead. It can be seen that the bubble 12 generates further, and hence grows, with the resultant advancement of ink 11 through the nozzle 3. The shape of the bubble 12 as it grows, as shown in FIG. 3, is determined by a combination of the inertial dynamics and the surface tension of the ink 11. The surface tension tends to minimize the surface area of the bubble 12 so that, by the time a certain amount of liquid has evaporated, the bubble is essentially disk-shaped.

The increase in pressure within the chamber 7 not only pushes ink 11 out through the nozzle 3, but also pushes some ink back through the inlet passage 9. However, the inlet passage 9 is approximately 200 to 300 microns in length, and is only approximately 16 microns in diameter. Hence there is a substantial viscous drag. As a result, the predominant effect of the pressure rise in the chamber 7 is to force ink out through the nozzle 3 as an ejected drop 16, rather than back through the inlet passage 9.

Figure 20:
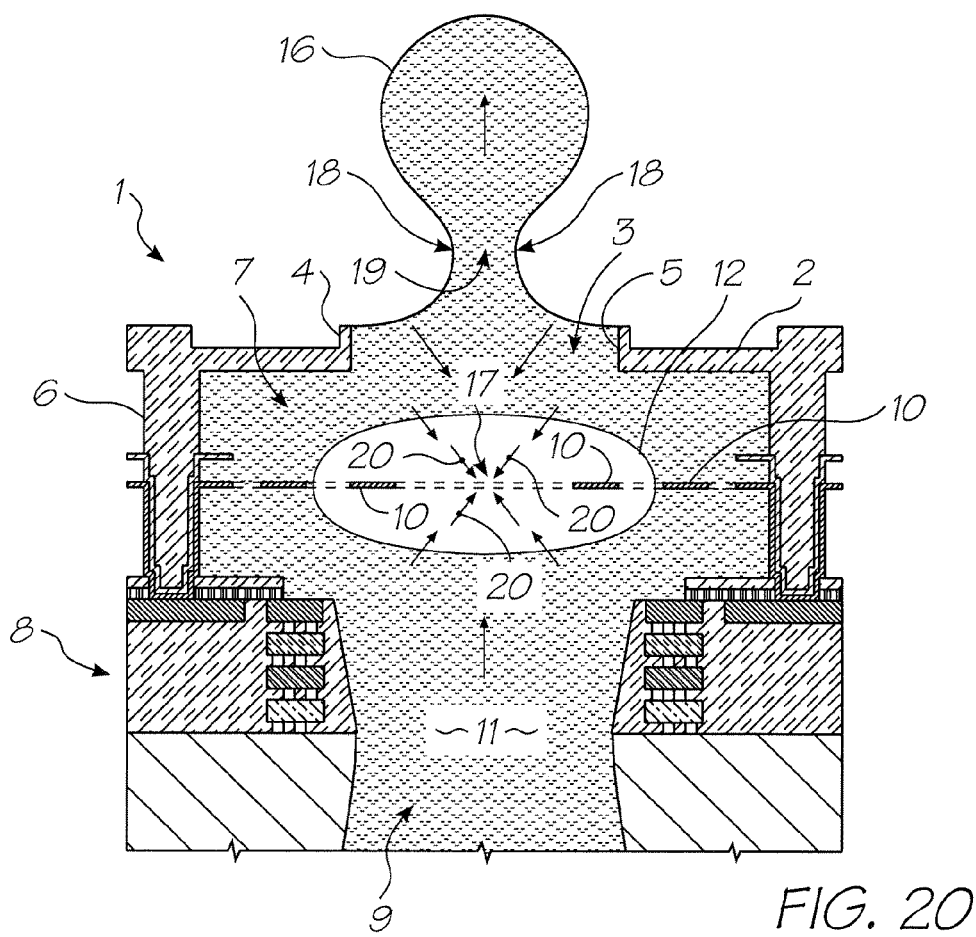
FIG. 20 is a schematic cross-sectional view through the ink chamber FIG. 17, at yet a further stage of operation.
Figure 21:
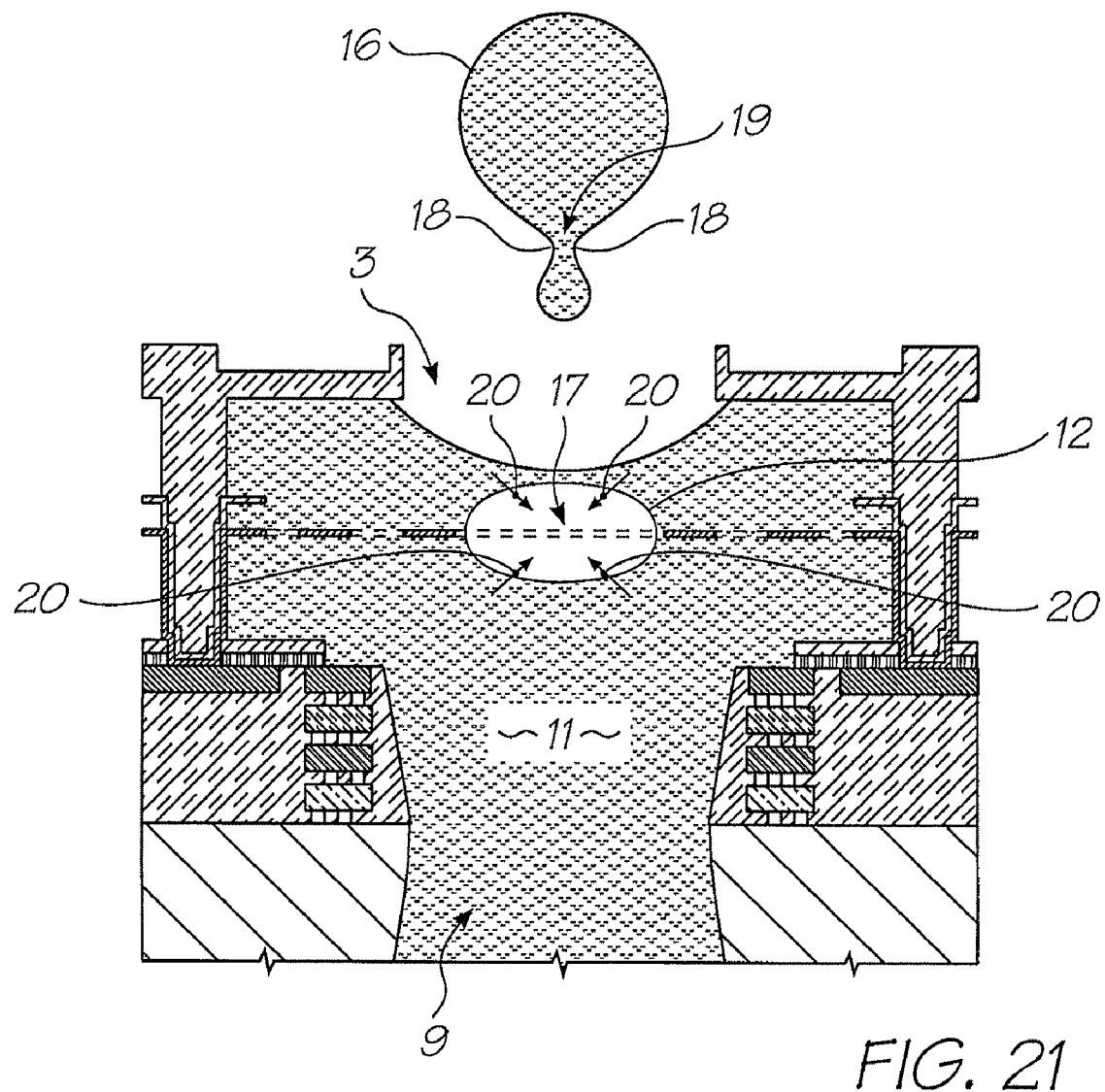
FIG. 21 is a diagrammatic cross-sectional view through a unit cell of a printhead in accordance with an embodiment of the invention showing the collapse of a vapor bubble.

Turning now to FIG. 20, the printhead is shown at a still further successive stage of operation, in which the ink drop 16 that is being ejected is shown during its "necking phase" before the drop breaks off. At this stage, the bubble 12 has already reached its maximum size and has then begun to collapse towards the point of collapse 17, as reflected in more detail in FIG. 21.

The collapsing of the bubble 12 towards the point of collapse 17 causes some ink 11 to be drawn from within the nozzle 3 (from the sides 18 of the drop), and some to be drawn from the inlet passage 9, towards the point of collapse. Most of the ink 11 drawn in this manner is drawn from the nozzle 3, forming an annular neck 19 at the base of the drop 16 prior to its breaking off.

The drop 16 requires a certain amount of momentum to overcome surface tension forces, in order to break off. As ink 11 is drawn from the nozzle 3 by the collapse of the bubble 12, the diameter of the neck 19 reduces thereby reducing the amount of total surface tension holding the drop, so that the momentum of the drop as it is ejected out of the nozzle is sufficient to allow the drop to break off.

When the drop 16 breaks off, cavitation forces are caused as reflected by the arrows 20, as the bubble 12 collapses to the point of collapse 17. It will be noted that there are no solid surfaces in the vicinity of the point of collapse 17 on which the cavitation can have an effect.

Features and Advantages of Further Embodiments

FIGS. 22 to 45 show further embodiments of unit cells 1 for thermal inkjet printheads, each embodiment having its own particular functional advantages. These advantages will be discussed in detail below, with reference to each individual embodiment. However, the basic construction of each embodiment is best shown in FIGS. 23, 25, 27 and 30. The manufacturing process is substantially the same as that described above in relation to FIGS. 6 to 31 of the above referenced U.S. Ser. No. 10/302,274 (incorporated herein by cross reference). For consistency, the same reference numerals are used in FIGS. 22 to 45 to indicate corresponding components. In the interests of brevity, the fabrication stages have been shown for the unit cell of FIG. 29 only (see FIGS. 31 to 41). It will be appreciated that the other unit cells will use the same fabrication stages with different masking. Again, the deposition of successive layers shown in FIGS. 31 to 41 need not be described in detail below given that the lithographic process largely corresponds to that shown in FIGS. 6 to 31 in U.S. Ser. No. 10/302,274.

Figure 22:
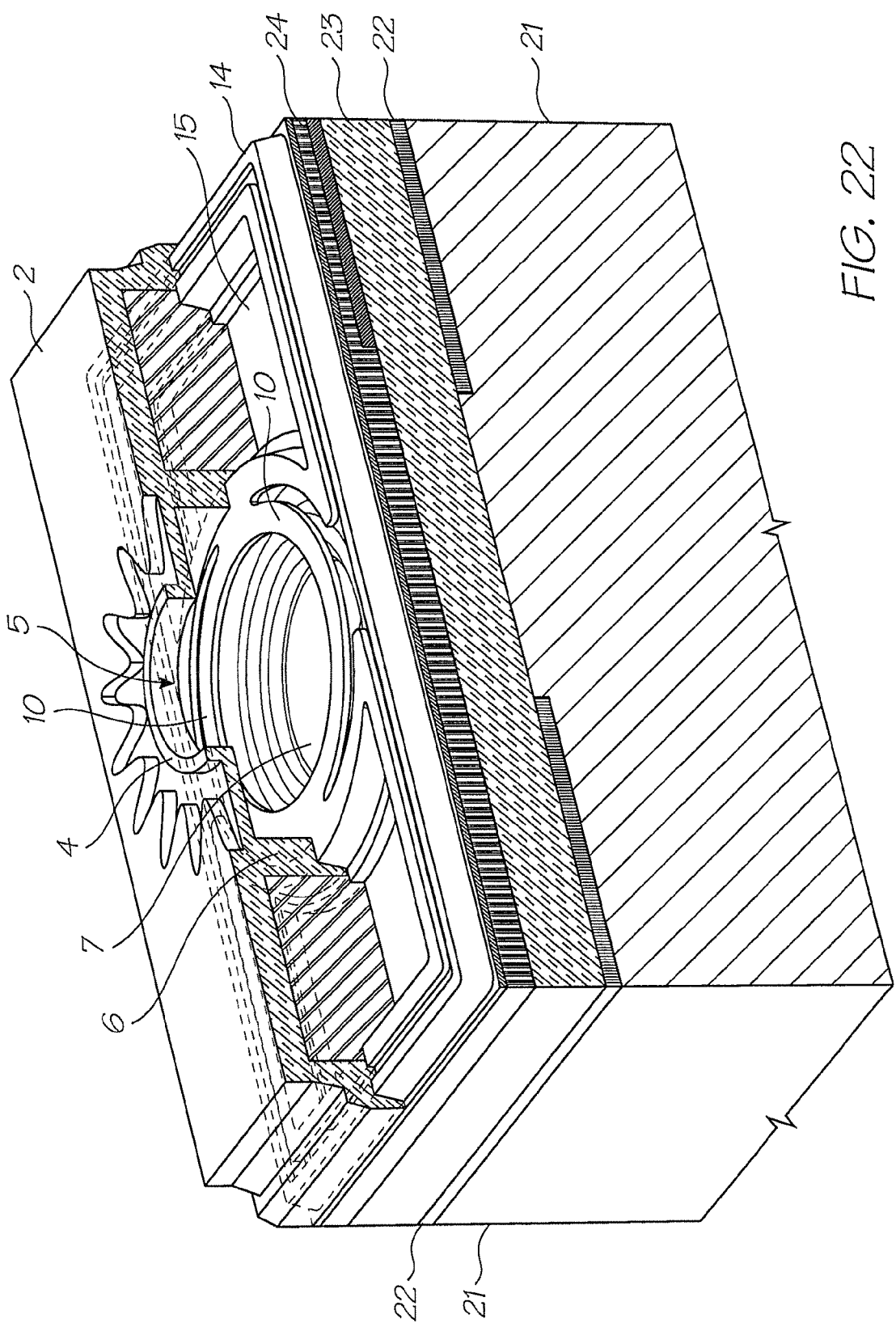
FIG. 22 is a schematic, partially cut away, perspective view of a further embodiment of a unit cell of a printhead.
Figure 23:
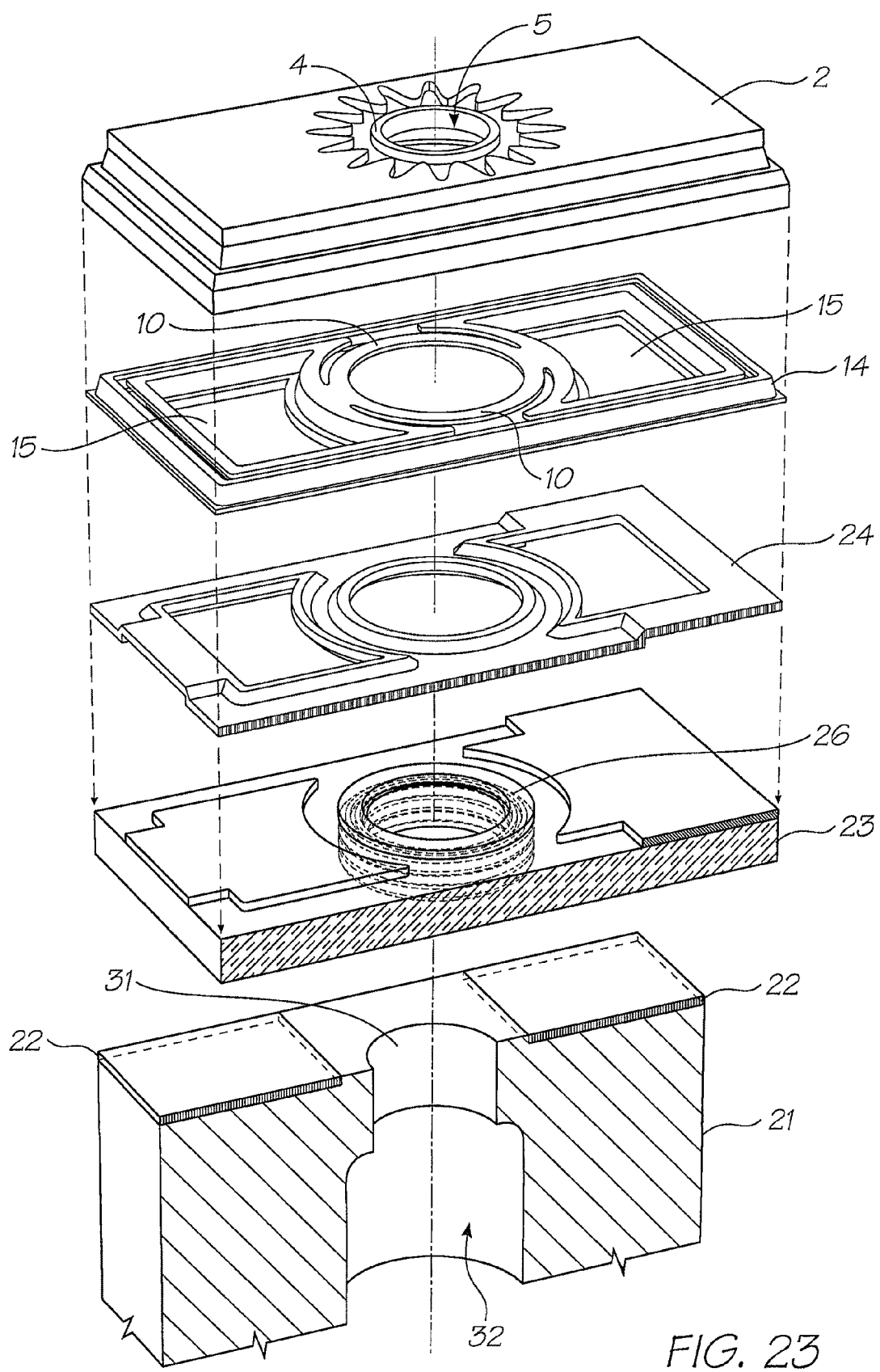
FIG. 23 is a schematic, partially cut away, exploded perspective view of the unit cell of FIG. 22.

Referring to FIGS. 22 and 23, the unit cell 1 shown has the chamber 7, ink supply passage 32 and the nozzle rim 4 positioned midway along the length of the unit cell 1. As best seen in FIG. 23, the drive circuitry is partially on one side of the chamber 7 with the remainder on the opposing side of the chamber. The drive circuitry 22 controls the operation of the heater 14 through vias in the integrated circuit metallisation layers of the interconnect 23. The interconnect 23 has a raised metal layer on its top surface. Passivation layer 24 is formed in top of the interconnect 23 but leaves areas of the raised metal layer exposed. Electrodes 15 of the heater 14 contact the exposed metal areas to supply power to the element 10.

Alternatively, the drive circuitry 22 for one unit cell is not on opposing sides of the heater element that it controls. All the drive circuitry 22 for the heater 14 of one unit cell is in a single, undivided area that is offset from the heater. That is, the drive circuitry 22 is partially overlaid by one of the electrodes 15 of the heater 14 that it is controlling, and partially overlaid by one or more of the heater electrodes 15 from adjacent unit cells. In this situation, the center of the drive circuitry 22 is less than 200 microns from the center of the associate nozzle aperture 5. In most Memjet printheads of this type, the offset is less than 100 microns and in many cases less than 50 microns, preferably less than 30 microns.

Configuring the nozzle components so that there is significant overlap between the electrodes and the drive circuitry provides a compact design with high nozzle density (nozzles per unit area of the nozzle plate 2). This also improves the efficiency of the printhead by shortening the length of the conductors from the circuitry to the electrodes. The shorter conductors have less resistance and therefore dissipate less energy.

Figure 30:
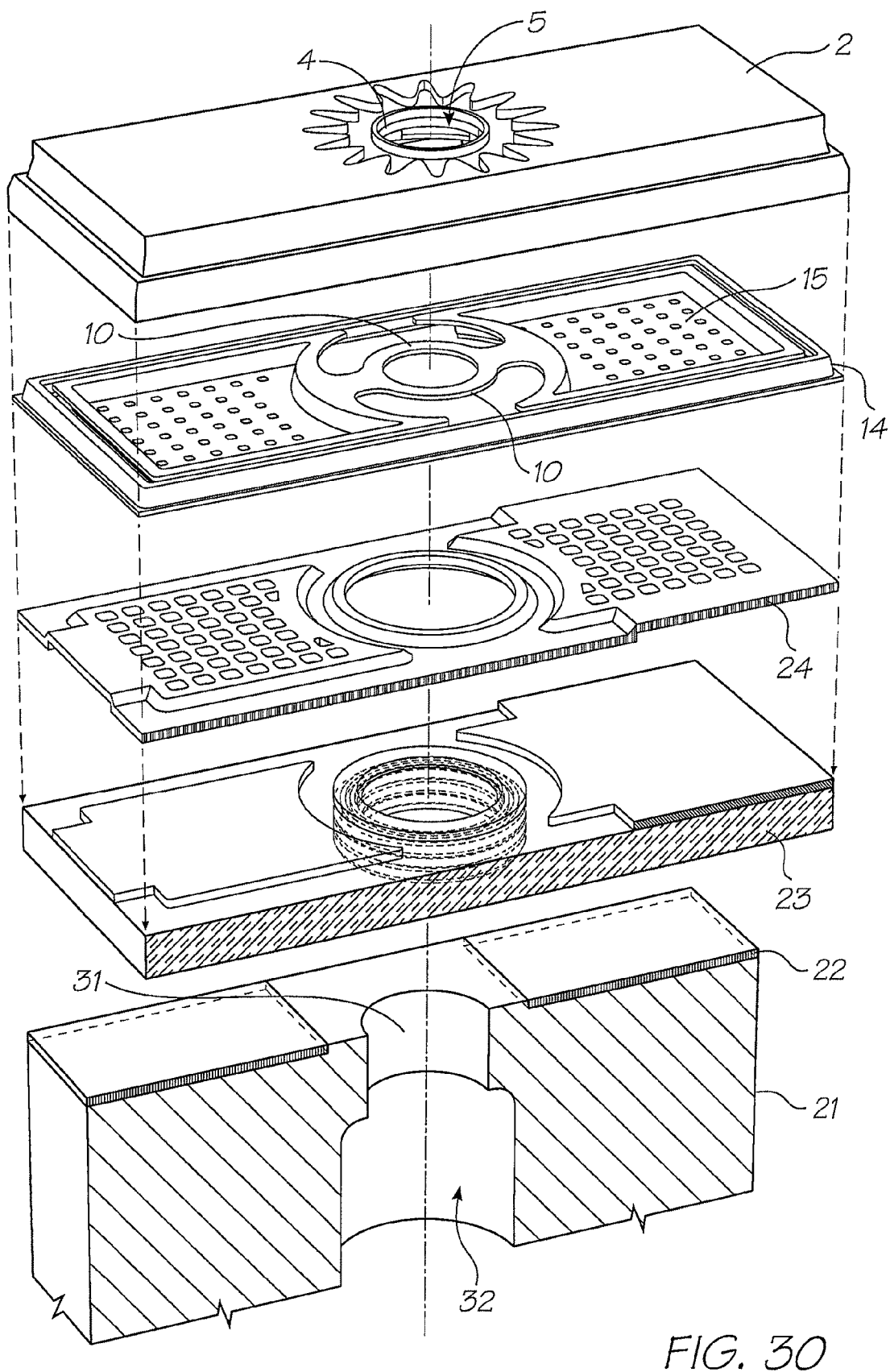
FIG. 30 is a schematic, partially cut away, exploded perspective view of the unit cell of FIG. 29.
Figure 31:
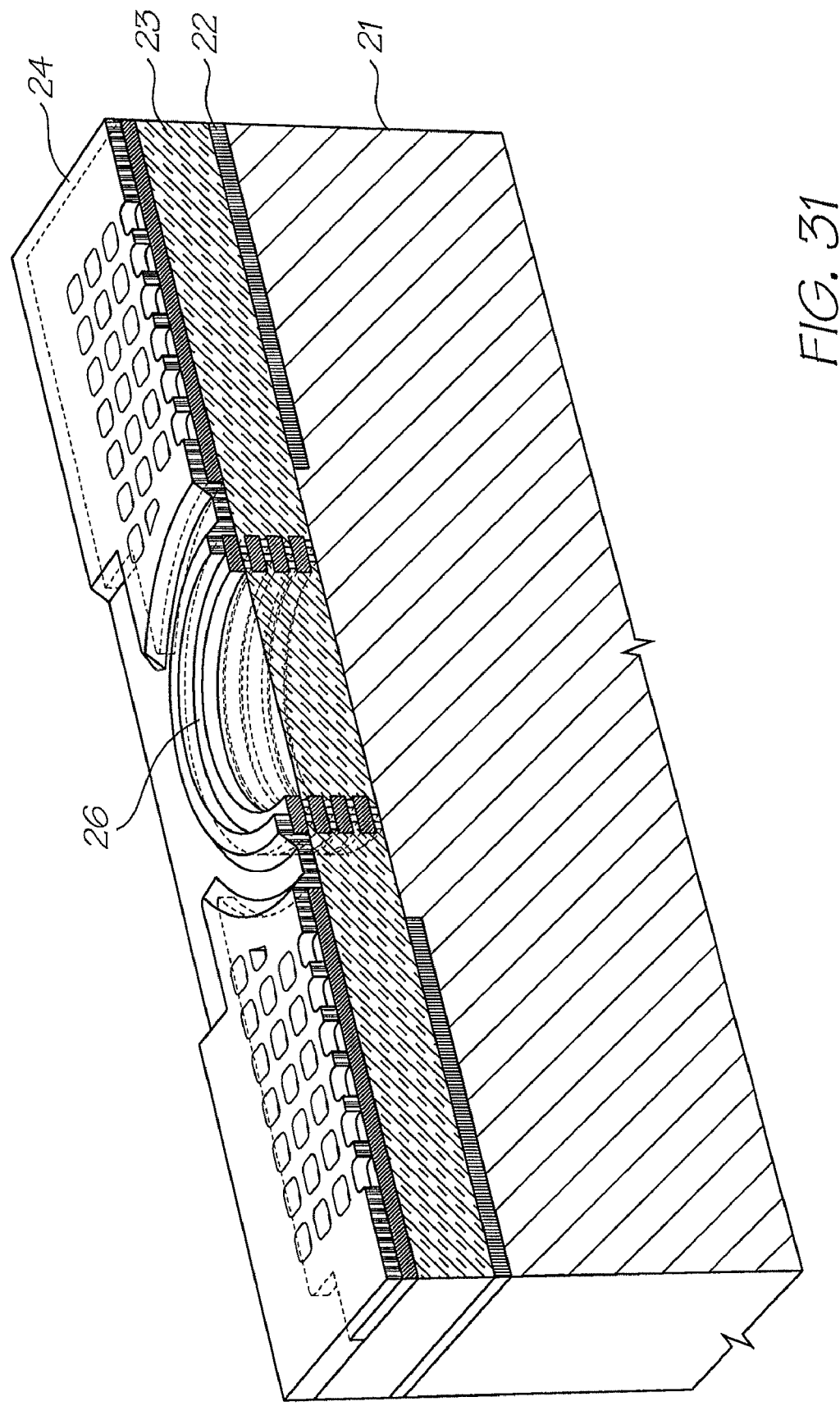
FIGS. 31 to 41 are schematic perspective views of the unit cell shown in FIGS. 29 and 30, at various successive stages in the production process of the printhead.
Figure 32:
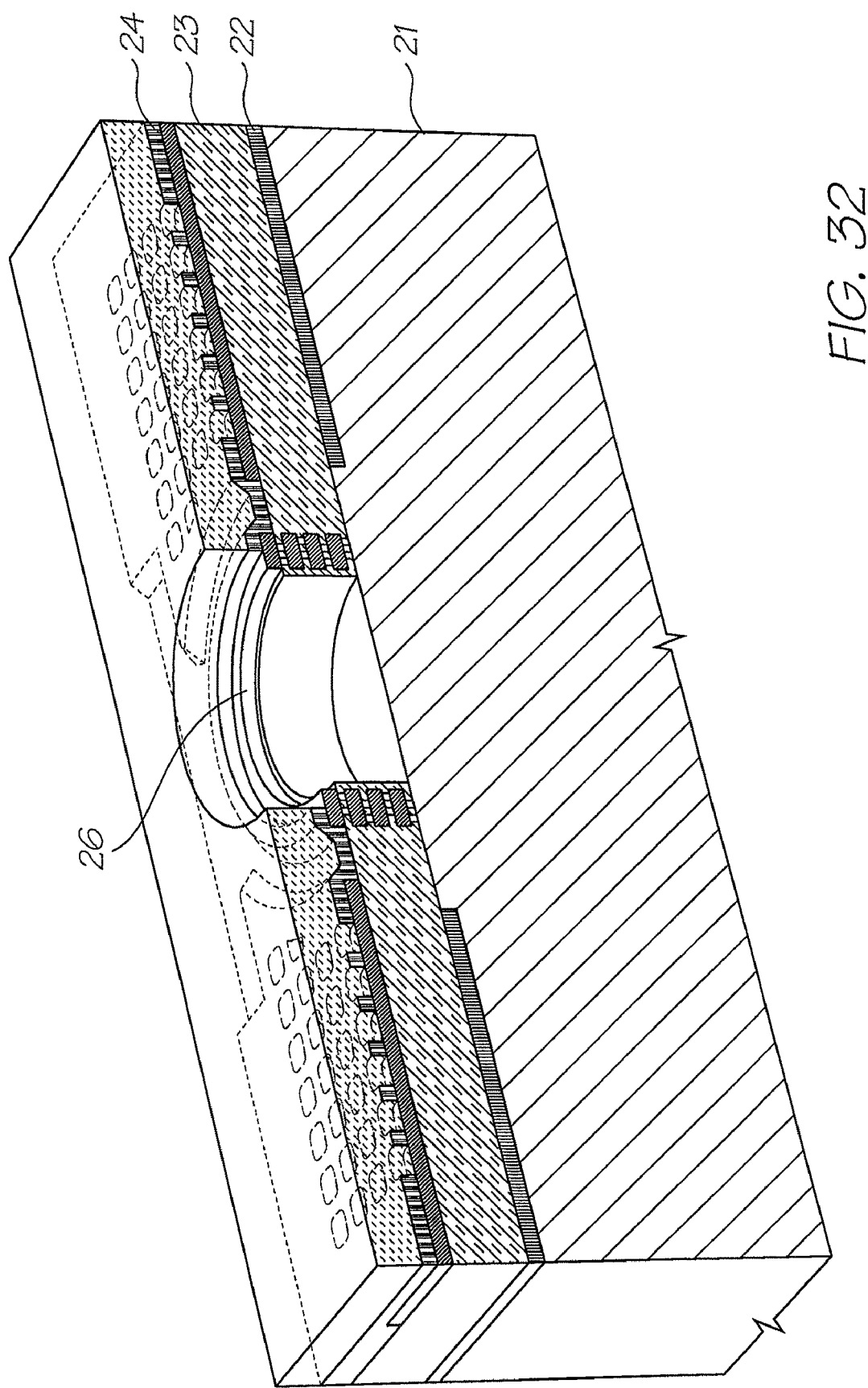
Figure 33:
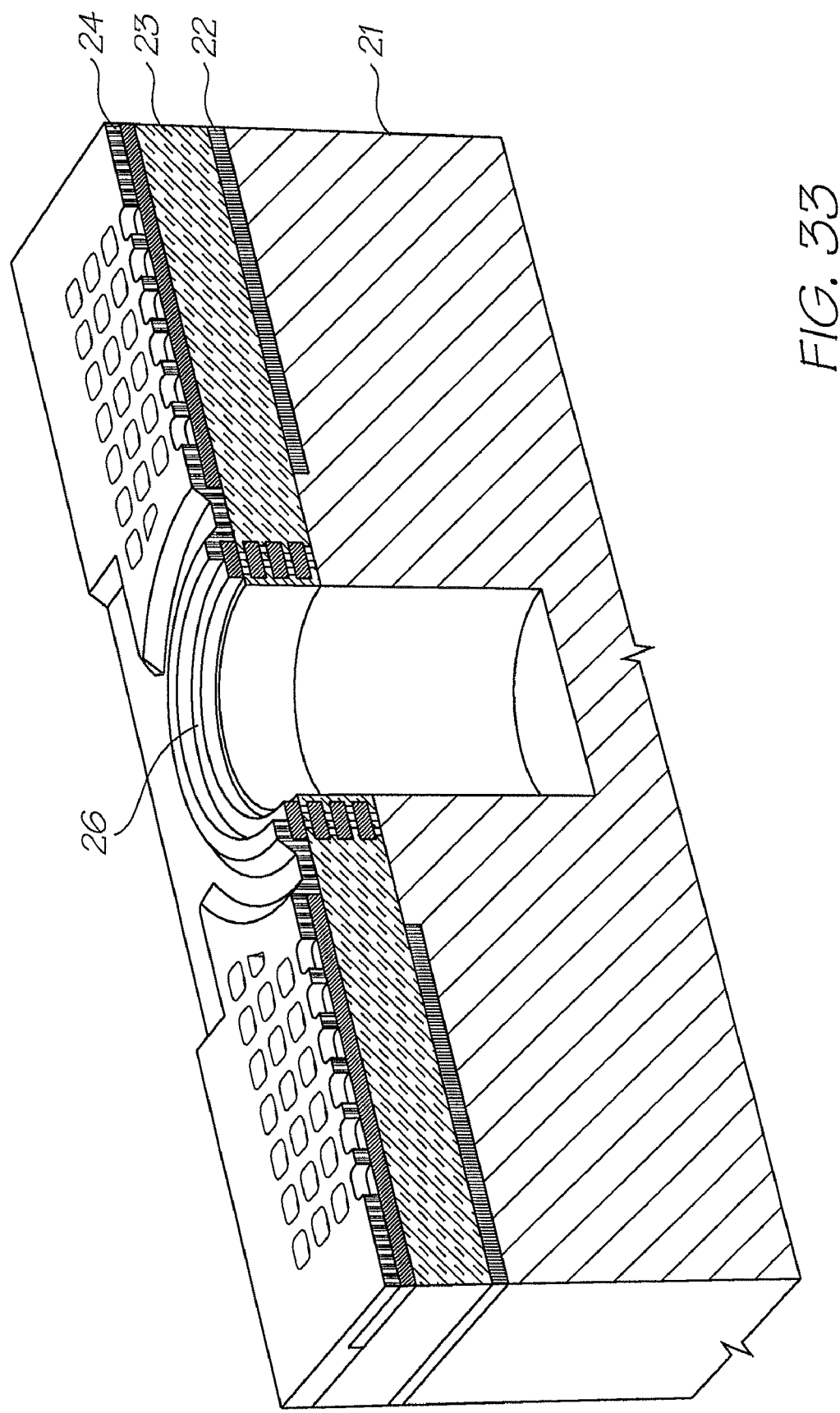
Figure 34:
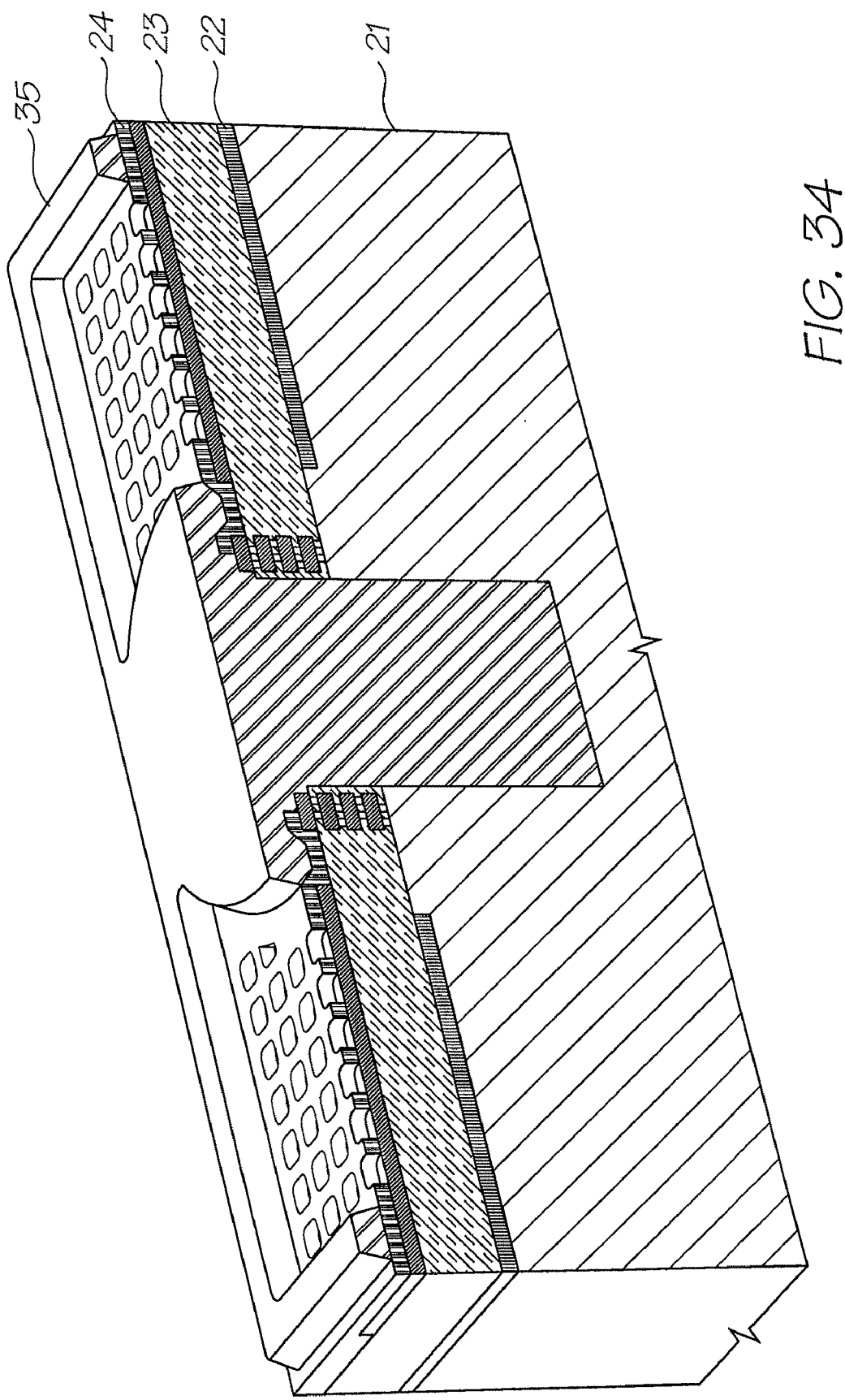
Figure 35:
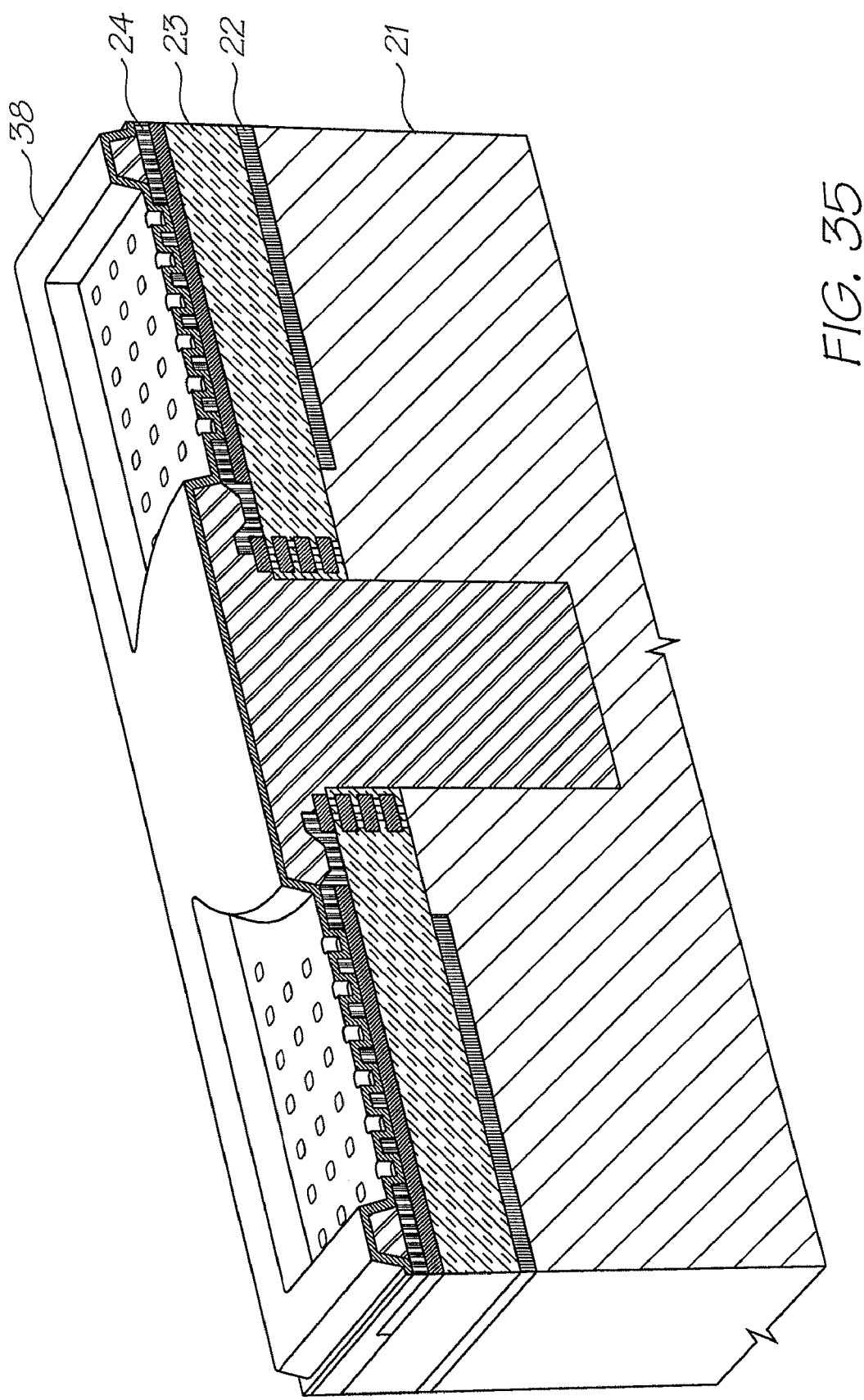
Figure 36:
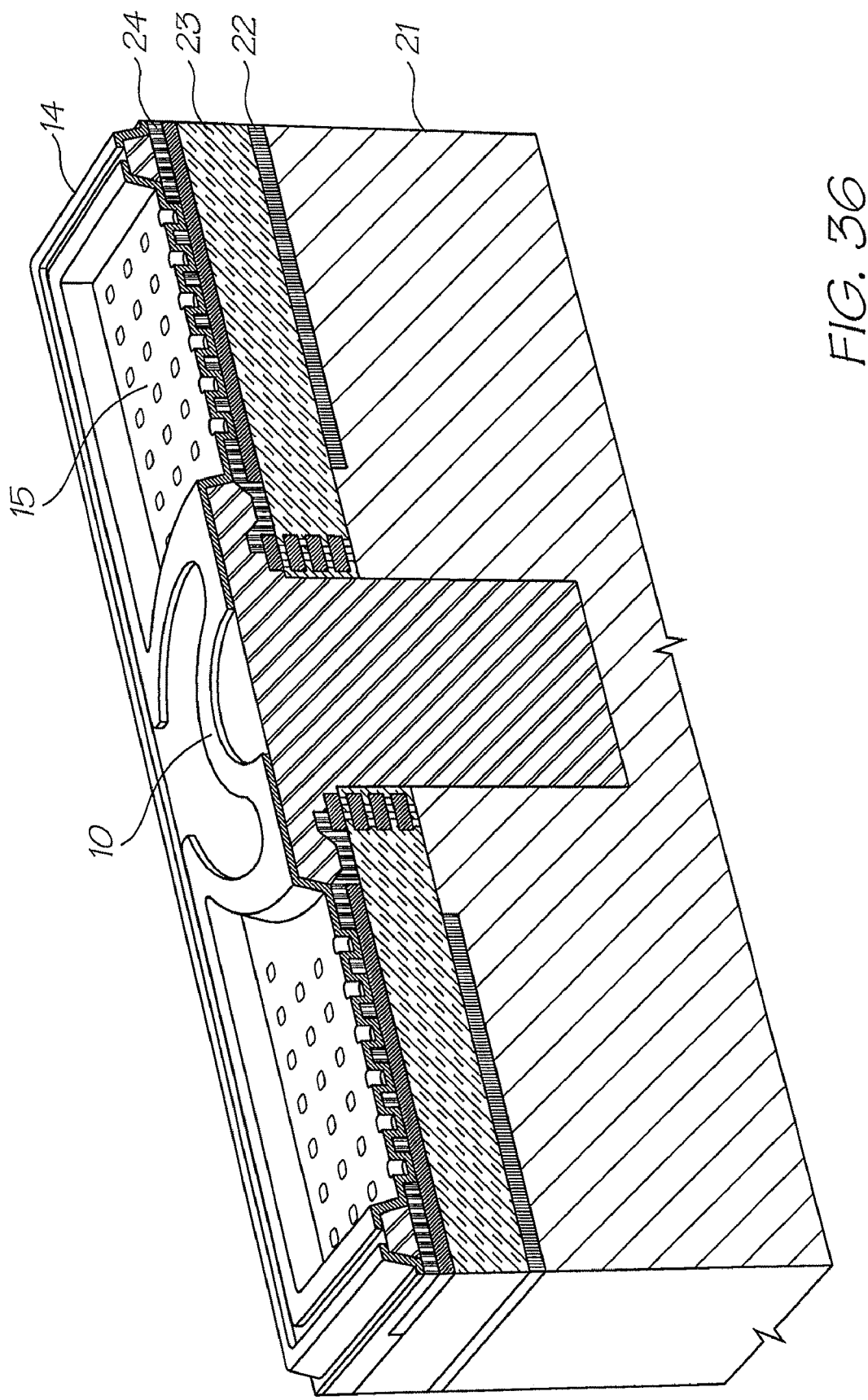
Figure 37:
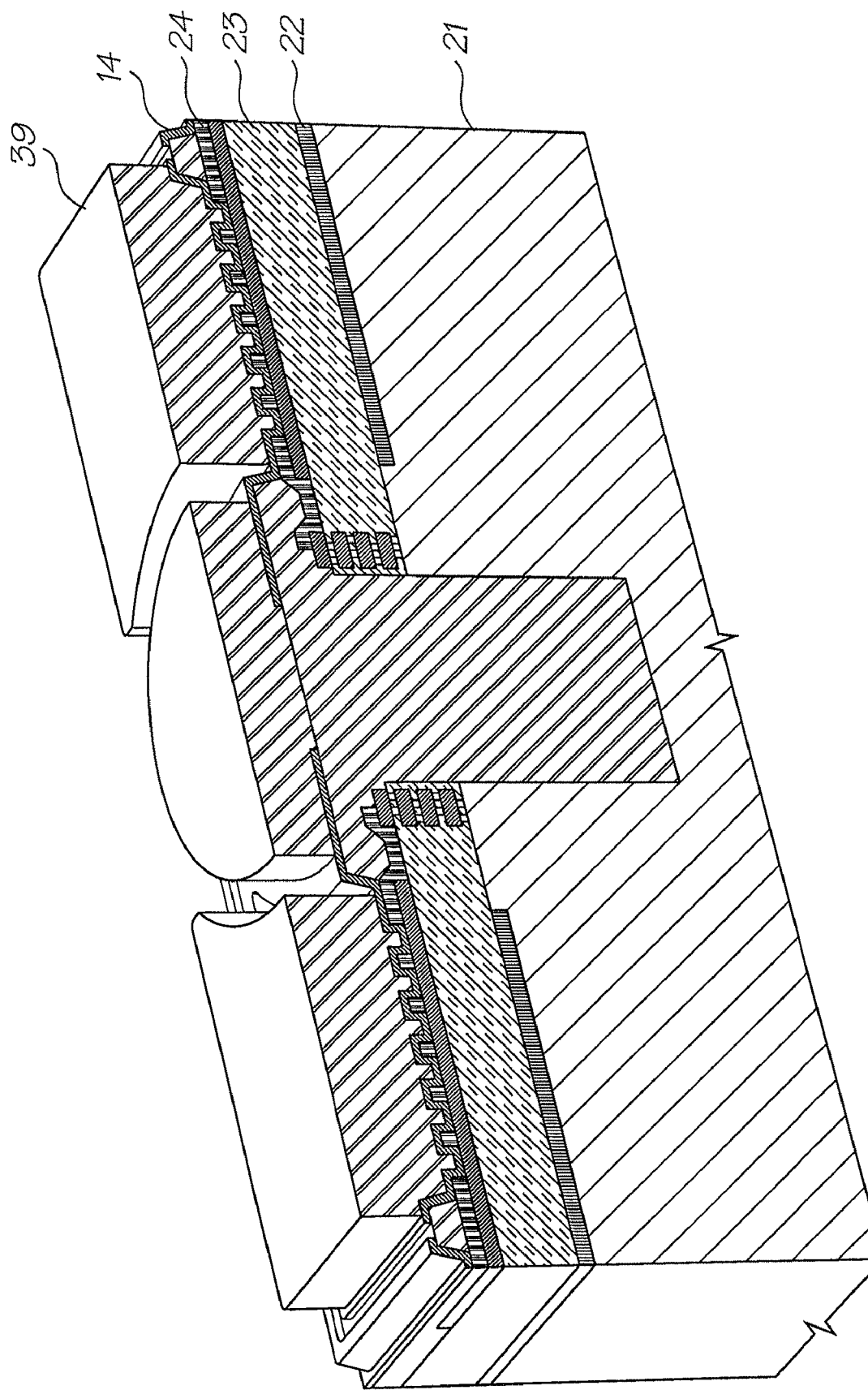
Figure 38:
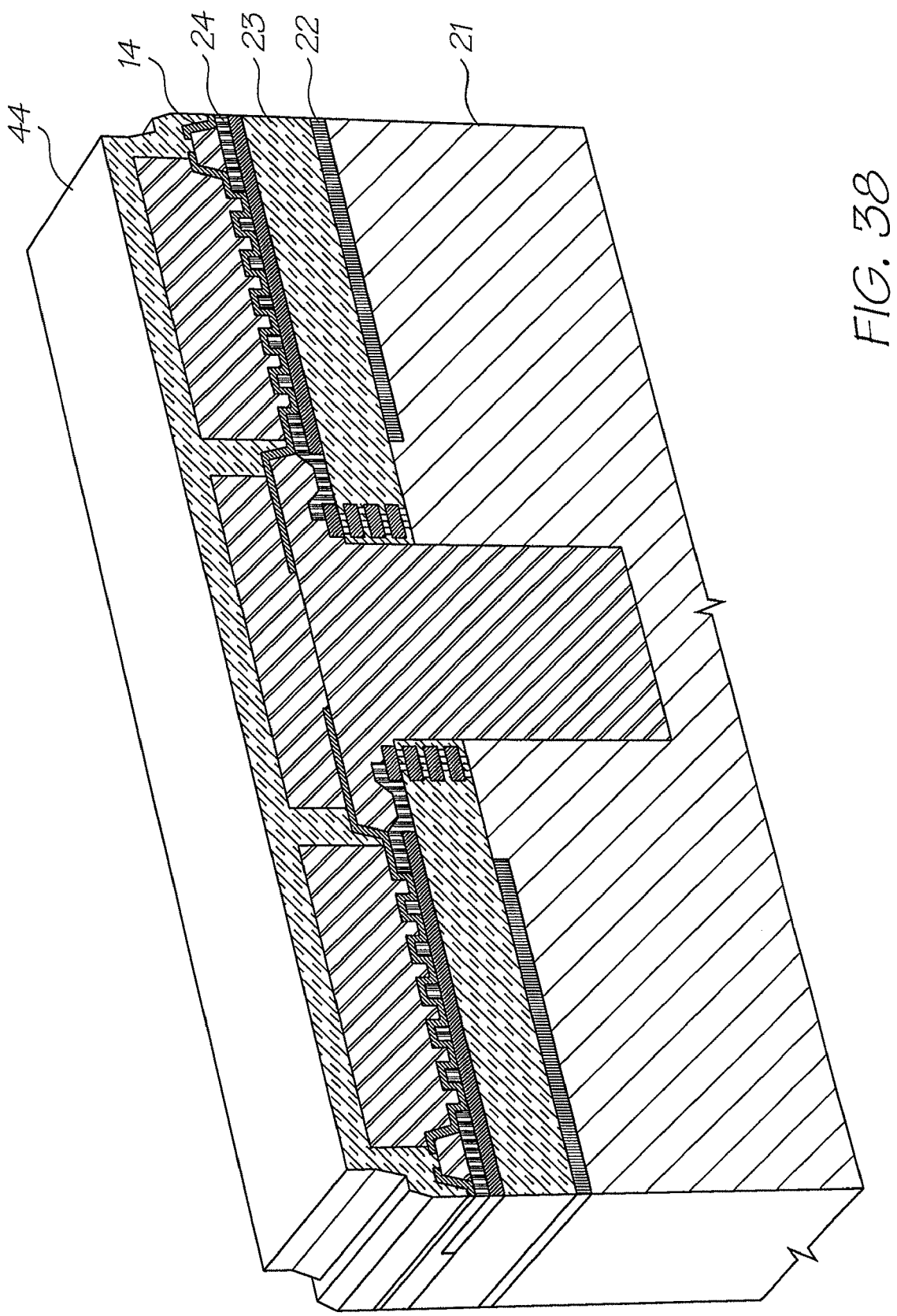
Figure 39:
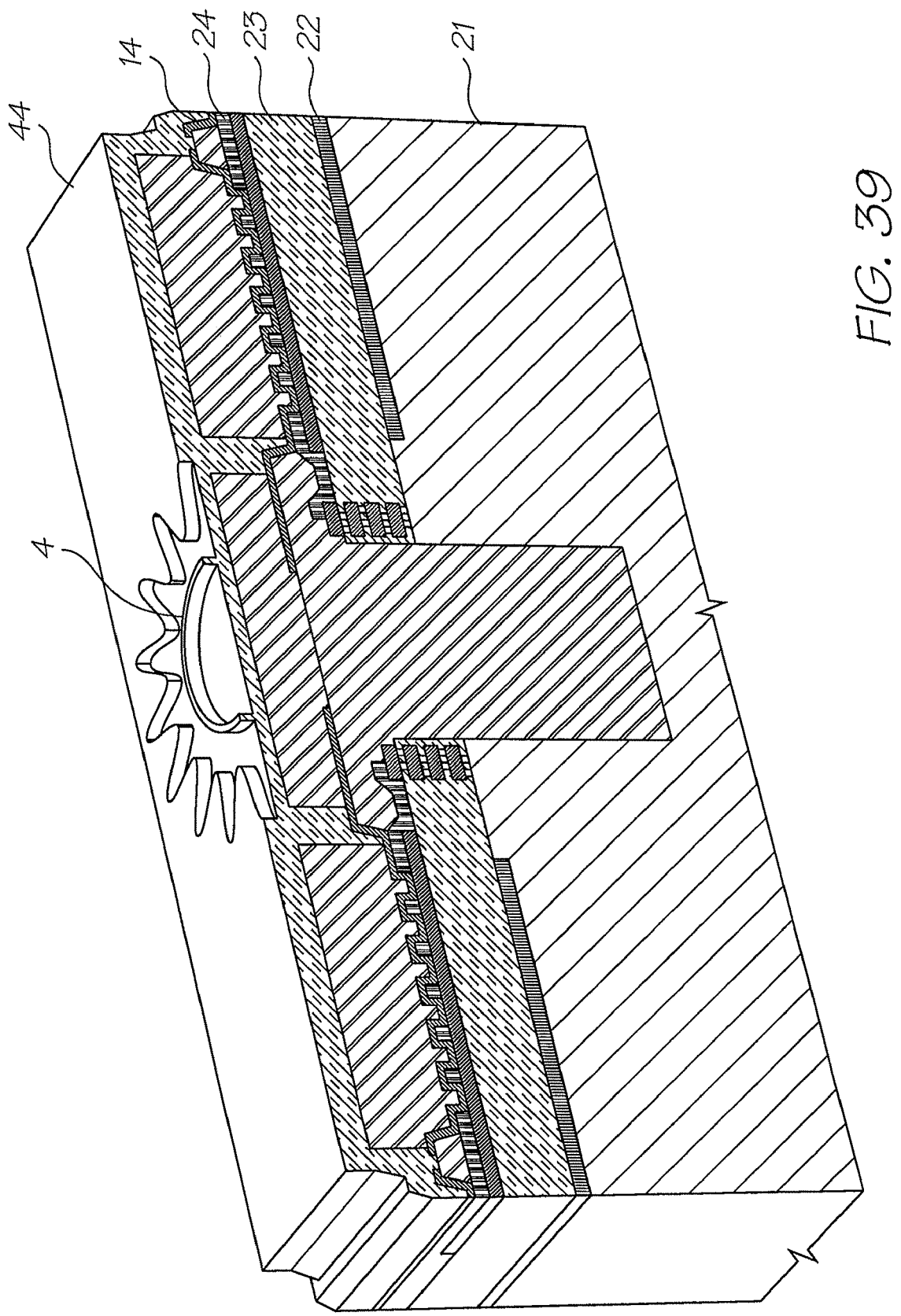
Figure 40:
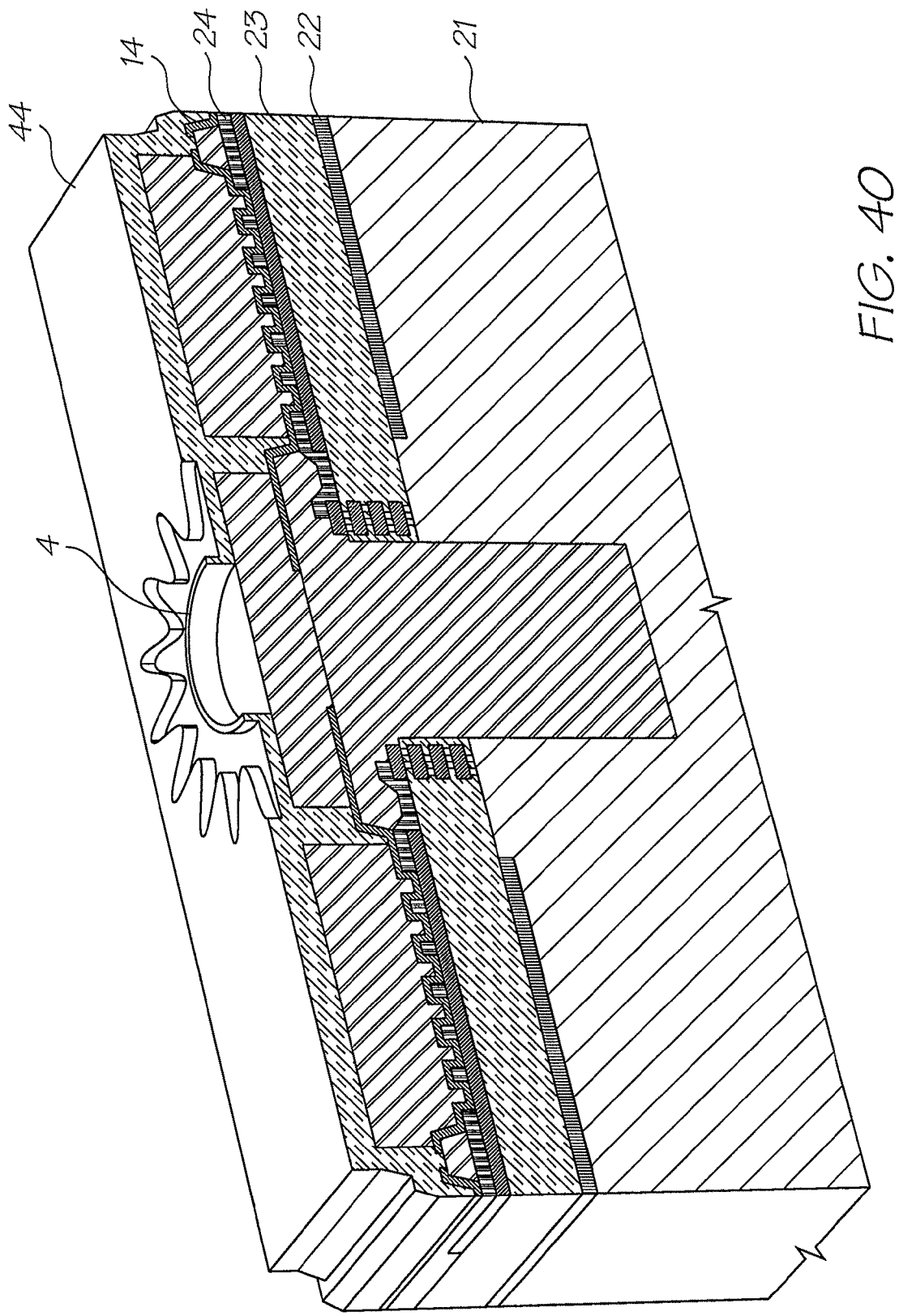
Figure 41:
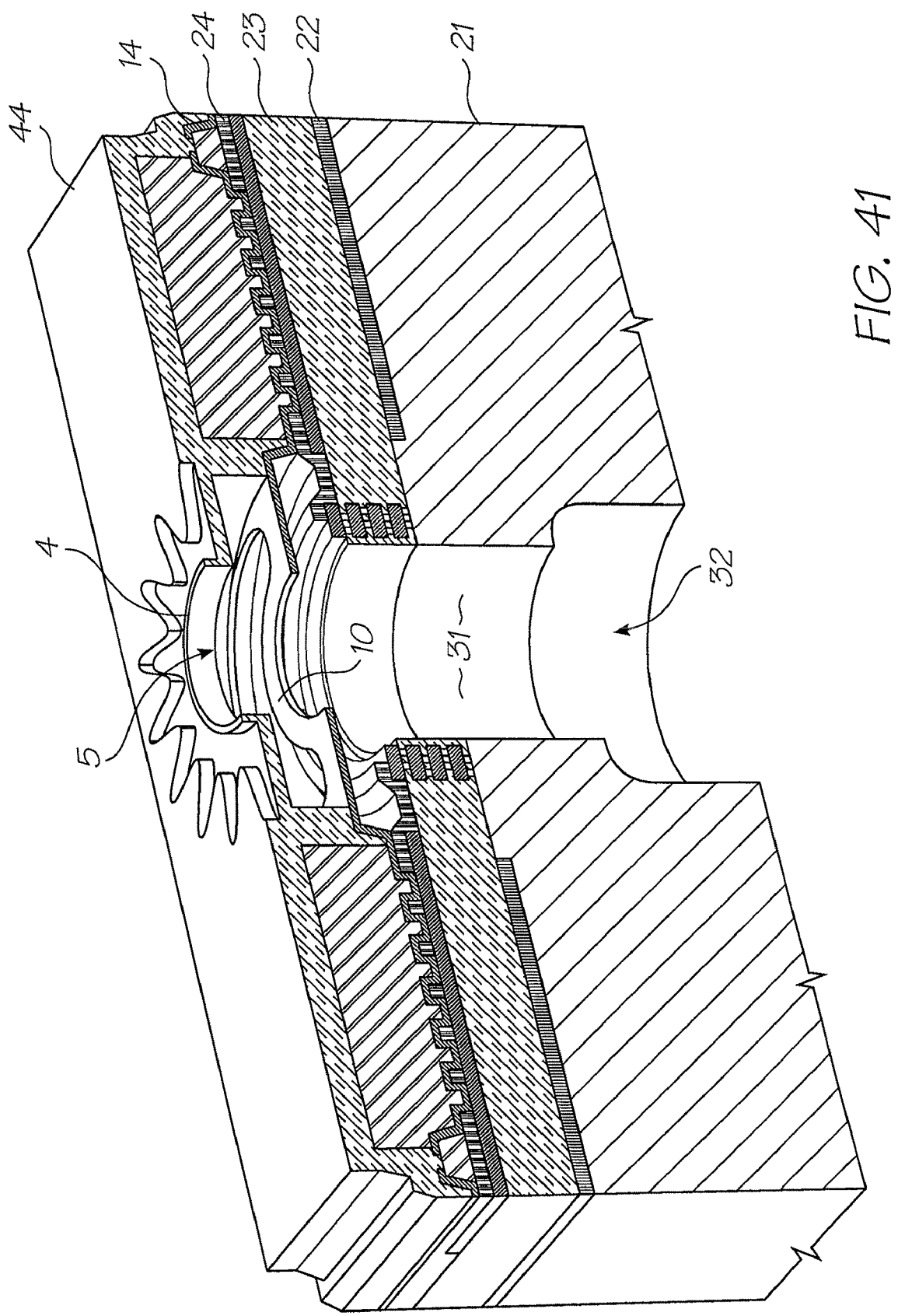
Figure 42:
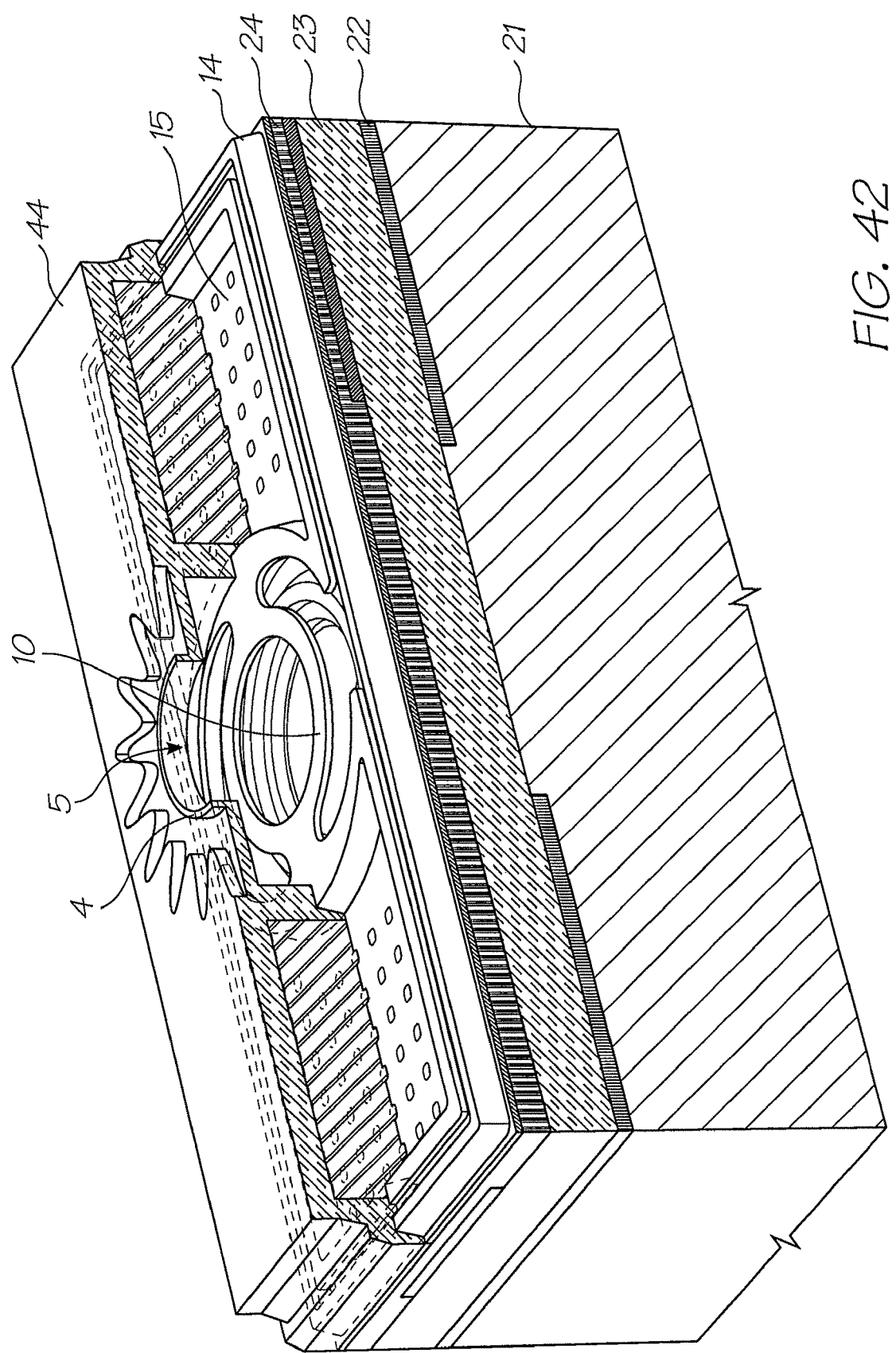
FIGS. 42 and 43 show schematic, partially cut away, schematic perspective views of two variations of the unit cell of FIGS. 29 to 41.

The high degree of overlap between the electrodes 15 and the drive circuitry 22 also allows more vias between the heater material and the CMOS metalization layers of the interconnect 23. As best shown in FIGS. 30 and 31, the passivation layer 24 has an array of vias to establish an electrical connection with the heater 14. More vias lowers the resistance between the heater electrodes 15 and the interconnect layer 23 which reduces power losses.

Figure 24:
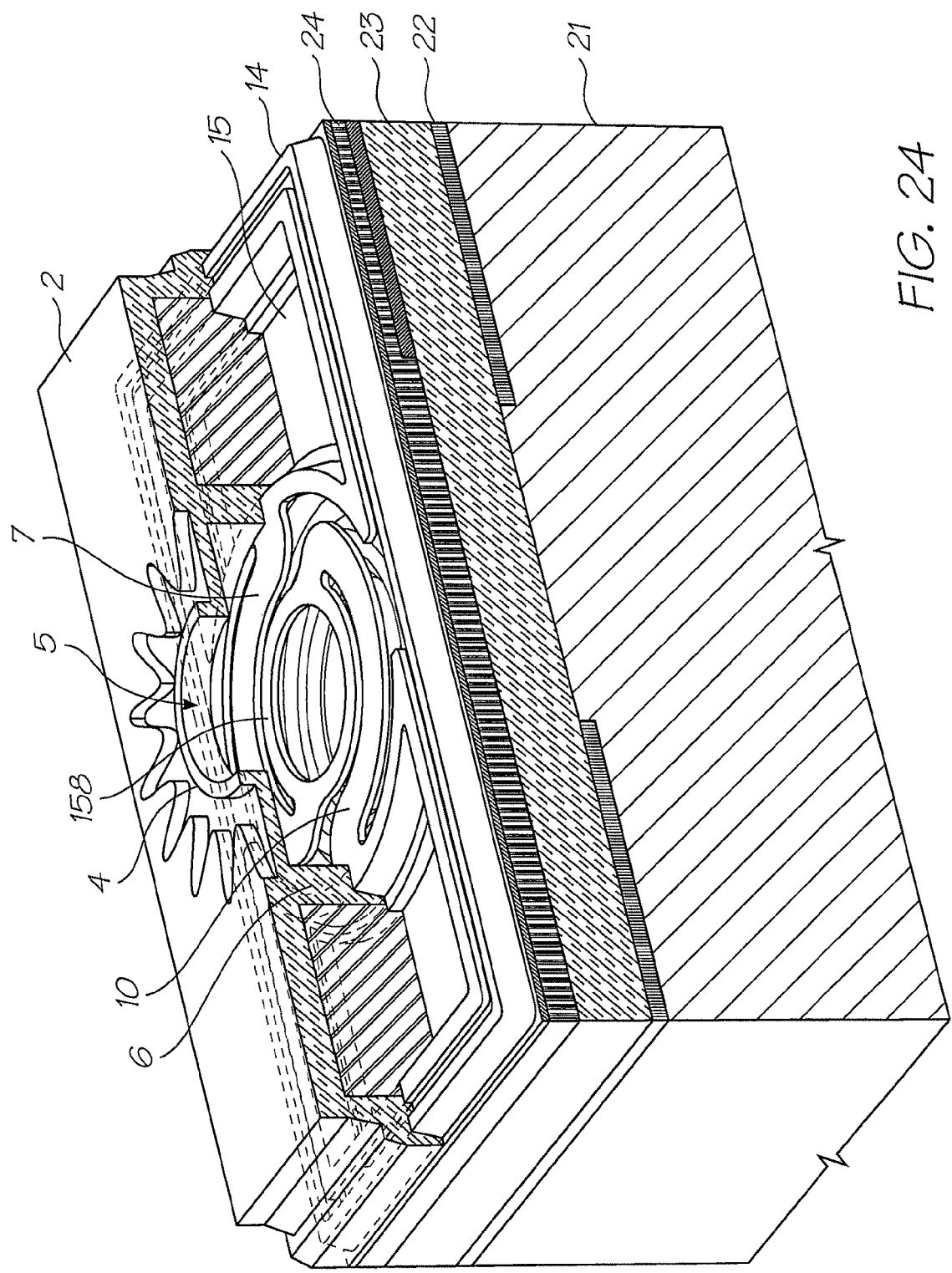
FIG. 24 is a schematic, partially cut away, perspective view of a further embodiment of a unit cell of a printhead.
Figure 25:
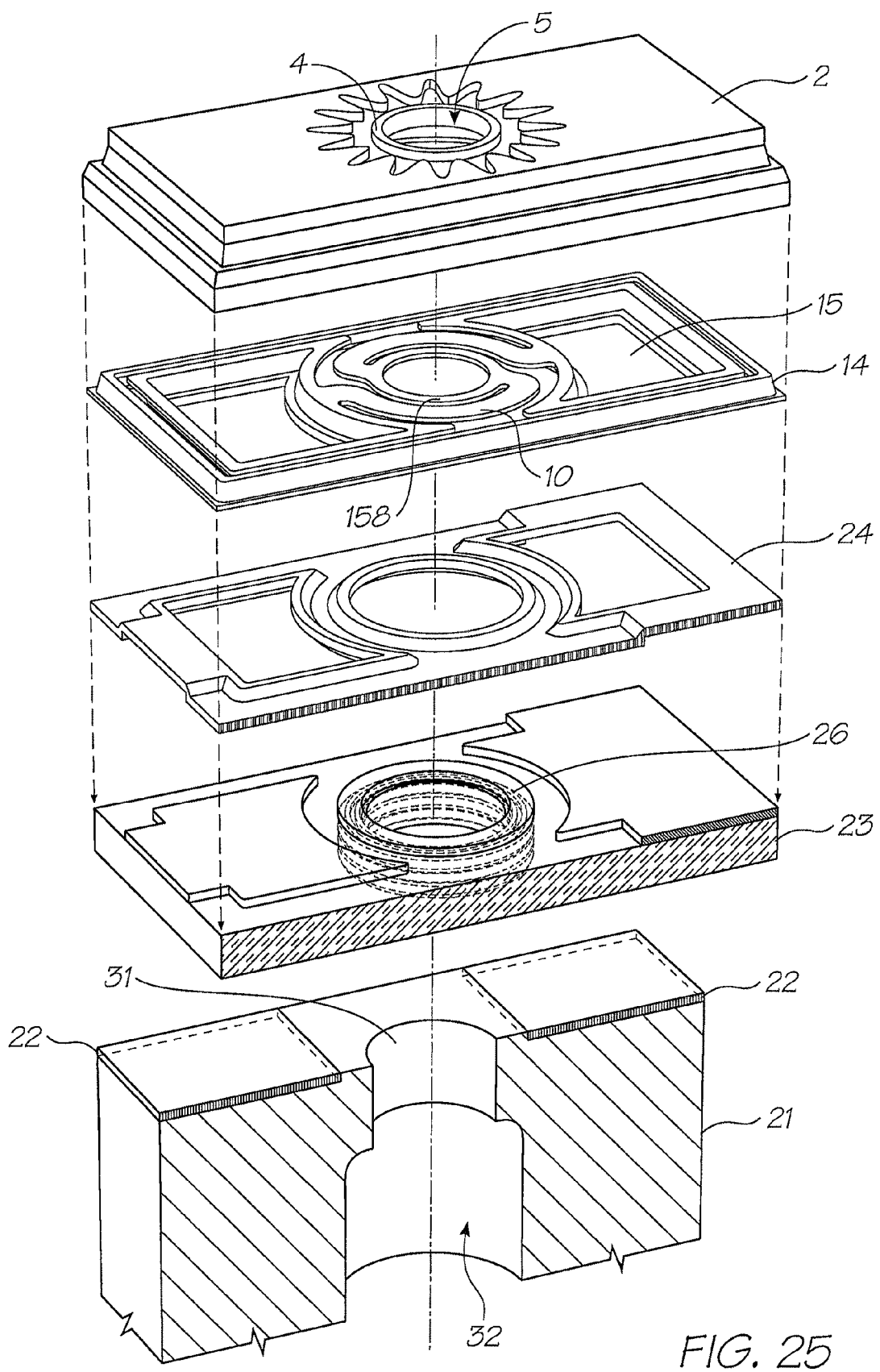
FIG. 25 is a schematic, partially cut away, exploded perspective view of the unit cell of FIG. 24.

In FIGS. 24 and 25, the unit cell 1 is the same as that of FIGS. 22 and 23 apart from the heater element 10. The heater element 10 has a bubble nucleation section 158 with a smaller cross section than the remainder of the element. The bubble nucleation section 158 has a greater resistance and heats to a temperature above the boiling point of the ink before the remainder of the element 10. The gas bubble nucleates at this region and subsequently grows to surround the rest of the element 10. By controlling the bubble nucleation and growth, the trajectory of the ejected drop is more predictable.

The heater element 10 is configured to accommodate thermal expansion in a specific manner. As heater elements expand, they will deform to relieve the strain. Elements such as that shown in FIGS. 22 and 23 will bow out of the plane of lamination because its thickness is the thinnest cross sectional dimension and therefore has the least bending resistance. Repeated bending of the element can lead to the formation of cracks, especially at sharp corners, which can ultimately lead to failure. The heater element 10 shown in FIGS. 24 and 25 is configured so that the thermal expansion is relieved by rotation of the bubble nucleation section 158, and slightly splaying the sections leading to the electrodes 15, in preference to bowing out of the plane of lamination. The geometry of the element is such that miniscule bending within the plane of lamination is sufficient to relieve the strain of thermal expansion, and such bending occurs in preference to bowing. This gives the heater element greater longevity and reliability by minimizing bend regions, which are prone to oxidation and cracking.

Figure 26:
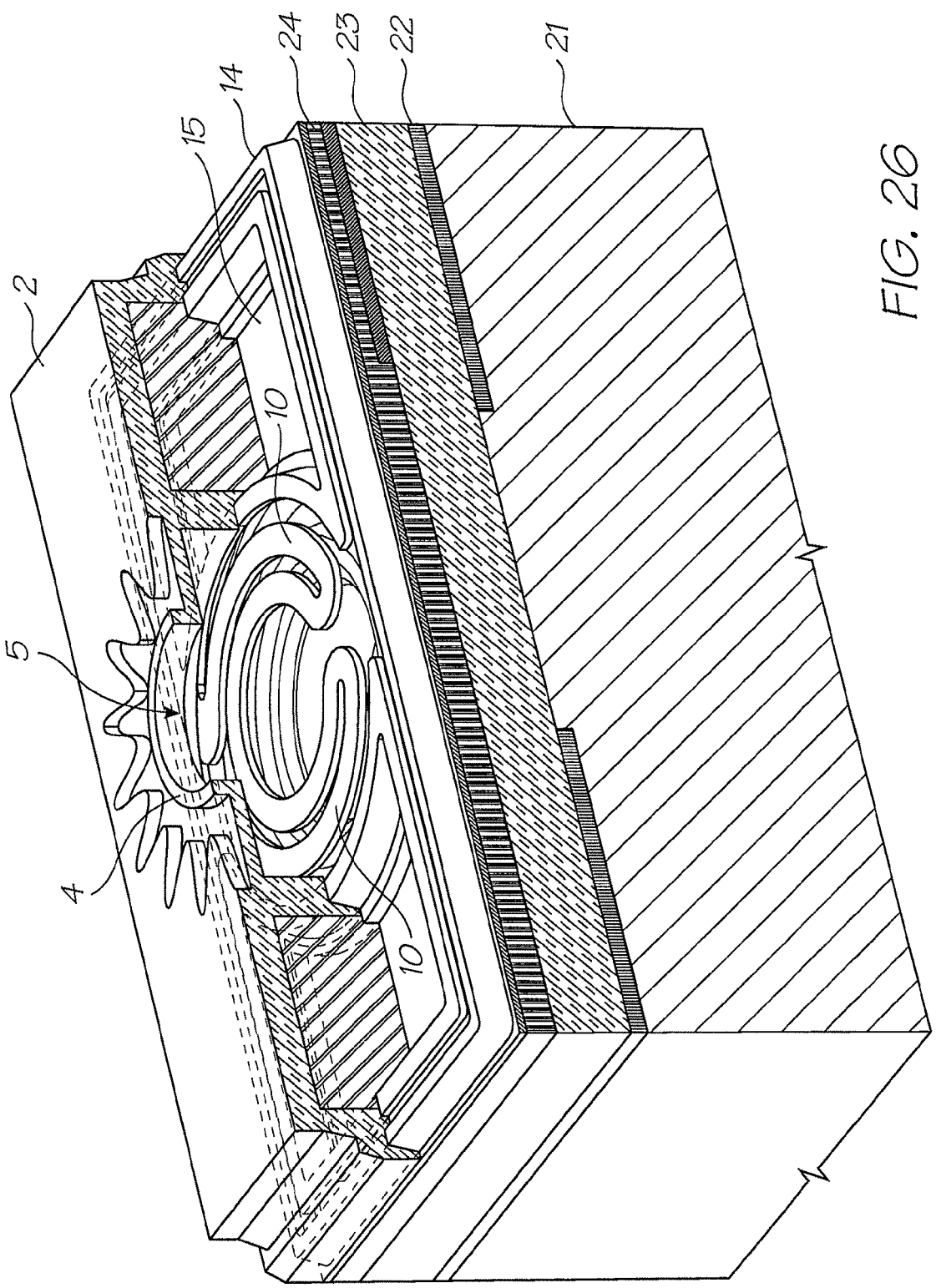
FIG. 26 is a schematic, partially cut away, perspective view of a further embodiment of a unit cell of a printhead.
Figure 27:
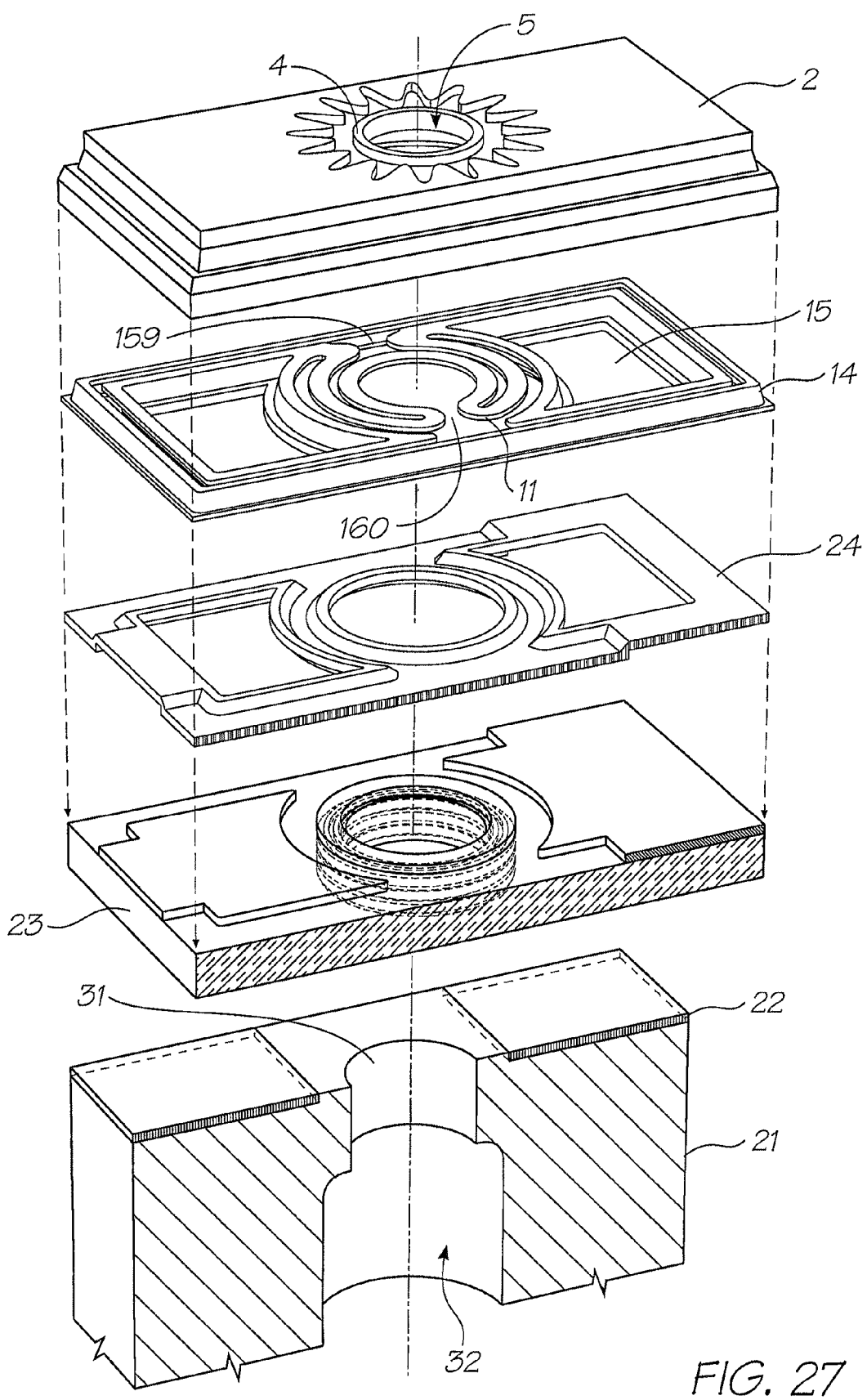
FIG. 27 is a schematic, partially cut away, exploded perspective view of the unit cell of FIG. 26.

Referring to FIGS. 26 and 27, the heater element 10 used in this unit cell 1 has a serpentine or 'double omega' shape. This configuration keeps the gas bubble centered on the axis of the nozzle. A single omega is a simple geometric shape which is beneficial from a fabrication perspective. However the gap 159 between the ends of the heater element means that the heating of the ink in the chamber is slightly asymmetrical. As a result, the gas bubble is slightly skewed to the side opposite the gap 159. This can in turn affect the trajectory of the ejected drop. The double omega shape provides the heater element with the gap 160 to compensate for the gap 159 so that the symmetry and position of the bubble within the chamber is better controlled and the ejected drop trajectory is more reliable.

Figure 28:
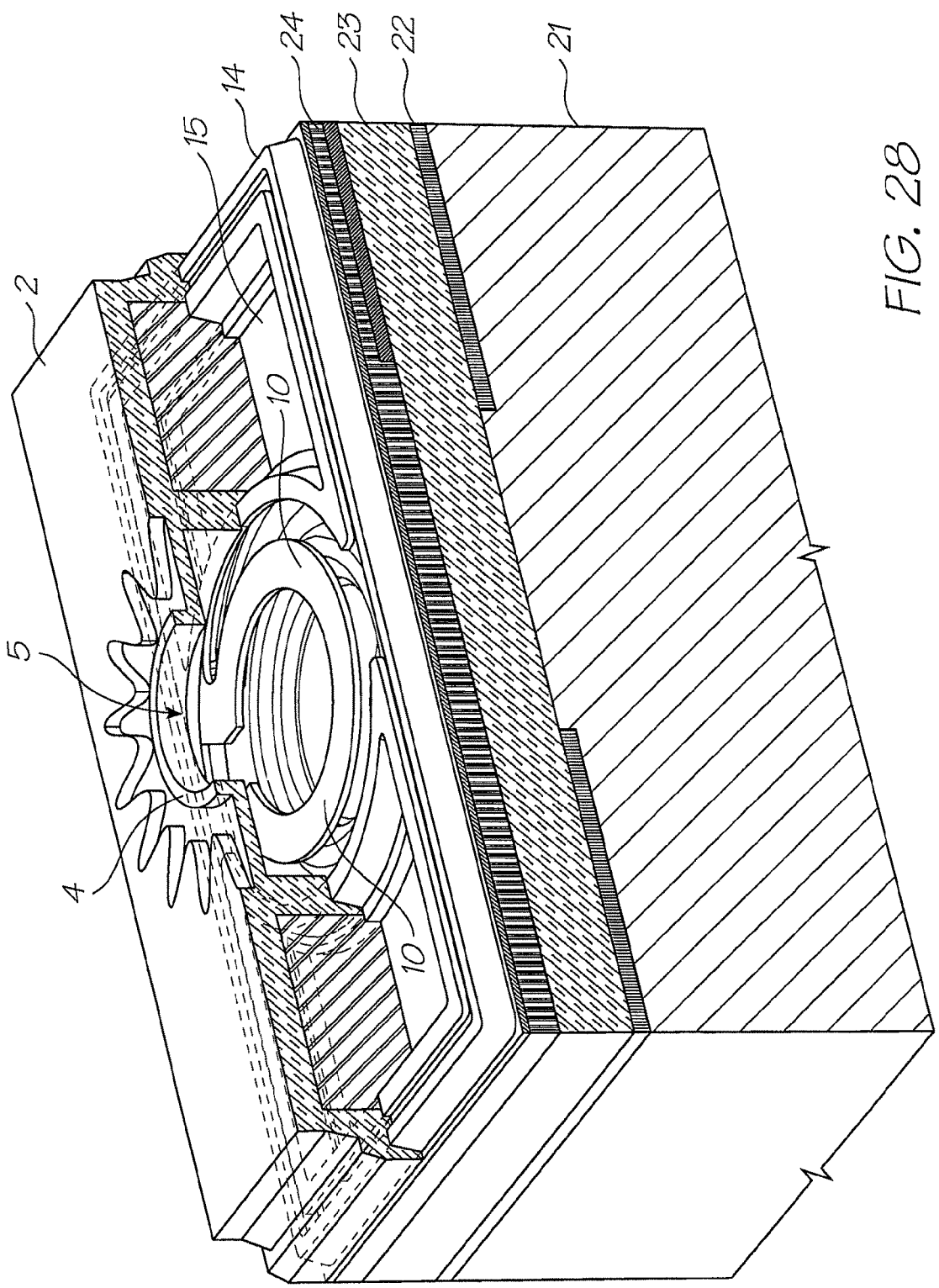
FIG. 28 is a schematic, partially cut away, perspective view of a further embodiment of a unit cell of a printhead.
Figure 29:
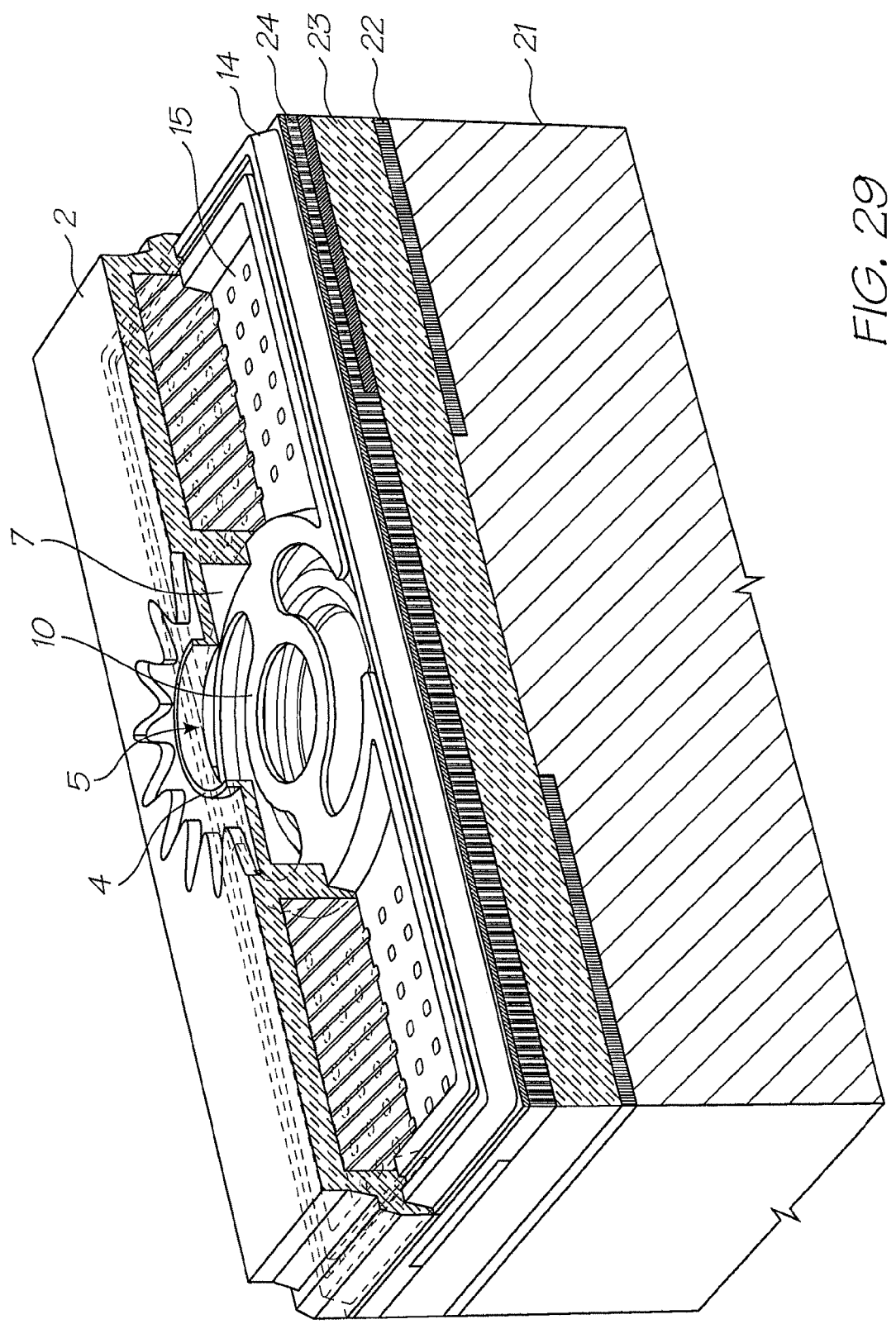
FIG. 29 is a schematic, partially cut away, perspective view of a further embodiment of a unit cell of a printhead.

FIG. 28 shows a heater element 10 with a single omega shape. As discussed above, the simplicity of this shape has significant advantages during lithographic fabrication. It can be a single current path that is relatively wide and therefore less affected by any inherent inaccuracies in the deposition of the heater material. The inherent inaccuracies of the equipment used to deposit the heater material result in variations in the dimensions of the element. However, these tolerances are fixed values so the resulting variations in the dimensions of a relatively wide component are proportionally less than the variations for a thinner component. It will be appreciated that proportionally large changes of components dimensions will have a greater effect on their intended function. Therefore the performance characteristics of a relatively wide heater element are more reliable than a thinner one.

The omega shape directs current flow around the axis of the nozzle aperture 5. This gives good bubble alignment with the aperture for better ejection of drops while ensuring that the bubble collapse point is not on the heater element 10. As discussed above, this avoids problems caused by cavitation.

Figure 43:
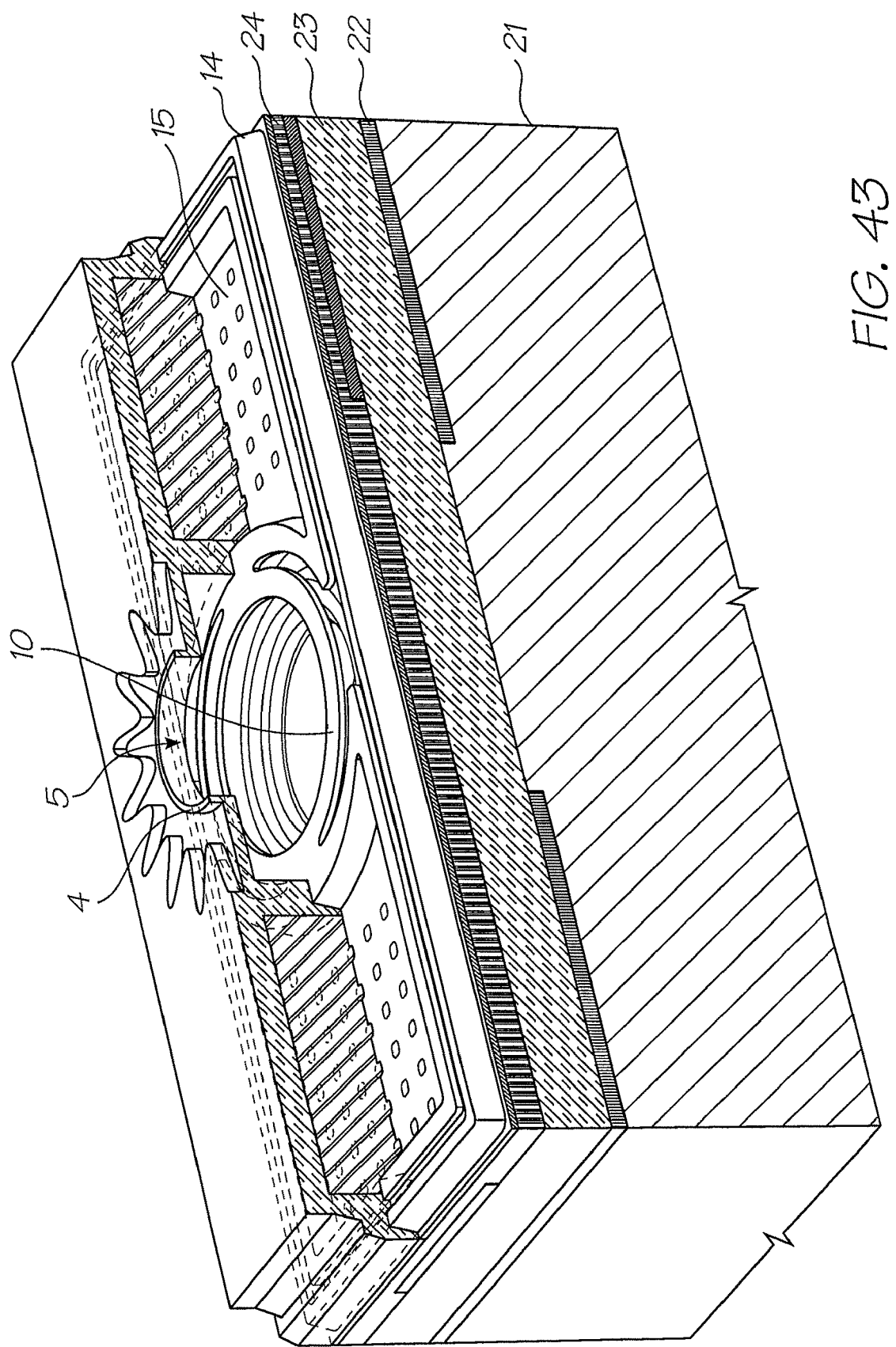
Figure 44:
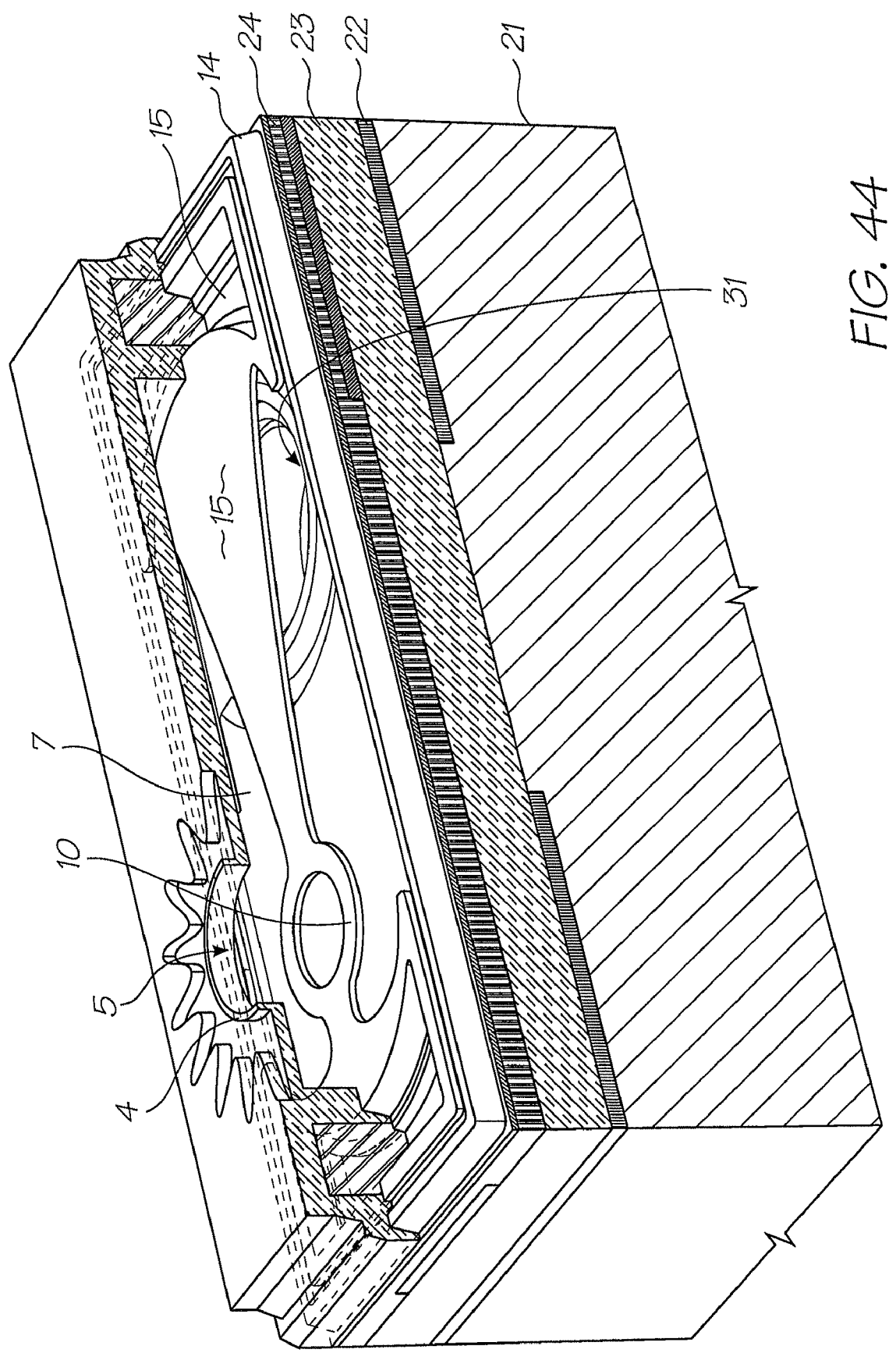
FIG. 44 is a schematic, partially cut away, perspective view of a further embodiment of a unit cell of a printhead.

Referring to FIGS. 29 to 42, another embodiment of the unit cell 1 is shown together with several stages of the etching and deposition fabrication process. In this embodiment, the heater element 10 is suspended from opposing sides of the chamber. This allows it to be symmetrical about two planes that intersect along the axis of the nozzle aperture 5. This configuration provides a drop trajectory along the axis of the nozzle aperture 5 while avoiding the cavitation problems discussed above. FIGS. 43 and 44 show other variations of this type of heater element 10.

FIG. 44 shows a unit cell 1 that has the nozzle aperture 5 and the heater element 10 offset from the center of the nozzle chamber 7. Consequently, the nozzle chamber 7 is larger than the previous embodiments. The heater 14 has two different electrodes 15 with the right hand electrode 15 extending well into the nozzle chamber 7 to support one side of the heater element 10. This reduces the area of the vias contacting the electrodes which can increase the electrode resistance and therefore the power losses. However, laterally offsetting the heater element from the ink inlet 31 increases the fluidic drag retarding flow back through the inlet 31 and ink supply passage 32. The fluidic drag through the nozzle aperture 5 comparatively much smaller so little energy is lost to a reverse flow of ink through the inlet when a gas bubble form on the element 10.

Figure 45:
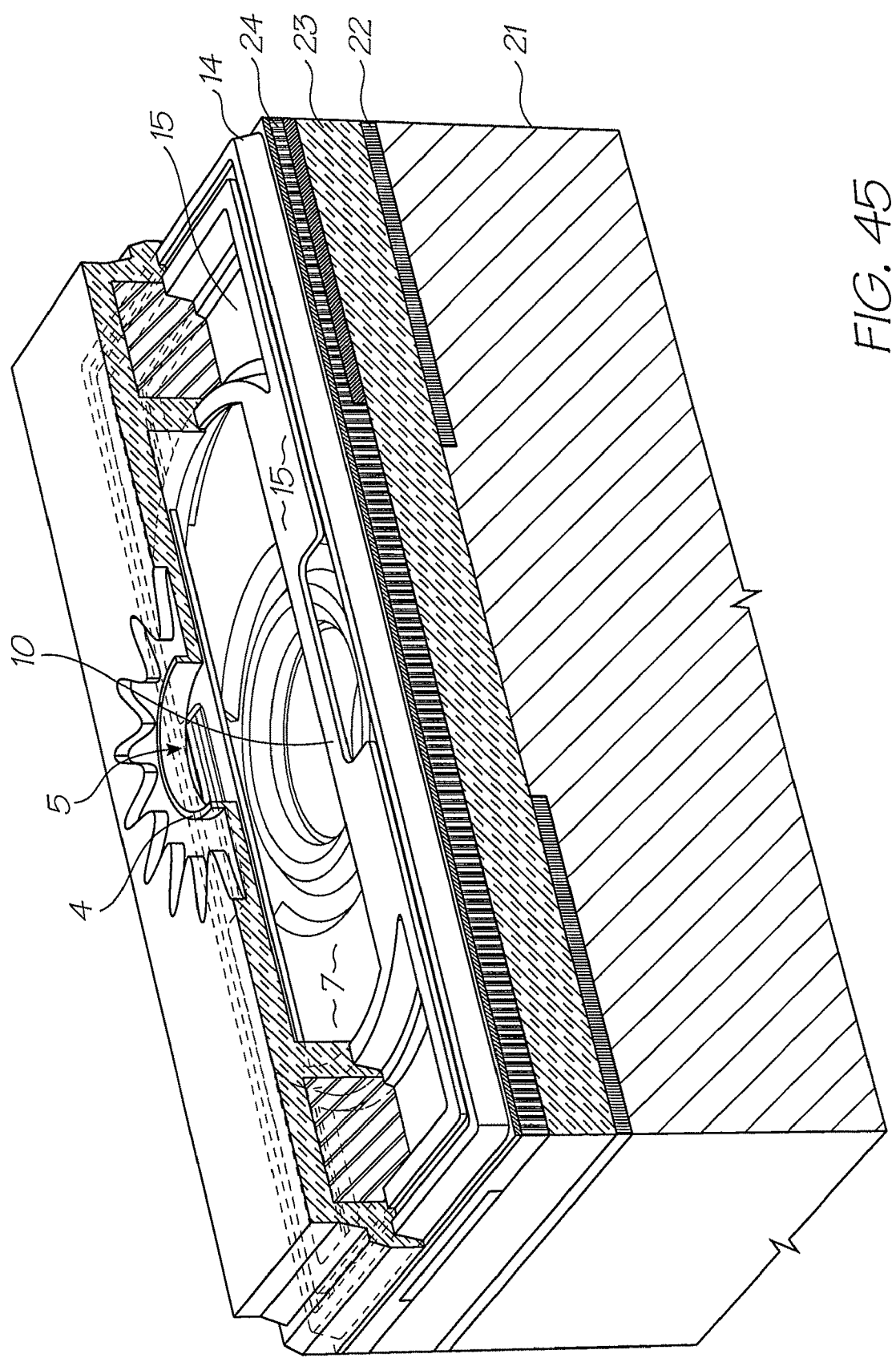
FIG. 45 is a schematic, partially cut away, perspective view of a further embodiment of a unit cell of a printhead.

The unit cell 1 shown in FIG. 45 also has a relatively large chamber 7 which again reduces the surface area of the electrodes in contact with the vias leading to the interconnect layer 23. However, the larger chamber 7 allows several heater elements 10 offset from the nozzle aperture 5. The arrangement shown uses two heater elements 10; one on either side of the chamber 7. Other designs use three or more elements in the chamber. Gas bubbles nucleate from opposing sides of the nozzle aperture and converge to form a single bubble. The bubble formed is symmetrical about at least one plane extending along the nozzle axis. This enhances the control of the symmetry and position of the bubble within the chamber 7 and therefore the ejected drop trajectory is more reliable.

Other Embodiments

The invention has been described above with reference to printheads using thermal bend actuators and bubble forming heater elements. However, it is potentially suited to a wide range of printing system including: color and monochrome office printers, short run digital printers, high speed digital printers, offset press supplemental printers, low cost scanning printers high speed pagewidth printers, notebook computers with inbuilt pagewidth printers, portable color and monochrome printers, color and monochrome copiers, color and monochrome facsimile machines, combined printer, facsimile and copying machines, label printers, large format plotters, photograph copiers, printers for digital photographic "minilabs", video printers, PHOTO CD (PHOTO CD is a registered trade mark of the Eastman Kodak Company) printers, portable printers for PDAs, wallpaper printers, indoor sign printers, billboard printers, fabric printers, camera printers and fault tolerant commercial printer arrays.

It will be appreciated by ordinary workers in this field that numerous variations and/or modifications may be made to the present invention as shown in the specific embodiments without departing from the spirit or scope of the invention as broadly described. The present embodiments are, therefore, to be considered in all respects to be illustrative and not restrictive.

Ink Jet Technologies

The embodiments of the invention use an ink jet printer type device. Of course many different devices could be used. However presently popular ink jet printing technologies are unlikely to be suitable.

The most significant problem with thermal ink jet is power consumption. This is approximately 100 times that required for high speed, and stems from the energy-inefficient means of drop ejection. This involves the rapid boiling of water to produce a vapor bubble which expels the ink. Water has a very high heat capacity, and must be superheated in thermal ink jet applications. In conventional thermal inkjet printheads, this leads to an efficiency of around 0.02%, from electricity input to drop momentum (and increased surface area) out.

The most significant problem with piezoelectric ink jet is size and cost. Piezoelectric crystals have a very small deflection at reasonable drive voltages, and therefore require a large area for each nozzle. Also, each piezoelectric actuator must be connected to its drive circuit on a separate substrate. This is not a significant problem at the current limit of around 300 nozzles per printhead, but is a major impediment to the fabrication of pagewidth printheads with 19,200 nozzles.

Ideally, the ink jet technologies used meet the stringent requirements of in-camera digital color printing and other high quality, high speed, low cost printing applications. To meet the requirements of digital photography, new ink jet technologies have been created. The target features include:

low power (less than 10 Watts)

high resolution capability (1,600 dpi or more)

photographic quality output low manufacturing cost small size (pagewidth times minimum cross section)

high speed (<2 seconds per page).

All of these features can be met or exceeded by the ink jet systems described below with differing levels of difficulty. Forty-five different ink jet technologies have been developed by the Assignee to give a wide range of choices for high volume manufacture. These technologies form part of separate applications assigned to the present Assignee as set out in the table under the heading Cross References to Related Applications.

The ink jet designs shown here are suitable for a wide range of digital printing systems, from battery powered one-time use digital cameras, through to desktop and network printers, and through to commercial printing systems.

For ease of manufacture using standard process equipment, the printhead is designed to be a monolithic 0.5 micron CMOS chip with MEMS post processing. For color photographic applications, the printhead is 100 mm long, with a width which depends upon the ink jet type. The smallest printhead designed is IJ38, which is 0.35 mm wide, giving a chip area of 35 square mm. The printheads each contain 19,200 nozzles plus data and control circuitry.

Ink is supplied to the back of the printhead by injection molded plastic ink channels. The molding requires 50 micron features, which can be created using a lithographically micromachined insert in a standard injection molding tool. Ink flows through holes etched through the wafer to the nozzle chambers fabricated on the front surface of the wafer. The printhead is connected to the camera circuitry by tape automated bonding.

Tables of Drop-on-Demand Ink Jets

Eleven important characteristics of the fundamental operation of individual ink jet nozzles have been identified. These characteristics are largely orthogonal, and so can be elucidated as an eleven dimensional matrix. Most of the eleven axes of this matrix include entries developed by the present assignee.

The following tables form the axes of an eleven dimensional table of ink jet types.

Actuator mechanism (18 types)
Basic operation mode (7 types)
Auxiliary mechanism (8 types)
Actuator amplification or modification method (17 types)
Actuator motion (19 types)
Nozzle refill method (4 types)
Method of restricting back-flow through inlet (10 types)
Nozzle clearing method (9 types)
Nozzle plate construction (9 types)
Drop ejection direction (5 types)
Ink type (7 types)

The complete eleven dimensional table represented by these axes contains 36.9 billion possible configurations of ink jet nozzle. While not all of the possible combinations result in a viable ink jet technology, many million configurations are viable. It is clearly impractical to elucidate all of the possible configurations. Instead, certain ink jet types have been investigated in detail. These are designated IJ01 to IJ45 above which matches the docket numbers in the table under the heading Cross References to Related Applications.

Other ink jet configurations can readily be derived from these forty-five examples by substituting alternative configurations along one or more of the 11 axes. Most of the IJ01 to IJ45 examples can be made into ink jet printheads with characteristics superior to any currently available ink jet technology.

Where there are prior art examples known to the inventor, one or more of these examples are listed in the examples column of the tables below. The IJ01 to IJ45 series are also listed in the examples column. In some cases, print technology may be listed more than once in a table, where it shares characteristics with more than one entry.

Suitable applications for the ink jet technologies include: Home printers, Office network printers, Short run digital printers, Commercial print systems, Fabric printers, Pocket printers, Internet WWW printers, Video printers, Medical imaging, Wide format printers, Notebook PC printers, Fax machines, Industrial printing systems, Photocopiers, Photographic minilabs etc.

The information associated with the aforementioned 11 dimensional matrix are set out in the following tables.

| ACTUATOR MECHANISM (APPLIED ONLY TO SELECTED INK DROPS) | | | | |
|---|---|---|---|---|
| | Description | Advantages | Disadvantages | Examples |
| Thermal bubble | An electrothermal heater heats the ink to above boiling point, transferring significant heat to the aqueous ink. A bubble nucleates and quickly forms, expelling the ink. The efficiency of the process is low, with typically less than 0.05% of the electrical energy being transformed into kinetic energy of the drop. | Large force generated Simple construction No moving parts Fast operation Small chip area required for actuator | High power Ink carrier limited to water Low efficiency High temperatures required High mechanical stress Unusual materials required Large drive transistors Cavitation causes actuator failure Kogation reduces bubble formation Large print heads are difficult to fabricate | Canon Bubblejet 1979 Endo et al GB patent 2,007,162 Xerox heater-in-pit 1990 Hawkins et al U.S. Pat. No. 4,899,181 Hewlett-Packard TIJ 1982 Vaught et al U.S. Pat. No. 4,490,728 |
| Piezoelectric | A piezoelectric crystal such as lead lanthanum zirconate (PZT) is electrically activated, and either expands, shears, or bends to apply pressure to the ink, ejecting drops. | Low power consumption Many ink types can be used Fast operation High efficiency | Very large area required for actuator Difficult to integrate with electronics High voltage drive transistors required Full pagewidth print heads impractical due to actuator size Requires electrical poling in high field | Kyser et al U.S. Pat. No. 3,946,398 Zoltan U.S. Pat. No. 3,683,212 1973 Stemme U.S. Pat. No. 3,747,120 Epson Stylus Tektronix IJ04 |

-continued

ACTUATOR MECHANISM (APPLIED ONLY TO SELECTED INK DROPS)

| | Description | Advantages | Disadvantages | Examples |
|---|---|---|---|---|
| | | | strengths during manufacture | |
| Electrostrictive | An electric field is used to activate electrostriction in relaxor materials such as lead lanthanum zirconate titanate (PLZT) or lead magnesium niobate (PMN). | Low power consumption Many ink types can be used Low thermal expansion Electric field strength required (approx. 3.5 V/μm) can be generated without difficulty Does not require electrical poling | Low maximum strain (approx. 0.01%) Large area required for actuator due to low strain Response speed is marginal (~10 μs) High voltage drive transistors required Full pagewidth print heads impractical due to actuator size | Seiko Epson, Usui et all JP 253401/96 IJ04 |
| Ferroelectric | An electric field is used to induce a phase transition between the antiferroelectric (AFE) and ferroelectric (FE) phase. Perovskite materials such as tin modified lead lanthanum zirconate titanate (PLZSnT) exhibit large strains of up to 1% associated with the AFE to FE phase transition. | Low power consumption Many ink types can be used Fast operation (<1 μs) Relatively high longitudinal strain High efficiency Electric field strength of around 3 V/μm can be readily provided | Difficult to integrate with electronics Unusual materials such as PLZSnT are required Actuators require a large area | IJ04 |
| Electrostatic plates | Conductive plates are separated by a compressible or fluid dielectric (usually air). Upon application of a voltage, the plates attract each other and displace ink, causing drop ejection. The conductive plates may be in a comb or honeycomb structure, or stacked to increase the surface area and therefore the force. | Low power consumption Many ink types can be used Fast operation | Difficult to operate electrostatic devices in an aqueous environment The electrostatic actuator will normally need to be separated from the ink Very large area required to achieve high forces High voltage drive transistors may be required Full pagewidth print heads are not competitive due to actuator size | IJ02, IJ04 |
| Electrostatic pull on ink | A strong electric field is applied to the ink, whereupon electrostatic attraction accelerates the ink towards the print medium. | Low current consumption Low temperature | High voltage required May be damaged by sparks due to air breakdown Required field strength increases as the drop size decreases High voltage drive transistors | 1989 Saito et al, U.S. Pat. No. 4,799,068 1989 Miura et al, U.S. Pat. No. 4,810,954 Tone-jet |

-continued

ACTUATOR MECHANISM (APPLIED ONLY TO SELECTED INK DROPS)

| | Description | Advantages | Disadvantages | Examples |
|---|---|---|---|---|
| | | | required Electrostatic field attracts dust | |
| Permanent magnet electromagnetic | An electromagnet directly attracts a permanent magnet, displacing ink and causing drop ejection. Rare earth magnets with a field strength around 1 Tesla can be used. Examples are: Samarium Cobalt (SaCo) and magnetic materials in the neodymium iron boron family (NdFeB, NdDyFeBNb, NdDyFeB, etc) | Low power consumption Many ink types can be used Fast operation High efficiency Easy extension from single nozzles to pagewidth print heads | Complex fabrication Permanent magnetic material such as Neodymium Iron Boron (NdFeB) required. High local currents required Copper metalization should be used for long electromigration lifetime and low resistivity Pigmented inks are usually infeasible Operating temperature limited to the Curie temperature (around 540 K) | IJ07, IJ10 |
| Soft magnetic core electromagnetic | A solenoid induced a magnetic field in a soft magnetic core or yoke fabricated from a ferrous material such as electroplated iron alloys such as CoNiFe [1], CoFe, or NiFe alloys. Typically, the soft magnetic material is in two parts, which are normally held apart by a spring. When the solenoid is actuated, the two parts attract, displacing the ink. | Low power consumption Many ink types can be used Fast operation High efficiency Easy extension from single nozzles to pagewidth print heads | Complex fabrication Materials not usually present in a CMOS fab such as NiFe, CoNiFe, or CoFe are required High local currents required Copper metalization should be used for long electromigration lifetime and low resistivity Electroplating is required High saturation flux density is required (2.0-2.1 T is achievable with CoNiFe [1]) | IJ01, IJ05, IJ08, IJ10, IJ12, IJ14, IJ15, IJ17 |
| Lorenz force | The Lorenz force acting on a current carrying wire in a magnetic field is utilized. This allows the magnetic field to be supplied externally to the print head, for example with rare earth permanent magnets. Only the current carrying wire need be fabricated on the print-head, simplifying materials requirements. | Low power consumption Many ink types can be used Fast operation High efficiency Easy extension from single nozzles to pagewidth print heads | Force acts as a twisting motion Typically, only a quarter of the solenoid length provides force in a useful direction High local currents required Copper metalization should be used for long electromigration lifetime and low resistivity Pigmented inks are usually infeasible | IJ06, IJ11, IJ13, IJ16 |

-continued

| ACTUATOR MECHANISM (APPLIED ONLY TO SELECTED INK DROPS) | | | | |
|---|---|---|---|---|
| | Description | Advantages | Disadvantages | Examples |
| Magnetostriction | The actuator uses the giant magnetostrictive effect of materials such as Terfenol-D (an alloy of terbium, dysprosium and iron developed at the Naval Ordnance Laboratory, hence Ter-Fe-NOL). For best efficiency, the actuator should be pre-stressed to approx. 8 MPa. | Many ink types can be used Fast operation Easy extension from single nozzles to pagewidth print heads High force is available | Force acts as a twisting motion Unusual materials such as Terfenol-D are required High local currents required Copper metalization should be used for long electromigration lifetime and low resistivity Pre-stressing may be required | Fischenbeck, U.S. Pat. No. 4,032,929 IJ25 |
| Surface tension reduction | Ink under positive pressure is held in a nozzle by surface tension. The surface tension of the ink is reduced below the bubble threshold, causing the ink to egress from the nozzle. | Low power consumption Simple construction No unusual materials required in fabrication High efficiency Easy extension from single nozzles to pagewidth print heads | Requires supplementary force to effect drop separation Requires special ink surfactants Speed may be limited by surfactant properties | Silverbrook, EP 0771 658 A2 and related patent applications |
| Viscosity reduction | The ink viscosity is locally reduced to select which drops are to be ejected. A viscosity reduction can be achieved electrothermally with most inks, but special inks can be engineered for a 100:1 viscosity reduction. | Simple construction No unusual materials required in fabrication Easy extension from single nozzles to pagewidth print heads | Requires supplementary force to effect drop separation Requires special ink viscosity properties High speed is difficult to achieve Requires oscillating ink pressure A high temperature difference (typically 80 degrees) is required | Silverbrook, EP 0771 658 A2 and related patent applications |
| Acoustic | An acoustic wave is generated and focussed upon the drop ejection region. | Can operate without a nozzle plate | Complex drive circuitry Complex fabrication Low efficiency Poor control of drop position Poor control of drop volume | 1993 Hadimioglu et al, EUP 550,192 1993 Elrod et al, EUP 572,220 |
| Thermoelastic bend actuator | An actuator which relies upon differential thermal expansion upon Joule heating is used. | Low power consumption Many ink types can be used Simple planar fabrication Small chip area required for each actuator Fast operation High efficiency | Efficient aqueous operation requires a thermal insulator on the hot side Corrosion prevention can be difficult Pigmented inks may be infeasible, as pigment particles | IJ03, IJ09, IJ17, IJ18, IJ19, IJ20, IJ21, IJ22, IJ23, IJ24, IJ27, IJ28, IJ29, IJ30, IJ31, IJ32, IJ33, IJ34, IJ35, IJ36, IJ37, IJ38, IJ39, IJ40, IJ41 |

-continued

| ACTUATOR MECHANISM (APPLIED ONLY TO SELECTED INK DROPS) | | | | |
|---|---|---|---|---|
| | Description | Advantages | Disadvantages | Examples |
| | | CMOS compatible voltages and currents Standard MEMS processes can be used Easy extension from single nozzles to pagewidth print heads | may jam the bend actuator | |
| High CTE thermoelastic actuator | A material with a very high coefficient of thermal expansion (CTE) such as polytetrafluoroethylene (PTFE) is used. As high CTE materials are usually non-conductive, a heater fabricated from a conductive material is incorporated. A 50 µm long PTFE bend actuator with polysilicon heater and 15 mW power input can provide 180 µN force and 10 µm deflection. Actuator motions include: Bend Push Buckle Rotate | High force can be generated Three methods of PTFE deposition are under development: chemical vapor deposition (CVD), spin coating, and evaporation PTFE is a candidate for low dielectric constant insulation in ULSI Very low power consumption Many ink types can be used Simple planar fabrication Small chip area required for each actuator Fast operation High efficiency CMOS compatible voltages and currents Easy extension from single nozzles to pagewidth print heads | Requires special material (e.g. PTFE) Requires a PTFE deposition process, which is not yet standard in ULSI fabs PTFE deposition cannot be followed with high temperature (above 350° C.) processing Pigmented inks may be infeasible, as pigment particles may jam the bend actuator | IJ09, IJ17, IJ18, IJ20, IJ21, IJ22, IJ23, IJ24, IJ27, IJ28, IJ29, IJ30, IJ31, IJ42, IJ43, IJ44 |
| Conductive polymer thermo-elastic actuator | A polymer with a high coefficient of thermal expansion (such as PTFE) is doped with conducting substances to increase its conductivity to about 3 orders of magnitude below that of copper. The conducting polymer expands when resistively heated. Examples of conducting dopants include: Carbon nanotubes Metal fibers | High force can be generated Very low power consumption Many ink types can be used Simple planar fabrication Small chip area required for each actuator Fast operation High efficiency CMOS compatible voltages and currents Easy | Requires special materials development (High CTE conductive polymer) Requires a PTFE deposition process, which is not yet standard in ULSI fabs PTFE deposition cannot be followed with high temperature (above 350° C.) processing Evaporation and CVD deposition | IJ24 |

-continued

ACTUATOR MECHANISM (APPLIED ONLY TO SELECTED INK DROPS)

| | Description | Advantages | Disadvantages | Examples |
|---|---|---|---|---|
| | Conductive polymers such as doped polythiophene Carbon granules | extension from single nozzles to pagewidth print heads | techniques cannot be used Pigmented inks may be infeasible, as pigment particles may jam the bend actuator | |
| Shape memory alloy | A shape memory alloy such as TiNi (also known as Nitinol - Nickel Titanium alloy developed at the Naval Ordnance Laboratory) is thermally switched between its weak martensitic state and its high stiffness austenic state. The shape of the actuator in its martensitic state is deformed relative to the austenic shape. The shape change causes ejection of a drop. | High force is available (stresses of hundreds of MPa) Large strain is available (more than 3%) High corrosion resistance Simple construction Easy extension from single nozzles to pagewidth print heads Low voltage operation | Fatigue limits maximum number of cycles Low strain (1%) is required to extend fatigue resistance Cycle rate limited by heat removal Requires unusual materials (TiNi) The latent heat of transformation must be provided High current operation Requires pre-stressing to distort the martensitic state | IJ26 |
| Linear Magnetic Actuator | Linear magnetic actuators include the Linear Induction Actuator (LIA), Linear Permanent Magnet Synchronous Actuator (LPMSA), Linear Reluctance Synchronous Actuator (LRSA), Linear Switched Reluctance Actuator (LSRA), and the Linear Stepper Actuator (LSA). | Linear Magnetic actuators can be constructed with high thrust, long travel, and high efficiency using planar semiconductor fabrication techniques Long actuator travel is available Medium force is available Low voltage operation | Requires unusual semiconductor materials such as soft magnetic alloys (e.g. CoNiFe) Some varieties also require permanent magnetic materials such as Neodymium iron boron (NdFeB) Requires complex multi-phase drive circuitry High current operation | IJ12 |

BASIC OPERATION MODE

| | Description | Advantages | Disadvantages | Examples |
|---|---|---|---|---|
| Actuator directly pushes ink | This is the simplest mode of operation: the actuator directly supplies sufficient kinetic energy to expel the drop. The drop must have a sufficient velocity to overcome the surface tension. | Simple operation No external fields required Satellite drops can be avoided if drop velocity is less than 4 m/s Can be efficient, depending upon the actuator used | Drop repetition rate is usually limited to around 10 kHz. However, this is not fundamental to the method, but is related to the refill method normally used All of the drop kinetic energy | Thermal ink jet Piezoelectric ink jet IJ01, IJ02, IJ03, IJ04, IJ05, IJ06, IJ07, IJ09, IJ11, IJ12, IJ14, IJ16, IJ20, IJ22, IJ23, IJ24, IJ25, IJ26, IJ27, IJ28, IJ29, IJ30, IJ31, IJ32, IJ33, IJ34, |

-continued

BASIC OPERATION MODE

| | Description | Advantages | Disadvantages | Examples |
|---|---|---|---|---|
| | | | must be provided by the actuator Satellite drops usually form if drop velocity is greater than 4.5 m/s | IJ35, IJ36, IJ37, IJ38, IJ39, IJ40, IJ41, IJ42, IJ43, IJ44 |
| Proximity | The drops to be printed are selected by some manner (e.g. thermally induced surface tension reduction of pressurized ink). Selected drops are separated from the ink in the nozzle by contact with the print medium or a transfer roller. | Very simple print head fabrication can be used The drop selection means does not need to provide the energy required to separate the drop from the nozzle | Requires close proximity between the print head and the print media or transfer roller May require two print heads printing alternate rows of the image Monolithic color print heads are difficult | Silverbrook, EP 0771 658 A2 and related patent applications |
| Electrostatic pull on ink | The drops to be printed are selected by some manner (e.g. thermally induced surface tension reduction of pressurized ink). Selected drops are separated from the ink in the nozzle by a strong electric field. | Very simple print head fabrication can be used The drop selection means does not need to provide the energy required to separate the drop from the nozzle | Requires very high electrostatic field Electrostatic field for small nozzle sizes is above air breakdown Electrostatic field may attract dust | Silverbrook, EP 0771 658 A2 and related patent applications Tone-Jet |
| Magnetic pull on ink | The drops to be printed are selected by some manner (e.g. thermally induced surface tension reduction of pressurized ink). Selected drops are separated from the ink in the nozzle by a strong magnetic field acting on the magnetic ink. | Very simple print head fabrication can be used The drop selection means does not need to provide the energy required to separate the drop from the nozzle | Requires magnetic ink Ink colors other than black are difficult Requires very high magnetic fields | Silverbrook, EP 0771 658 A2 and related patent applications |
| Shutter | The actuator moves a shutter to block ink flow to the nozzle. The ink pressure is pulsed at a multiple of the drop ejection frequency. | High speed (>50 kHz) operation can be achieved due to reduced refill time Drop timing can be very accurate The actuator energy can be very low | Moving parts are required Requires ink pressure modulator Friction and wear must be considered Stiction is possible | IJ13, IJ17, IJ21 |
| Shuttered grill | The actuator moves a shutter to block ink flow through a grill to the nozzle. The shutter movement need only be equal to the width of the grill holes. | Actuators with small travel can be used Actuators with small force can be used High speed (>50 kHz) operation can be achieved | Moving parts are required Requires ink pressure modulator Friction and wear must be considered Stiction is possible | IJ08, IJ15, IJ18, IJ19 |
| Pulsed magnetic pull on ink | A pulsed magnetic field attracts an 'ink pusher' at the drop ejection | Extremely low energy operation is possible No heat | Requires an external pulsed magnetic field Requires | IJ10 |

-continued

BASIC OPERATION MODE

| | Description | Advantages | Disadvantages | Examples |
|---|---|---|---|---|
| pusher | frequency. An actuator controls a catch, which prevents the ink pusher from moving when a drop is not to be ejected. | dissipation problems | special materials for both the actuator and the ink pusher Complex construction | |

AUXILIARY MECHANISM (APPLIED TO ALL NOZZLES)

| | Description | Advantages | Disadvantages | Examples |
|---|---|---|---|---|
| None | The actuator directly fires the ink drop, and there is no external field or other mechanism required. | Simplicity of construction Simplicity of operation Small physical size | Drop ejection energy must be supplied by individual nozzle actuator | Most ink jets, including piezoelectric and thermal bubble. IJ01, IJ02, IJ03, IJ04, IJ05, IJ07, IJ09, IJ11, IJ12, IJ14, IJ20, IJ22, IJ23, IJ24, IJ25, IJ26, IJ27, IJ28, IJ29, IJ30, IJ31, IJ32, IJ33, IJ34, IJ35, IJ36, IJ37, IJ38, IJ39, IJ40, IJ41, IJ42, IJ43, IJ44 |
| Oscillating ink pressure (including acoustic stimulation) | The ink pressure oscillates, providing much of the drop ejection energy. The actuator selects which drops are to be fired by selectively blocking or enabling nozzles. The ink pressure oscillation may be achieved by vibrating the print head, or preferably by an actuator in the ink supply. | Oscillating ink pressure can provide a refill pulse, allowing higher operating speed The actuators may operate with much lower energy Acoustic lenses can be used to focus the sound on the nozzles | Requires external ink pressure oscillator Ink pressure phase and amplitude must be carefully controlled Acoustic reflections in the ink chamber must be designed for | Silverbrook, EP 0771 658 A2 and related patent applications IJ08, IJ13, IJ15, IJ17, IJ18, IJ19, IJ21 |
| Media proximity | The print head is placed in close proximity to the print medium. Selected drops protrude from the print head further than unselected drops, and contact the print medium. The drop soaks into the medium fast enough to cause drop separation. | Low power High accuracy Simple print head construction | Precision assembly required Paper fibers may cause problems Cannot print on rough substrates | Silverbrook, EP 0771 658 A2 and related patent applications |
| Transfer roller | Drops are printed to a transfer roller instead of straight to the print medium. A transfer roller can also be used for | High accuracy Wide range of print substrates can be used Ink can be dried on the transfer roller | Bulky Expensive Complex construction | Silverbrook, EP 0771 658 A2 and related patent applications Tektronix hot melt |

-continued

| | AUXILIARY MECHANISM (APPLIED TO ALL NOZZLES) | | | |
|---|---|---|---|---|
| | Description | Advantages | Disadvantages | Examples |
| | proximity drop separation. | | | piezoelectric ink jet<br>Any of the IJ series |
| Electrostatic | An electric field is used to accelerate selected drops towards the print medium. | Low power<br>Simple print head construction | Field strength required for separation of small drops is near or above air breakdown | Silverbrook, EP 0771 658 A2 and related patent applications<br>Tone-Jet |
| Direct magnetic field | A magnetic field is used to accelerate selected drops of magnetic ink towards the print medium. | Low power<br>Simple print head construction | Requires magnetic ink<br>Requires strong magnetic field | Silverbrook, EP 0771 658 A2 and related patent applications |
| Cross magnetic field | The print head is placed in a constant magnetic field. The Lorenz force in a current carrying wire is used to move the actuator. | Does not require magnetic materials to be integrated in the print head manufacturing process | Requires external magnet<br>Current densities may be high, resulting in electromigration problems | IJ06, IJ16 |
| Pulsed magnetic field | A pulsed magnetic field is used to cyclically attract a paddle, which pushes on the ink. A small actuator moves a catch, which selectively prevents the paddle from moving. | Very low power operation is possible<br>Small print head size | Complex print head construction<br>Magnetic materials required in print head | IJ10 |

| | ACTUATOR AMPLIFICATION OR MODIFICATION METHOD | | | |
|---|---|---|---|---|
| | Description | Advantages | Disadvantages | Examples |
| None | No actuator mechanical amplification is used. The actuator directly drives the drop ejection process. | Operational simplicity | Many actuator mechanisms have insufficient travel, or insufficient force, to efficiently drive the drop ejection process | Thermal Bubble Ink jet IJ01, IJ02, IJ06, IJ07, IJ16, IJ25, IJ26 |
| Differential expansion bend actuator | An actuator material expands more on one side than on the other. The expansion may be thermal, piezoelectric, magnetostrictive, or other mechanism. The bend actuator converts a high force low travel actuator mechanism to high travel, lower force mechanism. | Provides greater travel in a reduced print head area | High stresses are involved<br>Care must be taken that the materials do not delaminate<br>Residual bend resulting from high temperature or high stress during formation | Piezoelectric IJ03, IJ09, IJ17, IJ18, IJ19, IJ20, IJ21, IJ22, IJ23, IJ24, IJ27, IJ29, IJ30, IJ31, IJ32, IJ33, IJ34, IJ35, IJ36, IJ37, IJ38, IJ39, IJ42, IJ43, IJ44 |
| Transient bend actuator | A trilayer bend actuator where the two outside layers are identical. This | Very good temperature stability<br>High speed, as | High stresses are involved<br>Care must be taken that the | IJ40, IJ41 |

-continued

| | ACTUATOR AMPLIFICATION OR MODIFICATION METHOD | | | |
|---|---|---|---|---|
| | Description | Advantages | Disadvantages | Examples |
| | cancels bend due to ambient temperature and residual stress. The actuator only responds to transient heating of one side or the other. | a new drop can be fired before heat dissipates Cancels residual stress of formation | materials do not delaminate | |
| Reverse spring | The actuator loads a spring. When the actuator is turned off, the spring releases. This can reverse the force/distance curve of the actuator to make it compatible with the force/time requirements of the drop ejection. | Better coupling to the ink | Fabrication complexity High stress in the spring | IJ05, IJ11 |
| Actuator stack | A series of thin actuators are stacked. This can be appropriate where actuators require high electric field strength, such as electrostatic and piezoelectric actuators. | Increased travel Reduced drive voltage | Increased fabrication complexity Increased possibility of short circuits due to pinholes | Some piezoelectric ink jets IJ04 |
| Multiple actuators | Multiple smaller actuators are used simultaneously to move the ink. Each actuator need provide only a portion of the force required. | Increases the force available from an actuator Multiple actuators can be positioned to control ink flow accurately | Actuator forces may not add linearly, reducing efficiency | IJ12, IJ13, IJ18, IJ20, IJ22, IJ28, IJ42, IJ43 |
| Linear Spring | A linear spring is used to transform a motion with small travel and high force into a longer travel, lower force motion. | Matches low travel actuator with higher travel requirements Non-contact method of motion transformation | Requires print head area for the spring | IJ15 |
| Coiled actuator | A bend actuator is coiled to provide greater travel in a reduced chip area. | Increases travel Reduces chip area Planar implementations are relatively easy to fabricate. | Generally restricted to planar implementations due to extreme fabrication difficulty in other orientations. | IJ17, IJ21, IJ34, IJ35 |
| Flexure bend actuator | A bend actuator has a small region near the fixture point, which flexes much more readily than the remainder of the actuator. The actuator flexing is effectively converted from an even coiling to an angular bend, resulting in greater travel of the actuator tip. | Simple means of increasing travel of a bend actuator | Care must be taken not to exceed the elastic limit in the flexure area Stress distribution is very uneven Difficult to accurately model with finite element analysis | IJ10, IJ19, IJ33 |

-continued

ACTUATOR AMPLIFICATION OR MODIFICATION METHOD

| | Description | Advantages | Disadvantages | Examples |
|---|---|---|---|---|
| Catch | The actuator controls a small catch. The catch either enables or disables movement of an ink pusher that is controlled in a bulk manner. | Very low actuator energy Very small actuator size | Complex construction Requires external force Unsuitable for pigmented inks | IJ10 |
| Gears | Gears can be used to increase travel at the expense of duration. Circular gears, rack and pinion, ratchets, and other gearing methods can be used. | Low force, low travel actuators can be used Can be fabricated using standard surface MEMS processes | Moving parts are required Several actuator cycles are required More complex drive electronics Complex construction Friction, friction, and wear are possible | IJ13 |
| Buckle plate | A buckle plate can be used to change a slow actuator into a fast motion. It can also convert a high force, low travel actuator into a high travel, medium force motion. | Very fast movement achievable | Must stay within elastic limits of the materials for long device life High stresses involved Generally high power requirement | S. Hirata et al, "An Ink-jet Head Using Diaphragm Microactuator", Proc. IEEE MEMS, February 1996, pp 418-423. IJ18, IJ27 |
| Tapered magnetic pole | A tapered magnetic pole can increase travel at the expense of force. | Linearizes the magnetic force/distance curve | Complex construction | IJ14 |
| Lever | A lever and fulcrum is used to transform a motion with small travel and high force into a motion with longer travel and lower force. The lever can also reverse the direction of travel. | Matches low travel actuator with higher travel requirements Fulcrum area has no linear movement, and can be used for a fluid seal | High stress around the fulcrum | IJ32, IJ36, IJ37 |
| Rotary impeller | The actuator is connected to a rotary impeller. A small angular deflection of the actuator results in a rotation of the impeller vanes, which push the ink against stationary vanes and out of the nozzle. | High mechanical advantage The ratio of force to travel of the actuator can be matched to the nozzle requirements by varying the number of impeller vanes | Complex construction Unsuitable for pigmented inks | IJ28 |
| Acoustic lens | A refractive or diffractive (e.g. zone plate) acoustic lens is used to concentrate sound waves. | No moving parts | Large area required Only relevant for acoustic ink jets | 1993 Hadimioglu et al, EUP 550,192 1993 Elrod et al, EUP 572,220 |
| Sharp conductive point | A sharp point is used to concentrate an electrostatic field. | Simple construction | Difficult to fabricate using standard VLSI processes for a surface ejecting ink-jet Only relevant for electrostatic ink jets | Tone-jet |

| | ACTUATOR MOTION | | | |
|---|---|---|---|---|
| | Description | Advantages | Disadvantages | Examples |
| Volume expansion | The volume of the actuator changes, pushing the ink in all directions. | Simple construction in the case of thermal ink jet | High energy is typically required to achieve volume expansion. This leads to thermal stress, cavitation, and kogation in thermal ink jet implementations | Hewlett-Packard Thermal Ink jet Canon Bubblejet |
| Linear, normal to chip surface | The actuator moves in a direction normal to the print head surface. The nozzle is typically in the line of movement. | Efficient coupling to ink drops ejected normal to the surface | High fabrication complexity may be required to achieve perpendicular motion | IJ01, IJ02, IJ04, IJ07, IJ11, IJ14 |
| Parallel to chip surface | The actuator moves parallel to the print head surface. Drop ejection may still be normal to the surface. | Suitable for planar fabrication | Fabrication complexity Friction Stiction | IJ12, IJ13, IJ15, IJ33, , IJ34, IJ35, IJ36 |
| Membrane push | An actuator with a high force but small area is used to push a stiff membrane that is in contact with the ink. | The effective area of the actuator becomes the membrane area | Fabrication complexity Actuator size Difficulty of integration in a VLSI process | 1982 Howkins U.S. Pat. No. 4,459,601 |
| Rotary | The actuator causes the rotation of some element, such a grill or impeller | Rotary levers may be used to increase travel Small chip area requirements | Device complexity May have friction at a pivot point | IJ05, IJ08, IJ13, IJ28 |
| Bend | The actuator bends when energized. This may be due to differential thermal expansion, piezoelectric expansion, magnetostriction, or other form of relative dimensional change. | A very small change in dimensions can be converted to a large motion. | Requires the actuator to be made from at least two distinct layers, or to have a thermal difference across the actuator | 1970 Kyser et al U.S. Pat. No. 3,946,398 1973 Stemme U.S. Pat. No. 3,747,120 IJ03, IJ09, IJ10, IJ19, IJ23, IJ24, IJ25, IJ29, IJ30, IJ31, IJ33, IJ34, IJ35 |
| Swivel | The actuator swivels around a central pivot. This motion is suitable where there are opposite forces applied to opposite sides of the paddle, e.g. Lorenz force. | Allows operation where the net linear force on the paddle is zero Small chip area requirements | Inefficient coupling to the ink motion | IJ06 |
| Straighten | The actuator is normally bent, and straightens when energized. | Can be used with shape memory alloys where the austenic phase is planar | Requires careful balance of stresses to ensure that the quiescent bend is accurate | IJ26, IJ32 |
| Double bend | The actuator bends in one direction when one element is energized, and bends the other way when another element is energized. | One actuator can be used to power two nozzles. Reduced chip size. Not sensitive to ambient temperature | Difficult to make the drops ejected by both bend directions identical. A small efficiency loss compared to equivalent single bend actuators. | IJ36, IJ37, IJ38 |

-continued

ACTUATOR MOTION

| | Description | Advantages | Disadvantages | Examples |
|---|---|---|---|---|
| Shear | Energizing the actuator causes a shear motion in the actuator material. | Can increase the effective travel of piezoelectric actuators | Not readily applicable to other actuator mechanisms | 1985 Fishbeck U.S. Pat. No. 4,584,590 |
| Radial constriction | The actuator squeezes an ink reservoir, forcing ink from a constricted nozzle. | Relatively easy to fabricate single nozzles from glass tubing as macroscopic structures | High force required Inefficient Difficult to integrate with VLSI processes | 1970 Zoltan U.S. Pat. No. 3,683,212 |
| Coil/ uncoil | A coiled actuator uncoils or coils more tightly. The motion of the free end of the actuator ejects the ink. | Easy to fabricate as a planar VLSI process Small area required, therefore low cost | Difficult to fabricate for non-planar devices Poor out-of-plane stiffness | IJ17, IJ21, IJ34, IJ35 |
| Bow | The actuator bows (or buckles) in the middle when energized. | Can increase the speed of travel Mechanically rigid | Maximum travel is constrained High force required | IJ16, IJ18, IJ27 |
| Push-Pull | Two actuators control a shutter. One actuator pulls the shutter, and the other pushes it. | The structure is pinned at both ends, so has a high out-of-plane rigidity | Not readily suitable for ink jets which directly push the ink | IJ18 |
| Curl inwards | A set of actuators curl inwards to reduce the volume of ink that they enclose. | Good fluid flow to the region behind the actuator increases efficiency | Design complexity | IJ20, IJ42 |
| Curl outwards | A set of actuators curl outwards, pressurizing ink in a chamber surrounding the actuators, and expelling ink from a nozzle in the chamber. | Relatively simple construction | Relatively large chip area | IJ43 |
| Iris | Multiple vanes enclose a volume of ink. These simultaneously rotate, reducing the volume between the vanes. | High efficiency Small chip area | High fabrication complexity Not suitable for pigmented inks | IJ22 |
| Acoustic vibration | The actuator vibrates at a high frequency. | The actuator can be physically distant from the ink | Large area required for efficient operation at useful frequencies Acoustic coupling and crosstalk Complex drive circuitry Poor control of drop volume and position | 1993 Hadimioglu et al, EUP 550,192 1993 Elrod et al, EUP 572,220 |
| None | In various ink jet designs the actuator does not move. | No moving parts | Various other tradeoffs are required to eliminate moving parts | Silverbrook, EP 0771 658 A2 and related patent applications Tone-jet |

| | NOZZLE REFILL METHOD | | | |
|---|---|---|---|---|
| | Description | Advantages | Disadvantages | Examples |
| Surface tension | This is the normal way that ink jets are refilled. After the actuator is energized, it typically returns rapidly to its normal position. This rapid return sucks in air through the nozzle opening. The ink surface tension at the nozzle then exerts a small force restoring the meniscus to a minimum area. This force refills the nozzle. | Fabrication simplicity Operational simplicity | Low speed Surface tension force relatively small compared to actuator force Long refill time usually dominates the total repetition rate | Thermal ink jet Piezoelectric ink jet IJ01-IJ07, IJ10-IJ14, IJ16, IJ20, IJ22-IJ45 |
| Shuttered oscillating ink pressure | Ink to the nozzle chamber is provided at a pressure that oscillates at twice the drop ejection frequency. When a drop is to be ejected, the shutter is opened for 3 half cycles: drop ejection, actuator return, and refill. The shutter is then closed to prevent the nozzle chamber emptying during the next negative pressure cycle. | High speed Low actuator energy, as the actuator need only open or close the shutter, instead of ejecting the ink drop | Requires common ink pressure oscillator May not be suitable for pigmented inks | IJ08, IJ13, IJ15, IJ17, IJ18, IJ19, IJ21 |
| Refill actuator | After the main actuator has ejected a drop a second (refill) actuator is energized. The refill actuator pushes ink into the nozzle chamber. The refill actuator returns slowly, to prevent its return from emptying the chamber again. | High speed, as the nozzle is actively refilled | Requires two independent actuators per nozzle | IJ09 |
| Positive ink pressure | The ink is held a slight positive pressure. After the ink drop is ejected, the nozzle chamber fills quickly as surface tension and ink pressure both operate to refill the nozzle. | High refill rate, therefore a high drop repetition rate is possible | Surface spill must be prevented Highly hydrophobic print head surfaces are required | Silverbrook, EP 0771 658 A2 and related patent applications Alternative for:, IJ01-IJ07, IJ10-IJ14, IJ16, IJ20, IJ22-IJ45 |

| | METHOD OF RESTRICTING BACK-FLOW THROUGH INLET | | | |
|---|---|---|---|---|
| | Description | Advantages | Disadvantages | Examples |
| Long inlet channel | The ink inlet channel to the nozzle chamber is made long and relatively narrow, relying on viscous drag to reduce inlet back-flow. | Design simplicity Operational simplicity Reduces crosstalk | Restricts refill rate May result in a relatively large chip area Only partially effective | Thermal ink jet Piezoelectric ink jet IJ42, IJ43 |
| Positive ink pressure | The ink is under a positive pressure, so that in the quiescent state some of the ink drop already protrudes from the nozzle. This reduces the pressure in the nozzle chamber which is required to eject a certain volume of ink. The reduction in chamber pressure results in a reduction in ink pushed out through the inlet. | Drop selection and separation forces can be reduced Fast refill time | Requires a method (such as a nozzle rim or effective hydrophobizing, or both) to prevent flooding of the ejection surface of the print head. | Silverbrook, EP 0771 658 A2 and related patent applications Possible operation of the following: IJ01-IJ07, IJ09-IJ12, IJ14, IJ16, IJ20, IJ22, , IJ23-IJ34, IJ36-IJ41, IJ44 |
| Baffle | One or more baffles are placed in the inlet ink flow. When the actuator is energized, the rapid ink movement creates eddies which restrict the flow through the inlet. The slower refill process is unrestricted, and does not result in eddies. | The refill rate is not as restricted as the long inlet method. Reduces crosstalk | Design complexity May increase fabrication complexity (e.g. Tektronix hot melt Piezoelectric print heads). | HP Thermal Ink Jet Tektronix piezoelectric ink jet |
| Flexible flap restricts inlet | In this method recently disclosed by Canon, the expanding actuator (bubble) pushes on a flexible flap that restricts the inlet. | Significantly reduces back-flow for edge-shooter thermal ink jet devices | Not applicable to most ink jet configurations Increased fabrication complexity Inelastic deformation of polymer flap results in creep over extended use | Canon |
| Inlet filter | A filter is located between the ink inlet and the nozzle chamber. The filter has a multitude of small holes or slots, restricting ink flow. The filter also removes particles which may block the nozzle. | Additional advantage of ink filtration Ink filter may be fabricated with no additional process steps | Restricts refill rate May result in complex construction | IJ04, IJ12, IJ24, IJ27, IJ29, IJ30 |
| Small inlet compared to nozzle | The ink inlet channel to the nozzle chamber has a substantially smaller cross section than that of | Design simplicity | Restricts refill rate May result in a relatively large chip area Only partially | IJ02, IJ37, IJ44 |

METHOD OF RESTRICTING BACK-FLOW THROUGH INLET -continued

| | Description | Advantages | Disadvantages | Examples |
|---|---|---|---|---|
| | the nozzle, resulting in easier ink egress out of the nozzle than out of the inlet. | | effective | |
| Inlet shutter | A secondary actuator controls the position of a shutter, closing off the ink inlet when the main actuator is energized. | Increases speed of the ink-jet print head operation | Requires separate refill actuator and drive circuit | IJ09 |
| The inlet is located behind the ink-pushing surface | The method avoids the problem of inlet back-flow by arranging the ink-pushing surface of the actuator between the inlet and the nozzle. | Back-flow problem is eliminated | Requires careful design to minimize the negative pressure behind the paddle | IJ01, IJ03, IJ05, IJ06, IJ07, IJ10, IJ11, IJ14, IJ16, IJ22, IJ23, IJ25, IJ28, IJ31, IJ32, IJ33, IJ34, IJ35, IJ36, IJ39, IJ40, IJ41 |
| Part of the actuator moves to shut off the inlet | The actuator and a wall of the ink chamber are arranged so that the motion of the actuator closes off the inlet. | Significant reductions in back-flow can be achieved Compact designs possible | Small increase in fabrication complexity | IJ07, IJ20, IJ26, IJ38 |
| Nozzle actuator does not result in ink back-flow | In some configurations of ink jet, there is no expansion or movement of an actuator which may cause ink back-flow through the inlet. | Ink back-flow problem is eliminated | None related to ink back-flow on actuation | Silverbrook, EP 0771 658 A2 and related patent applications Valve-jet Tone-jet |

NOZZLE CLEARING METHOD

| | Description | Advantages | Disadvantages | Examples |
|---|---|---|---|---|
| Normal nozzle firing | All of the nozzles are fired periodically, before the ink has a chance to dry. When not in use the nozzles are sealed (capped) against air. The nozzle firing is usually performed during a special clearing cycle, after first moving the print head to a cleaning station. | No added complexity on the print head | May not be sufficient to displace dried ink | Most ink jet systems IJ01, IJ02, IJ03, IJ04, IJ05, IJ06, IJ07, IJ09, IJ10, IJ11, IJ12, IJ14, IJ16, IJ20, IJ22, IJ23, IJ24, IJ25, IJ26, IJ27, IJ28, IJ29, IJ30, IJ31, IJ32, IJ33, IJ34, IJ36, IJ37, IJ38, IJ39, IJ40,, IJ41, IJ42, IJ43, IJ44,, IJ45 |
| Extra power to ink heater | In systems which heat the ink, but do not boil it under normal situations, nozzle clearing can be achieved by over-powering the heater and boiling ink at the nozzle. | Can be highly effective if the heater is adjacent to the nozzle | Requires higher drive voltage for clearing May require larger drive transistors | Silverbrook, EP 0771 658 A2 and related patent applications |
| Rapid succession of | The actuator is fired in rapid succession. In | Does not require extra drive circuits on | Effectiveness depends substantially | May be used with: IJ01, IJ02, IJ03, IJ04, IJ05, |

-continued

NOZZLE CLEARING METHOD

| | Description | Advantages | Disadvantages | Examples |
|---|---|---|---|---|
| actuator pulses | some configurations, this may cause heat build-up at the nozzle which boils the ink, clearing the nozzle. In other situations, it may cause sufficient vibrations to dislodge clogged nozzles. | the print head Can be readily controlled and initiated by digital logic | upon the configuration of the ink jet nozzle | IJ06, IJ07, IJ09, IJ10, IJ11, IJ14, IJ16, IJ20, IJ22, IJ23, IJ24, IJ25, IJ27, IJ28, IJ29, IJ30, IJ31, IJ32, IJ33, IJ34, IJ36, IJ37, IJ38, IJ39, IJ40, IJ41, IJ42, IJ43, IJ44, IJ45 |
| Extra power to ink pushing actuator | Where an actuator is not normally driven to the limit of its motion, nozzle clearing may be assisted by providing an enhanced drive signal to the actuator. | A simple solution where applicable | Not suitable where there is a hard limit to actuator movement | May be used with: IJ03, IJ09, IJ16, IJ20, IJ23, IJ24, IJ25, IJ27, IJ29, IJ30, IJ31, IJ32, IJ39, IJ40, IJ41, IJ42, IJ43, IJ44, IJ45 |
| Acoustic resonance | An ultrasonic wave is applied to the ink chamber. This wave is of an appropriate amplitude and frequency to cause sufficient force at the nozzle to clear blockages. This is easiest to achieve if the ultrasonic wave is at a resonant frequency of the ink cavity. | A high nozzle clearing capability can be achieved May be implemented at very low cost in systems which already include acoustic actuators | High implementation cost if system does not already include an acoustic actuator | IJ08, IJ13, IJ15, IJ17, IJ18, IJ19, IJ21 |
| Nozzle clearing plate | A microfabricated plate is pushed against the nozzles. The plate has a post for every nozzle. A post moves through each nozzle, displacing dried ink. | Can clear severely clogged nozzles | Accurate mechanical alignment is required Moving parts are required There is risk of damage to the nozzles Accurate fabrication is required | Silverbrook, EP 0771 658 A2 and related patent applications |
| Ink pressure pulse | The pressure of the ink is temporarily increased so that ink streams from all of the nozzles. This may be used in conjunction with actuator energizing. | May be effective where other methods cannot be used | Requires pressure pump or other pressure actuator Expensive Wasteful of ink | May be used with all IJ series ink jets |
| Print head wiper | A flexible 'blade' is wiped across the print head surface. The blade is usually fabricated from a flexible polymer, e.g. rubber or synthetic elastomer. | Effective for planar print head surfaces Low cost | Difficult to use if print head surface is non-planar or very fragile Requires mechanical parts Blade can wear out in high volume print systems | Many ink jet systems |
| Separate ink boiling heater | A separate heater is provided at the nozzle although the normal drop e-ection mechanism does not require it. Can be | Can be effective where other nozzle clearing methods cannot be used Can be | Fabrication complexity | Can be used with many IJ series ink jets |

-continued

NOZZLE CLEARING METHOD

| Description | Advantages | Disadvantages | Examples |
|---|---|---|---|
| The heaters do not require individual drive circuits, as many nozzles can be cleared simultaneously, and no imaging is required. | implemented at no additional cost in some ink jet configurations | | |

NOZZLE PLATE CONSTRUCTION

| | Description | Advantages | Disadvantages | Examples |
|---|---|---|---|---|
| Electroformed nickel | A nozzle plate is separately fabricated from electroformed nickel, and bonded to the print head chip. | Fabrication simplicity | High temperatures and pressures are required to bond nozzle plate Minimum thickness constraints Differential thermal expansion | Hewlett Packard Thermal Ink jet |
| Laser ablated or drilled polymer | Individual nozzle holes are ablated by an intense UV laser in a nozzle plate, which is typically a polymer such as polyimide or polysulphone | No masks required Can be quite fast Some control over nozzle profile is possible Equipment required is relatively low cost | Each hole must be individually formed Special equipment required Slow where there are many thousands of nozzles per print head May produce thin burrs at exit holes | Canon Bubblejet 1988 Sercel et al., SPIE, Vol. 998 Excimer Beam Applications, pp. 76-83 1993 Watanabe et al., U.S. Pat. No. 5,208,604 |
| Silicon micromachined | A separate nozzle plate is micromachined from single crystal silicon, and bonded to the print head wafer. | High accuracy is attainable | Two part construction High cost Requires precision alignment Nozzles may be clogged by adhesive | K. Bean, IEEE Transactions on Electron Devices, Vol. ED-25, No. 10, 1978, pp 1185-1195 Xerox 1990 Hawkins et al., U.S. Pat. No. 4,899,181 |
| Glass capillaries | Fine glass capillaries are drawn from glass tubing. This method has been used for making individual nozzles, but is difficult to use for bulk manufacturing of print heads with thousands of nozzles. | No expensive equipment required Simple to make single nozzles | Very small nozzle sizes are difficult to form Not suited for mass production | 1970 Zoltan U.S. Pat. No. 3,683,212 |
| Monolithic, surface micromachined using VLSI lithographic processes | The nozzle plate is deposited as a layer using standard VLSI deposition techniques. Nozzles are etched in the nozzle plate | High accuracy (<1 μm) Monolithic Low cost Existing processes can be used | Requires sacrificial layer under the nozzle plate to form the nozzle chamber Surface may be fragile to the touch | Silverbrook, EP 0771 658 A2 and related patent applications IJ01, IJ02, IJ04, IJ11, IJ12, IJ17, IJ18, IJ20, |

NOZZLE PLATE CONSTRUCTION

| | Description | Advantages | Disadvantages | Examples |
|---|---|---|---|---|
| | using VLSI lithography and etching. | | | IJ22, IJ24, IJ27, IJ28, IJ29, IJ30, IJ31, IJ32, IJ33, IJ34, IJ36, IJ37, IJ38, IJ39, IJ40, IJ41, IJ42, IJ43, IJ44 |
| Monolithic, etched through substrate | The nozzle plate is a buried etch stop in the wafer. Nozzle chambers are etched in the front of the wafer, and the wafer is thinned from the back side. Nozzles are then etched in the etch stop layer. | High accuracy (<1 μm) Monolithic Low cost No differential expansion | Requires long etch times Requires a support wafer | IJ03, IJ05, IJ06, IJ07, IJ08, IJ09, IJ10, IJ13, IJ14, IJ15, IJ16, IJ19, IJ21, IJ23, IJ25, IJ26 |
| No nozzle plate | Various methods have been tried to eliminate the nozzles entirely, to prevent nozzle clogging. These include thermal bubble mechanisms and acoustic lens mechanisms | No nozzles to become clogged | Difficult to control drop position accurately Crosstalk problems | Ricoh 1995 Sekiya et al U.S. Pat. No. 5,412,413 1993 Hadimioglu et al EUP 550,192 1993 Elrod et al EUP 572,220 |
| Trough | Each drop ejector has a trough through which a paddle moves. There is no nozzle plate. | Reduced manufacturing complexity Monolithic | Drop firing direction is sensitive to wicking. | IJ35 |
| Nozzle slit instead of individual nozzles | The elimination of nozzle holes and replacement by a slit encompassing many actuator positions reduces nozzle clogging, but increases crosstalk due to ink surface waves | No nozzles to become clogged | Difficult to control drop position accurately Crosstalk problems | 1989 Saito et al U.S. Pat. No. 4,799,068 |

DROP EJECTION DIRECTION

| | Description | Advantages | Disadvantages | Examples |
|---|---|---|---|---|
| Edge ('edge shooter') | Ink flow is along the surface of the chip, and ink drops are ejected from the chip edge. | Simple construction No silicon etching required Good heat sinking via substrate Mechanically strong Ease of chip handing | Nozzles limited to edge High resolution is difficult Fast color printing requires one print head per color | Canon Bubblejet 1979 Endo et al GB patent 2,007,162 Xerox heater-in-pit 1990 Hawkins et al U.S. Pat. No. 4,899,181 Tone-jet |
| Surface ('roof shooter') | Ink flow is along the surface of the chip, and ink drops are ejected from the chip surface, normal to the plane of the chip. | No bulk silicon etching required Silicon can make an effective heat sink Mechanical strength | Maximum ink flow is severely restricted | Hewlett-Packard TIJ 1982 Vaught et al U.S. Pat. No. 4,490,728 IJ02, IJ11, IJ12, IJ20, IJ22 |

-continued

DROP EJECTION DIRECTION

| | Description | Advantages | Disadvantages | Examples |
|---|---|---|---|---|
| Through chip, forward ('up shooter') | Ink flow is through the chip, and ink drops are ejected from the front surface of the chip. | High ink flow Suitable for pagewidth print heads High nozzle packing density therefore low manufacturing cost | Requires bulk silicon etching | Silverbrook, EP 0771 658 A2 and related patent applications IJ04, IJ17, IJ18, IJ24, IJ27-IJ45 |
| Through chip, reverse ('down shooter') | Ink flow is through the chip, and ink drops are ejected from the rear surface of the chip. | High ink flow Suitable for pagewidth print heads High nozzle packing density therefore low manufacturing cost | Requires wafer thinning Requires special handling during manufacture | IJ01, IJ03, IJ05, IJ06, IJ07, IJ08, IJ09, IJ10, IJ13, IJ14, IJ15, IJ16, IJ19, IJ21, IJ23, IJ25, IJ26 |
| Through actuator | Ink flow is through the actuator, which is not fabricated as part of the same substrate as the drive transistors. | Suitable for piezoelectric print heads | Pagewidth print heads require several thousand connections to drive circuits Cannot be manufactured in standard CMOS fabs Complex assembly required | Epson Stylus Tektronix hot melt piezoelectric ink jets |

INK TYPE

| | Description | Advantages | Disadvantages | Examples |
|---|---|---|---|---|
| Aqueous, dye | Water based ink which typically contains: water, dye, surfactant, humectant, and biocide. Modern ink dyes have high water-fastness, light fastness | Environmentally friendly No odor | Slow drying Corrosive Bleeds on paper May strikethrough Cockles paper | Most existing ink jets All IJ series ink jets Silverbrook, EP 0771 658 A2 and related patent applications |
| Aqueous, pigment | Water based ink which typically contains: water, pigment, surfactant, humectant, and biocide. Pigments have an advantage in reduced bleed, wicking and strikethrough. | Environmentally friendly No odor Reduced bleed Reduced wicking Reduced strikethrough | Slow drying Corrosive Pigment may clog nozzles Pigment may clog actuator mechanisms Cockles paper | IJ02, IJ04, IJ21, IJ26, IJ27, IJ30 Silverbrook, EP 0771 658 A2 and related patent applications Piezoelectric ink-jets Thermal ink jets (with significant restrictions) |
| Methyl Ethyl Ketone (MEK) | MEK is a highly volatile solvent used for industrial printing on difficult surfaces such as aluminium cans. | Very fast drying Prints on various substrates such as metals and plastics | Odorous Flammable | All IJ series ink jets |
| Alcohol (ethanol, 2-butanol, | Alcohol based inks can be used where the printer must | Fast drying Operates at sub-freezing | Slight odor Flammable | All IJ series ink jets |

-continued

INK TYPE

| | Description | Advantages | Disadvantages | Examples |
|---|---|---|---|---|
| and others) | operate at temperatures below the freezing point of water. An example of this is in-camera consumer photographic printing. | temperatures Reduced paper cockle Low cost | | |
| Phase change (hot melt) | The ink is solid at room temperature, and is melted in the print head before jetting. Hot melt inks are usually wax based, with a melting point around 80° C. After jetting the ink freezes almost instantly upon contacting the print medium or a transfer roller. | No drying time-ink instantly freezes on the print medium Almost any print medium can be used No paper cockle occurs No wicking occurs No bleed occurs No strikethrough occurs | High viscosity Printed ink typically has a 'waxy' feel Printed pages may 'block' Ink temperature may be above the curie point of permanent magnets Ink heaters consume power Long warm-up time | Tektronix hot melt piezoelectric ink jets 1989 Nowak U.S. Pat. No. 4,820,346 All IJ series ink jets |
| Oil | Oil based inks are extensively used in offset printing. They have advantages in improved characteristics on paper (especially no wicking or cockle). Oil soluble dies and pigments are required. | High solubility medium for some dyes Does not cockle paper Does not wick through paper | High viscosity: this is a significant limitation for use in ink jets, which usually require a low viscosity. Some short chain and multi-branched oils have a sufficiently low viscosity. Slow drying | All IJ series ink jets |
| Microemulsion | A microemulsion is a stable, self forming emulsion of oil, water, and surfactant. The characteristic drop size is less than 100 nm, and is determined by the preferred curvature of the surfactant. | Stops ink bleed High dye solubility Water, oil, and amphiphilic soluble dies can be used Can stabilize pigment suspensions | Viscosity higher than water Cost is slightly higher than water based ink High surfactant concentration required (around 5%) | All IJ series ink jets |

The invention claimed is:

1. An ink jet printhead comprising:
a plurality of nozzles;
a bubble forming chamber corresponding to each of the nozzles respectively, the bubble forming chambers adapted to contain a bubble forming liquid;
a looped heater element disposed in each of the bubble forming chambers respectively, the heater elements configured for thermal contact with the bubble forming liquid; wherein heating of the looped heater element to a temperature above the boiling point of the bubble forming liquid forms a gas bubble that causes the ejection of a drop of an ejectable liquid through the nozzle corresponding to that heater element; and,
a pair of electrodes for each of the heater elements respectively, the pair of electrodes in each of the bubble forming chambers being positioned adjacent each other such that the looped heater element provides a single current path between the electrodes of each pair; wherein,
each looped heater element includes a plurality of double omega profiled sections which extend at least partially along an axis of the respective bubble forming chamber.

2. The ink jet printhead according to claim 1, wherein the bubble forming chamber has a circular cross section.

3. The ink jet printhead according to claim 1, wherein each looped heater element includes a plurality of single omega profiled sections which extend at least partially along an axis of the respective bubble forming chamber.

4. The ink jet printhead according to claim 1, wherein each bubble forming chamber is cylindrical.

5. The ink jet printhead according to claim 1, wherein the bubble forming chamber is barrel-shaped.

6. The ink jet printhead according to claim 1, wherein the bubble forming chamber has a truncated coned profile.

7. The ink jet printhead according to claim 1, wherein the ink jet printhead includes:
- an underlying substrate;
- a unitary amorphous ceramic structure having a nozzle plate with a plurality of nozzles formed therein; and
- an array of sidewalls extending from one side of the nozzle plate to the underlying substrate, wherein the underlying substrate, the nozzle plate and the array of sidewalls define the bubble forming chambers.

8. The ink jet printhead according to claim 1, wherein the ejectable liquid is the same as the bubble forming liquid.

9. The ink printhead according to claim 1, wherein the printhead is a pagewidth printhead 10. The ink jet printhead according to claim 1, wherein the looped heater elements are actuated by one or more drive circuits which are located partially on a side of one of the bubble forming chambers.

11. The ink jet printhead according to claim 10, wherein one or more drive circuits conduct a thermal pulse in order to form the gas bubble.

12. The ink jet printhead according to claim 1, wherein the looped heater elements have a serpentine profile.

13. The ink jet printhead according to claim 1, wherein the bubble forming chamber is in fluid communication with an inlet passage which supplies the bubble forming liquid, wherein when the drop of the ejectable liquid is being ejected, a portion of the bubble forming liquid contained within the bubble forming chamber is withdrawn through the inlet passage.

* * * * *